United States Patent
Kiribayashi et al.

[11] Patent Number: 5,995,892
[45] Date of Patent: Nov. 30, 1999

[54] TRIGGERING DEVICE FOR SAFETY APPARATUS

[75] Inventors: Shinichi Kiribayashi, Anjo; Mitsuhiko Masegi, Aichi-ken, both of Japan

[73] Assignee: Denso Corporation, Kariya, Japan

[21] Appl. No.: 08/888,678

[22] Filed: Jul. 7, 1997

Related U.S. Application Data

[63] Continuation-in-part of application No. 08/658,667, Jun. 4, 1996, Pat. No. 5,904,723.

[30] Foreign Application Priority Data

| Jun. 12, 1995 | [JP] | Japan | 7-170220 |
| Mar. 8, 1996 | [JP] | Japan | 8-80845 |
| Sep. 18, 1996 | [JP] | Japan | 8-269285 |

[51] Int. Cl.$^6$ ............................................... B60R 21/32
[52] U.S. Cl. .......................... 701/45; 280/735; 307/10.1
[58] Field of Search ..................... 701/45, 46; 307/10.1; 340/436; 280/728.1, 734, 735, 730.2

[56] References Cited

U.S. PATENT DOCUMENTS

| 4,836,024 | 6/1989 | Woehrl et al. | 307/10.1 |
| 4,845,377 | 7/1989 | Swart | 307/10.1 |
| 4,980,573 | 12/1990 | White et al. | 307/10.1 |
| 5,072,966 | 12/1991 | Nishitake et al. | 280/730 |
| 5,107,245 | 4/1992 | Gesper et al. | 340/436 |
| 5,173,614 | 12/1992 | Woehrl et al. | 307/10.1 |
| 5,208,484 | 5/1993 | Okano et al. | 307/10.1 |
| 5,234,228 | 8/1993 | Morota et al. | 280/734 |
| 5,357,141 | 10/1994 | Nitschke et al. | 307/10.1 |
| 5,359,515 | 10/1994 | Weller et al. | 364/424.05 |
| 5,424,582 | 6/1995 | Spies et al. | 307/10.1 |
| 5,461,566 | 10/1995 | Musser | 364/424.055 |
| 5,483,447 | 1/1996 | Jeenicke et al. | 364/424.055 |
| 5,513,109 | 4/1996 | Fujishima | 364/424.055 |
| 5,544,915 | 8/1996 | Fendt et al. | 280/735 |
| 5,609,358 | 3/1997 | Iyoda et al. | 280/735 |
| 5,758,899 | 6/1998 | Foo et al. | 280/730.2 |

FOREIGN PATENT DOCUMENTS

| 63-255154 | 10/1988 | Japan . |
| 3-135859 | 6/1991 | Japan . |
| 3-253440 | 11/1991 | Japan . |
| 3-273959 | 12/1991 | Japan . |
| 4-506495 | 11/1992 | Japan . |
| 5-038998 | 2/1993 | Japan . |
| 5-069791 | 3/1993 | Japan . |
| 5-270355 | 10/1993 | Japan . |
| 6-079667 | 11/1994 | Japan . |

Primary Examiner—Michael J. Zanelli
Attorney, Agent, or Firm—Pillsbury Madison & Sutro

[57] ABSTRACT

A triggering device for a safety apparatus includes a first detecting section and a second detecting section. The first detection section includes at least one first sensor located in a right-hand portion of a vehicle for detecting a deceleration acting on the vehicle in at least one of a longitudinal direction and a lateral direction of the vehicle. The second detecting section includes at least one second sensor located in a left-hand portion of the vehicle for detecting a deceleration acting on the vehicle in at least one of the longitudinal direction and the lateral direction of the vehicle. A controlling section is operative for triggering the safety apparatus in response to at least two out of detection values related to the longitudinal direction and detection values related to the lateral direction which are generated by the first and second sensors.

8 Claims, 32 Drawing Sheets

OUTPUT OF ACCELERATION SENSOR 11

INTEGRATION RESULT IN SUB SIGNAL PROCESSORS 13, 14

OUTPUT OF COMPARATOR IN SUB SIGNAL PROCESSOR 13

OUTPUT OF COMPARATOR IN SUB SIGNAL PROCESSOR 14

FIG. 7

(a) OUTPUT OF ACCELERATION SENSOR 11

(b) RESULT OF INTEGRATION OF OUTPUT OF ACCELERATION SENSOR 11

(c) OUTPUT OF ACCELERATION SENSOR 21

(d) RESULT OF INTEGRATION OF OUTPUT OF ACCELERATION SENSOR 21

(e) OUTPUT OF SUB SIGNAL PROCESSOR 13

(f) OUTPUT OF SUB SIGNAL PROCESSOR 14

(g) OUTPUT OF SUB SIGNAL PROCESSOR 23

(h) OUTPUT OF SUB SIGNAL PROCESSOR 24

(i) OUTPUT OF AND CIRCUIT 15

(j) STATE OF SWITCH 16

(k) STATE OF SWITCH 17

(ℓ) STATE OF FIRST TRIGGER COMPONENT 18

(m) OUTPUT OF AND CIRCUIT 25

(n) STATE OF SWITCH 26

(o) STATE OF SWITCH 27

(p) STATE OF SECOND TRIGGER COMPONENT 28

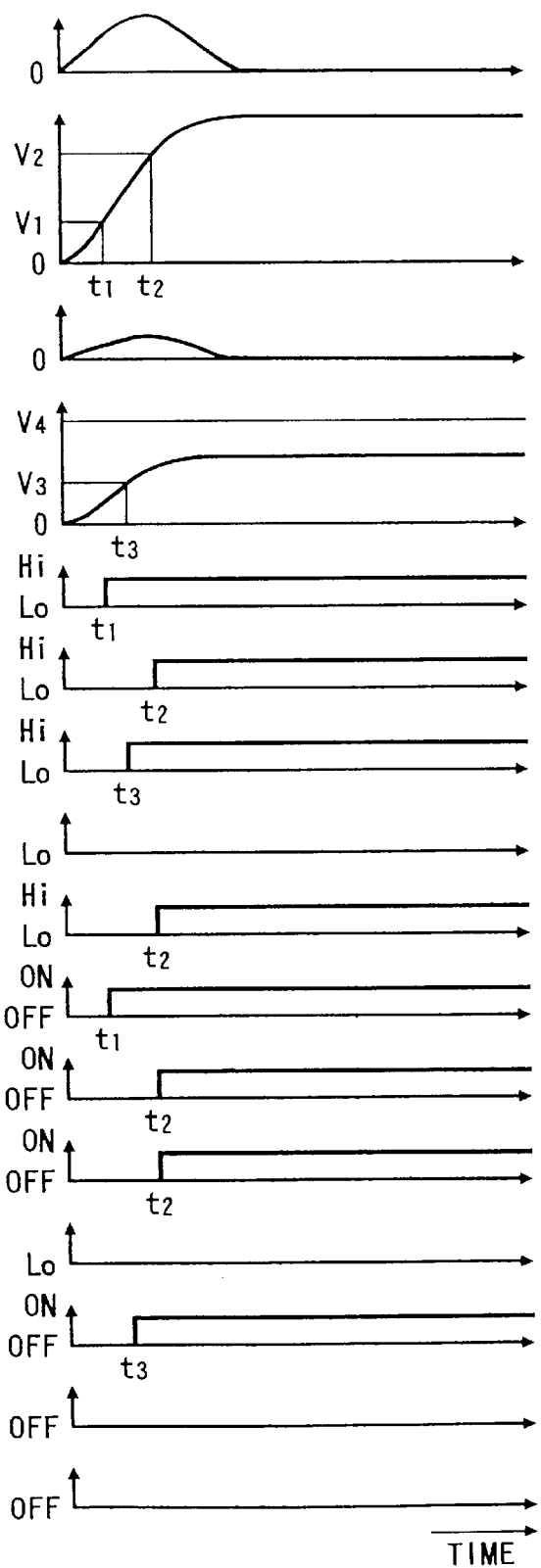

FIG. 9

(a) OUTPUT OF ACCELERATION SENSOR 11 

(b) RESULT OF INTEGRATION OF OUTPUT OF ACCELERATION SENSOR 11 

(c) OUTPUT OF ACCELERATION SENSOR 21 

(d) RESULT OF INTEGRATION OF OUTPUT OF ACCELERATION SENSOR 21 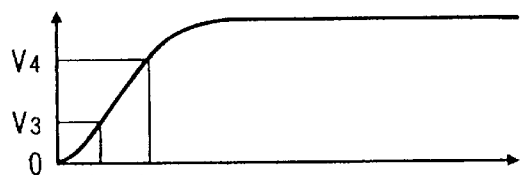

(e) OUTPUT OF SUB SIGNAL PROCESSOR 13 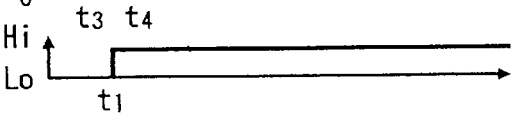

(f) OUTPUT OF SUB SIGNAL PROCESSOR 14 

(g) OUTPUT OF SUB SIGNAL PROCESSOR 23 

(h) OUTPUT OF SUB SIGNAL PROCESSOR 24 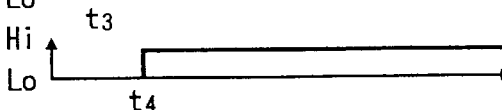

(i) OUTPUT OF AND CIRCUIT 15 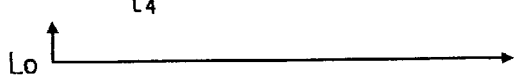

(j) STATE OF SWITCH 16 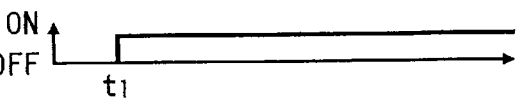

(k) STATE OF SWITCH 17 

(ℓ) STATE OF FIRST TRIGGER COMPONENT 18 

(m) OUTPUT OF AND CIRCUIT 25 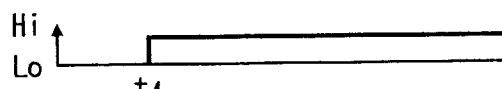

(n) STATE OF SWITCH 26 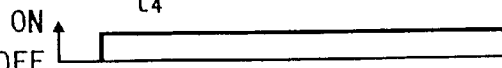

(o) STATE OF SWITCH 27 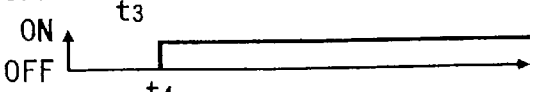

(p) STATE OF SECOND TRIGGER COMPONENT 28 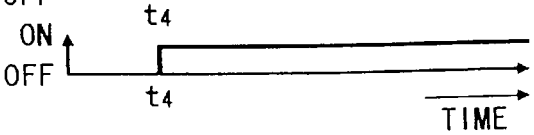

TIME

FIG. 14

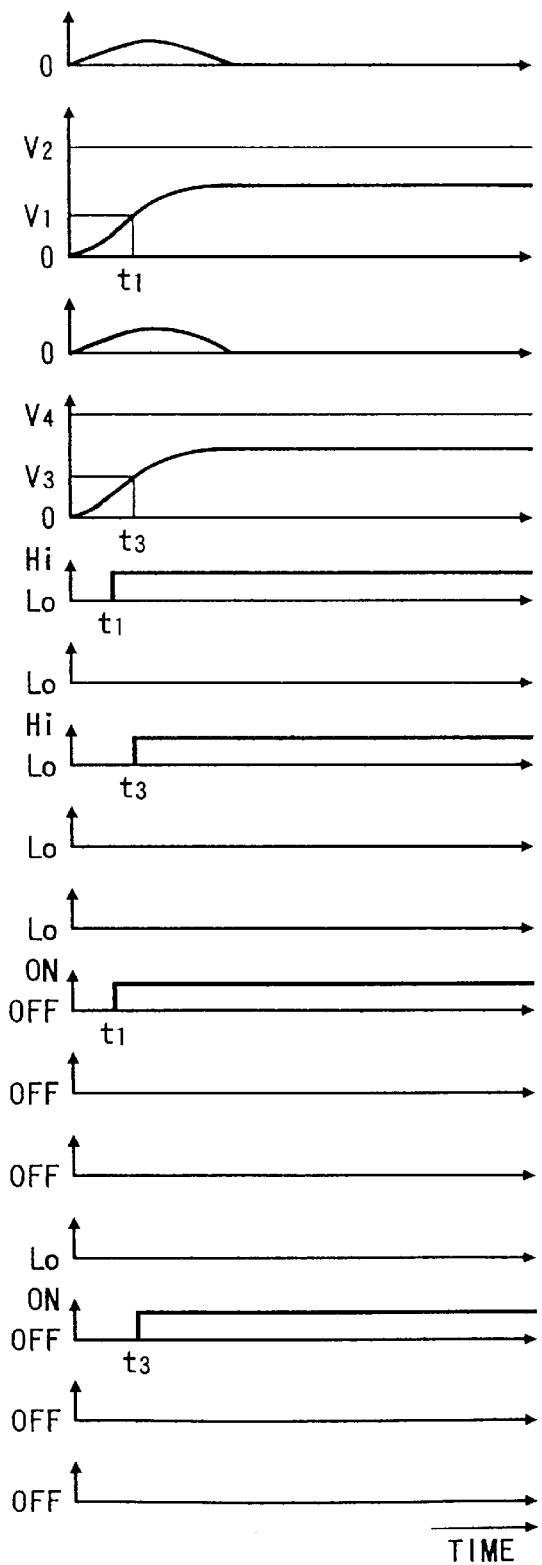

(a) OUTPUT OF ACCELERATION SENSOR 11

(b) RESULT OF INTEGRATION OF OUTPUT OF ACCELERATION SENSOR 11

(c) OUTPUT OF ACCELERATION SENSOR 21

(d) RESULT OF INTEGRATION OF OUTPUT OF ACCELERATION SENSOR 21

(e) OUTPUT OF SUB SIGNAL PROCESSOR 13

(f) OUTPUT OF SUB SIGNAL PROCESSOR 14

(g) OUTPUT OF SUB SIGNAL PROCESSOR 23

(h) OUTPUT OF SUB SIGNAL PROCESSOR 24

(i) OUTPUT OF AND CIRCUIT 15

(j) STATE OF SWITCH 16

(k) STATE OF SWITCH 17

(ℓ) STATE OF FIRST TRIGGER COMPONENT 18

(m) OUTPUT OF AND CIRCUIT 25

(n) STATE OF SWITCH 26

(o) STATE OF SWITCH 27

(p) STATE OF SECOND TRIGGER COMPONENT 28

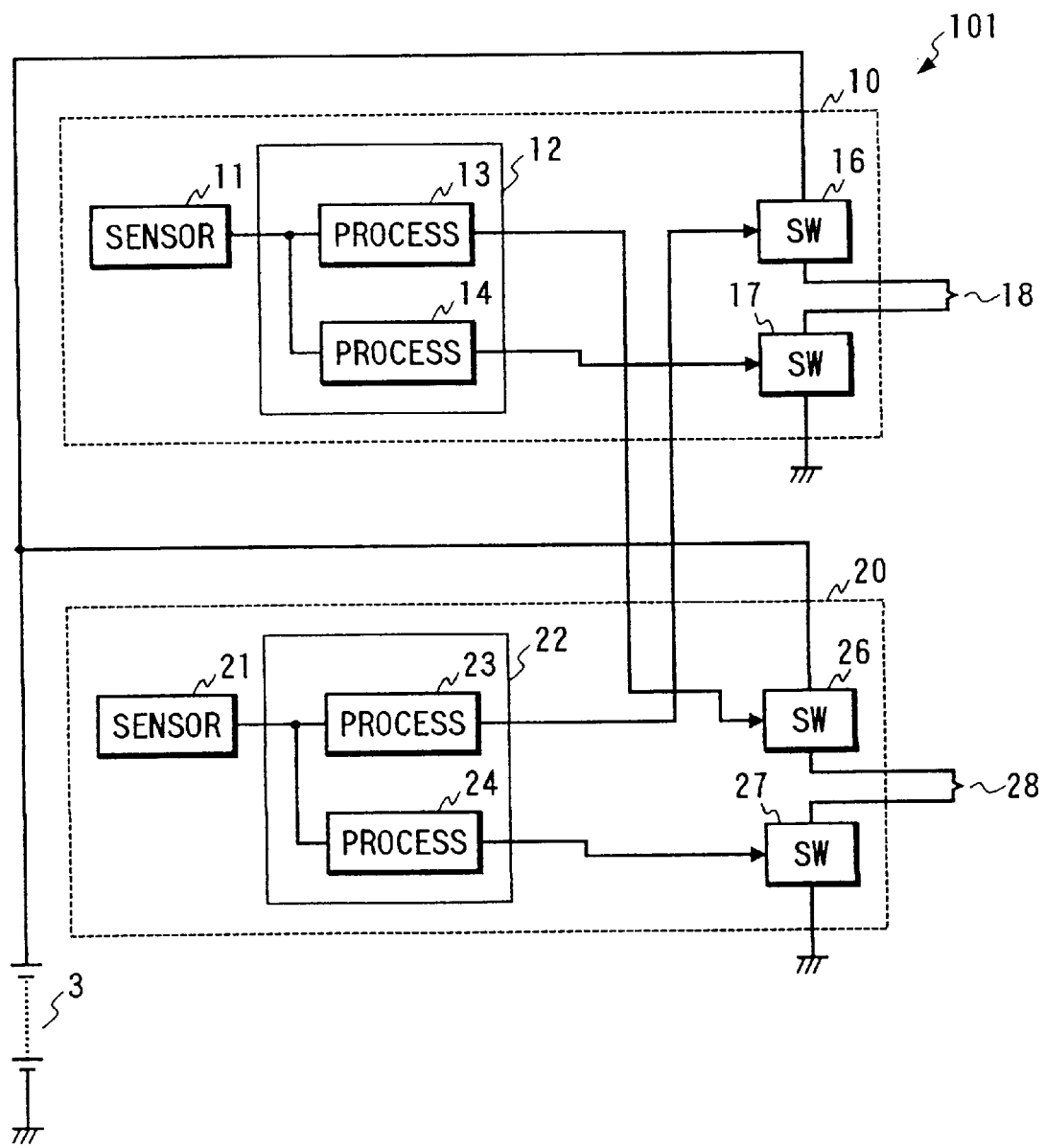

FIG. 17

(a) OUTPUT OF ACCELERATION SENSOR 11

(b) RESULT OF INTEGRATION OF OUTPUT OF ACCELERATION SENSOR 11

(c) OUTPUT OF ACCELERATION SENSOR 21

(d) RESULT OF INTEGRATION OF OUTPUT OF ACCELERATION SENSOR 21

(e) OUTPUT OF SUB SIGNAL PROCESSOR 13

(f) OUTPUT OF SUB SIGNAL PROCESSOR 14

(g) OUTPUT OF SUB SIGNAL PROCESSOR 23

(h) OUTPUT OF SUB SIGNAL PROCESSOR 24

(i) STATE OF SWITCH 16

(j) STATE OF SWITCH 17

(k) STATE OF FIRST TRIGGER COMPONENT 18

(ℓ) STATE OF SWITCH 26

(m) STATE OF SWITCH 27

(n) STATE OF SECOND TRIGGER COMPONENT 28

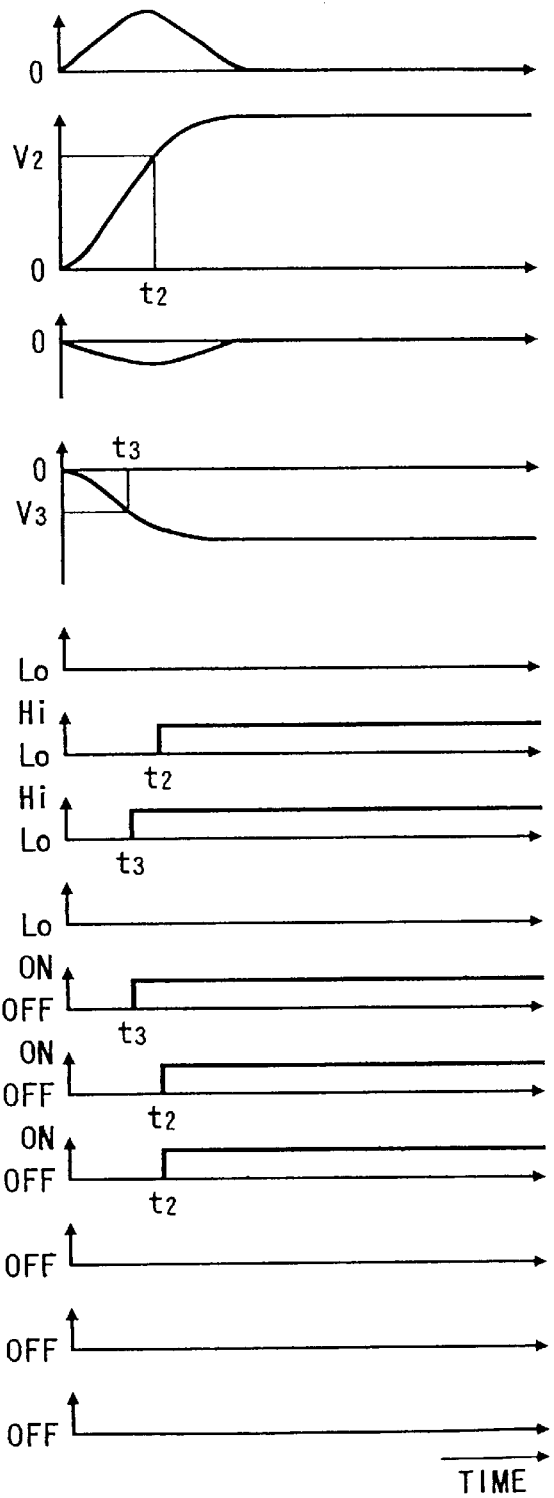

FIG. 28
(a) OUTPUT OF ACCELERATION SENSOR 311 
(b) RESULT OF INTEGRATION OF OUTPUT OF ACCELERATION SENSOR 311 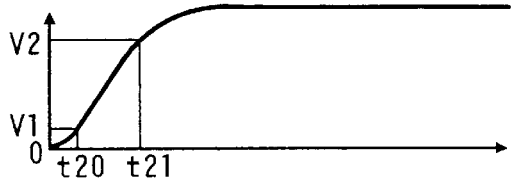
(c) OUTPUT OF ACCELERATION SENSOR 321 
(d) RESULT OF INTEGRATION OF OUTPUT OF ACCELERATION SENSOR 321 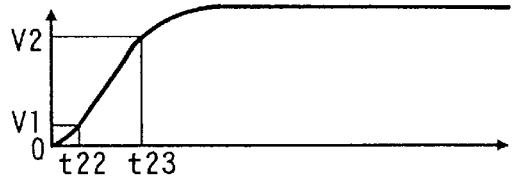
(e) STATE OF TRANSISTOR 316 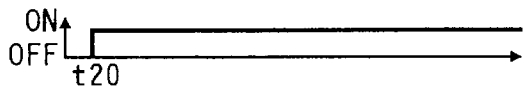
(f) STATE OF TRANSISTOR 314 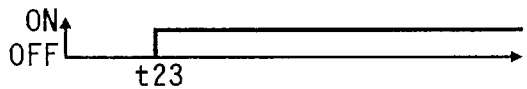
(g) STATE OF SQUIB 315 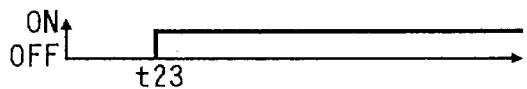
(h) STATE OF TRANSISTOR 326 
(i) STATE OF TRANSISTOR 324 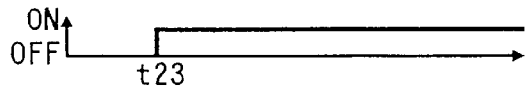
(j) STATE OF SQUIB 325 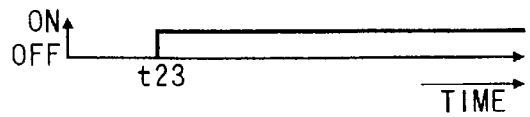
TIME (a) OUTPUT OF ACCELERATION SENSOR 311

(b) RESULT OF INTEGRATION OF OUTPUT OF ACCELERATION SENSOR 311

(c) OUTPUT OF ACCELERATION SENSOR 321

(d) RESULT OF INTEGRATION OF OUTPUT OF ACCELERATION SENSOR 321

(e) STATE OF TRANSISTOR 316

(f) STATE OF TRANSISTOR 314

(g) STATE OF SQUIB 315

(h) STATE OF TRANSISTOR 326

(i) STATE OF TRANSISTOR 324

(j) STATE OF SQUIB 325

FIG. 32
(a) OUTPUT OF ACCELERATION SENSOR 312 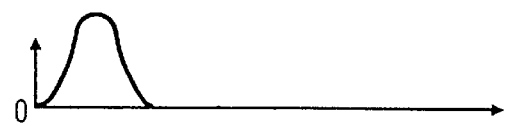
(b) RESULT OF INTEGRATION OF OUTPUT OF ACCELERATION SENSOR 312 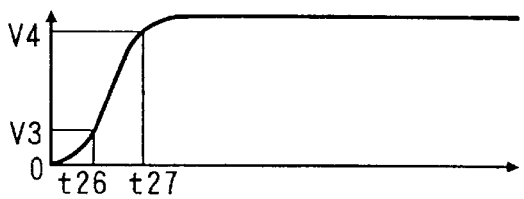
(c) OUTPUT OF ACCELERATION SENSOR 322 
(d) RESULT OF INTEGRATION OF OUTPUT OF ACCELERATION SENSOR 322 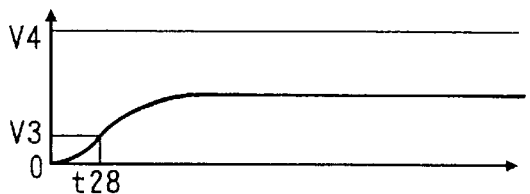
(e) STATE OF TRANSISTOR 320 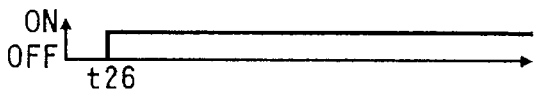
(f) STATE OF TRANSISTOR 318 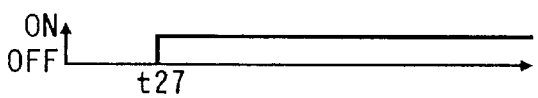
(g) STATE OF SQUIB 319 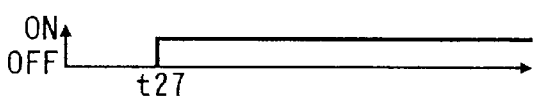
(h) STATE OF TRANSISTOR 330 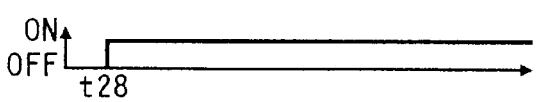
(i) STATE OF TRANSISTOR 328 
(j) STATE OF SQUIB 329 
TIME

FIG. 37
(a) OUTPUT OF ACCELERATION SENSOR 411 
(b) RESULT OF INTEGRATION OF OUTPUT OF ACCELERATION SENSOR 411 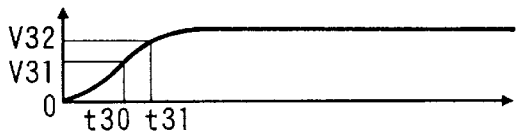
(c) OUTPUT OF ACCELERATION SENSOR 412 
(d) RESULT OF INTEGRATION OF OUTPUT OF ACCELERATION SENSOR 412 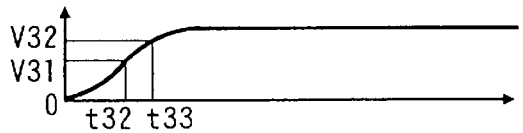
(e) STATE OF TRANSISTOR 416 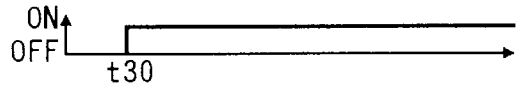
(f) STATE OF TRANSISTOR 414 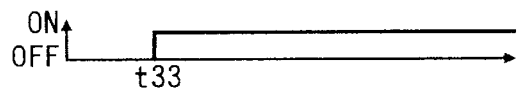
(g) STATE OF SQUIB 415 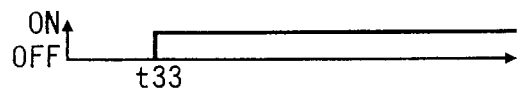
(h) STATE OF TRANSISTOR 418 
(i) STATE OF TRANSISTOR 420 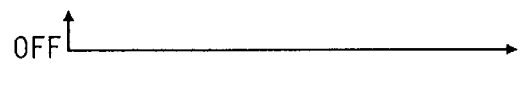
(j) STATE OF SQUIB 419 
TIME

FIG. 38
(a) OUTPUT OF ACCELERATION SENSOR 411 
(b) RESULT OF INTEGRATION OF OUTPUT OF ACCELERATION SENSOR 411 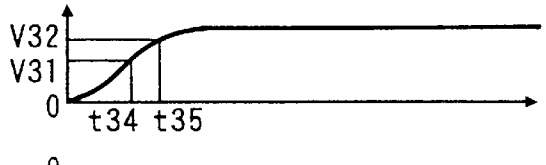
(c) OUTPUT OF ACCELERATION SENSOR 412 
(d) RESULT OF INTEGRATION OF OUTPUT OF ACCELERATION SENSOR 412 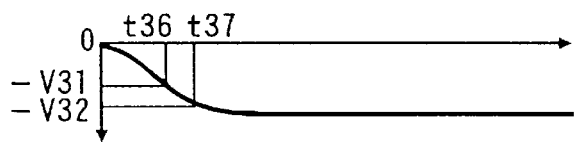
(e) STATE OF TRANSISTOR 416 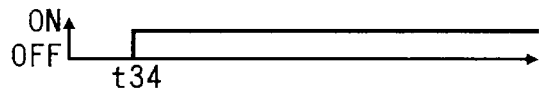
(f) STATE OF TRANSISTOR 414 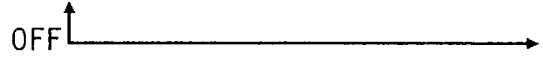
(g) STATE OF SQUIB 415 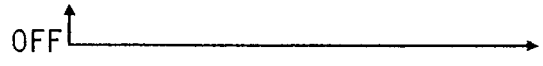
(h) STATE OF TRANSISTOR 418 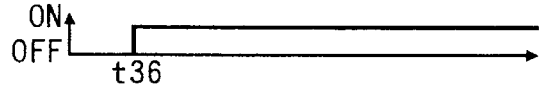
(i) STATE OF TRANSISTOR 420 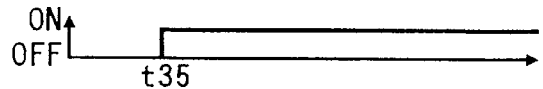
(j) STATE OF SQUIB 419 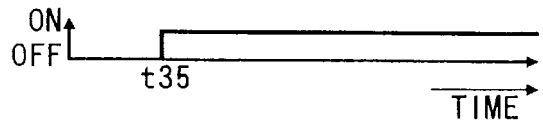
TIME

FIG. 41
(a) OUTPUT OF ACCELERATION SENSOR 611 
(b) RESULT OF INTEGRATION OF OUTPUT OF ACCELERATION SENSOR 611 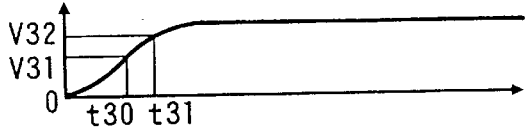
(c) OUTPUT OF ACCELERATION SENSOR 621 
(d) RESULT OF INTEGRATION OF OUTPUT OF ACCELERATION SENSOR 621 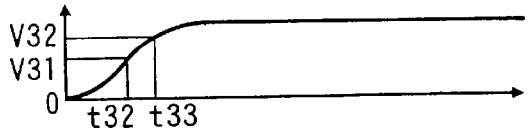
(e) STATE OF TRANSISTOR 616 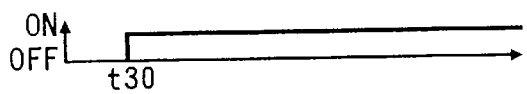
(f) STATE OF TRANSISTOR 614 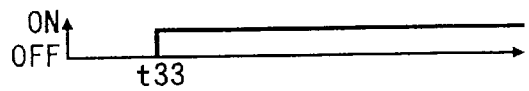
(g) STATE OF SQUIB 615 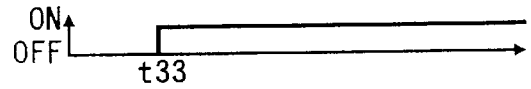
(h) STATE OF TRANSISTOR 626 
(i) STATE OF TRANSISTOR 624 
(j) STATE OF SQUIB 625 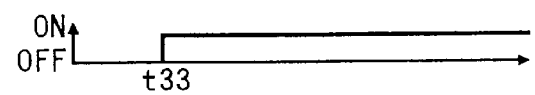
(k) STATES OF TRANSISTORS 618, 620, 628, 630 
(l) STATES OF SQUIBS 619, 629 
TIME

FIG. 42
(a) OUTPUT OF ACCELERATION SENSOR 611 
(b) RESULT OF INTEGRATION OF OUTPUT OF ACCELERATION SENSOR 611 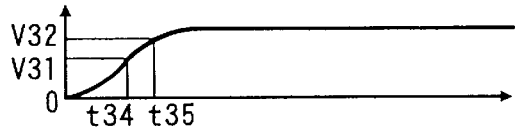
(c) OUTPUT OF ACCELERATION SENSOR 621 
(d) RESULT OF INTEGRATION OF OUTPUT OF ACCELERATION SENSOR 621 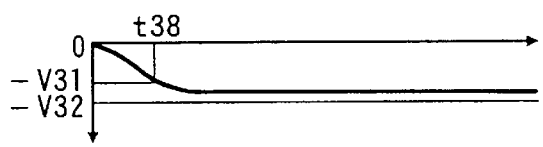
(e) STATE OF TRANSISTOR 620 
(f) STATE OF TRANSISTOR 618 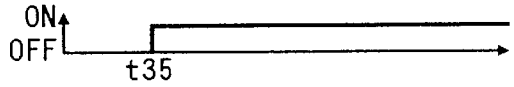
(g) STATE OF SQUIB 619 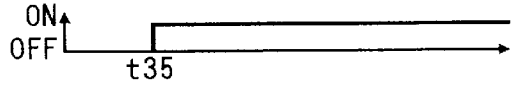
(h) STATES OF TRANSISTORS 624, 626, 628, 630 
(i) STATES OF SQUIBS 625, 629 
(j) STATES OF TRANSISTORS 614, 616 
(k) STATE OF SQUIB 615 
TIME

TRIGGERING DEVICE FOR SAFETY APPARATUS

CROSS-REFERENCES TO RELATED APPLICATIONS

This is a continuation-in-part of United States patent application, Ser. No. 08/658,667, filed on Jun. 4, 1996 now U.S. Pat. No. 5,904,723.

BACKGROUND OF THE INVENTION

1. Field of the Invention

This invention relates to a triggering device for a vehicle occupant safety apparatus such as an air-bag apparatus or a vehicle safety-belt pretensioner (tightener).

2. Description of the Related Art

U.S. Pat. No. 5,107,245 discloses a control arrangement for the occupant restraint system of an automotive vehicle which includes an acceleration pickup for sensing deceleration of the vehicle and providing an acceleration signal. A trip device is in the occupant restraint system. A microcomputer processes the acceleration signal. The microcomputer supplies one or more trip signals to the trip device when the result of processing of the acceleration signal fulfills a criterion for activation of the occupant restraint system. A monitoring circuit external to the microcomputer includes an associated stable oscillator providing a reference signal. The monitoring circuit serves to monitor, as to correct frequency by comparison with the reference signal, a check signal derived from a clock signal of the microcomputer. The monitoring circuit produces an enable signal when the check signal has the correct frequency. The monitoring circuit activates an indicating means when the check signal is found to be incorrect. The monitoring circuit prevents the supply of the trip signal to the trip device in response to the disappearance of the enable signal.

U.S. Pat. No. 5,359,515 corresponding to Japanese published PCT application 4-506495 discloses a vehicle occupant safety system which includes a sensor device having at least two sensors, and a processing device having at least two processing circuits for the respective sensor signals. The vehicle occupant safety system in U.S. Pat. No. 5,359,515 further includes a computing system and a trigger circuit each having at least two stages for a safety device. For providing a high degree of safety with relatively low costs, the computing system is constructed as a single-computer system in such a way that it processes the data of the two processing circuits in two programs with staggered timing with respect to one another.

Japanese published unexamined patent application 5-69791 discloses a side-crash sensing system for automotive side air-bag devices in which an air-bag trigger component is controlled in response to the output signals of plural acceleration sensors.

Japanese published unexamined patent application 5-38998 discloses an arrangement of acceleration sensors for an automotive air-bag device. Specifically, in the sensor arrangement of Japanese application 5-38998, a crash sensor is located at a center of a front of a vehicle body outside a passenger compartment, and two crash sensors are located near front-right and front-left vehicle wheels respectively. The former crash sensor is referred to as the central crash sensor while the latter crash sensors are called the side crash sensors. As viewed from above, the three crash sensors extend at the corners of an isosceles triangle respectively. In addition, a safety sensor is disposed in the passenger compartment within the vehicle body. The three crash sensors are electrically connected in parallel. The safety sensor is electrically connected in series with the parallel combination of the crash sensors. When the safety sensor and at least one of the crash sensors simultaneously fall into ON states, the air-bag device is triggered and activated. A frontal collision can be quickly detected by the central crash sensor. Offset collisions can be detected by the side crash sensors. Collisions against front pillars of the vehicle body can also be detected by the side crash sensors.

U.S. Pat. No. 5,072,966 corresponding to Japanese published unexamined patent application 3-273959 discloses an energy absorbing structure for a vehicle body side portion which includes a pair of vehicle body members constituting two side portions of a vehicle body, and a pair of collision detection sensors for respectively detecting collisions on two side surfaces of the vehicle body. In addition, one air bag is provided in each vehicle body member. Each air bag can be unfolded toward the interior of a passenger room, and can receive at least one passenger who is moved sideways by a side collision. In the energy absorbing structure of U.S. Pat. No. 5,072,966, a timing varying unit serves to change the unfolding timings of the two air bags in accordance with a side-collision direction on the basis of detection results from the collision detection sensors. The air bags are unfolded in accordance with the unfolding timings set by the timing varying unit.

Japanese published unexamined patent application 5-270355 discloses an arrangement of G sensors for a flat floor vehicle which detects not only longitudinal gravity but also a yaw rate through easy computation without disturbing free walking of occupants in a vehicle room. In the arrangement disclosed by Japanese application 5-270355, right and left G sensors are located at laterally symmetrical positions about the central longitudinal line of a vehicle body on which the center of gravity of the vehicle is present. Both the G sensors are on a vehicle floor panel outside a walk-through region. The right G sensor extends below a right front seat while the left G sensor extends below a left front seat.

Japanese published unexamined utility model application 6-79667 discloses an air-bag apparatus for an automotive vehicle which includes a sensor for detecting a shock from the front, and two sensors for detecting shocks in transverse directions. These sensors are located in a front portion of a vehicle body. Air bags respond to the output signals of the sensors. The air bags are located in front and at side of a driver's seat and a passenger's seat respectively.

SUMMARY OF THE INVENTION

It is an object of this invention to provide an improved triggering device for a vehicle occupant safety apparatus.

A first aspect of this invention provides a triggering device for a safety apparatus, comprising first detection means including at least one first sensor located in a right-hand portion of a vehicle for detecting a deceleration acting on the vehicle in at least one of a longitudinal direction and a lateral direction of the vehicle; second detecting means including at least one second sensor located in a left-hand portion of the vehicle for detecting a deceleration acting on the vehicle in at least one of the longitudinal direction and the lateral direction of the vehicle; and controlling means for triggering the safety apparatus in response to at least two out of detection values related to the longitudinal direction and detection values related to the lateral direction which are generated by the first and second sensors.

A second aspect of this invention is based on the first aspect thereof, and provides a triggering device wherein the safety apparatus comprises at least one of front air-bag devices for a driver's seat and a front passenger's seat, and the controlling means is operative for triggering the safety apparatus in response to at least two detection values related to the longitudinal direction which are generated by the first and second sensors.

A third aspect of this invention is based on the first aspect thereof, and provides a triggering device wherein the safety apparatus comprises at least one of side air-bag devices for a driver's seat and a front passenger's seat, and the controlling means is operative for triggering the safety apparatus in response to at least two detection values related to the lateral direction which are generated by the first and second sensors.

A fourth aspect of this invention is based on the first aspect thereof, and provides a triggering device wherein each of the first detecting means and the second detecting means comprises one first sensor and one second sensor corresponding to a deceleration in the longitudinal direction and a deceleration in the lateral direction respectively.

A fifth aspect of this invention is based on the first aspect thereof, and provides a triggering device wherein each of the first and second sensors outputs a detection value depending on a deceleration, and has a detection surface, and wherein a direction perpendicular to the detection surface of each of the first and second sensors forms a predetermined angle with respect to the longitudinal direction of the vehicle in an approximately horizontal plane, and each of the first and second sensors detects a deceleration in the longitudinal direction and a deceleration in the lateral direction.

A sixth aspect of this invention is based on the fifth aspect thereof, and provides a triggering device wherein each of the first and second sensors outputs a detection value having a polarity which depends on a direction of a deceleration, and the controlling means is operative for triggering the safety apparatus in response to a combination of the polarities of the detection values generated by the first and second sensors.

A seventh aspect of this invention Is based on the fifth aspect thereof, and provides a triggering device wherein each of the first detecting means and the second detecting means comprises a pair of the first and second sensors outputting the detection values having the polarities which depend on a direction of a deceleration, and the controlling means is operative for triggering the safety apparatus in response to a combination of the polarities of the detection values generated by the first and second sensors in one of the first detecting means and the second detecting means.

An eighth aspect of this invention is based on the fifth aspect thereof, and provides a triggering device further comprising a third sensor for detecting a deceleration caused by an oblique collision, and the controlling means is operative for triggering the safety apparatus in response to a detection value generated by the third sensor and the detection value generated by one of the first and second sensors.

A ninth aspect of this invention is based on the first aspect thereof, and provides a triggering device further comprising units located in the right-hand portion and the left-hand portion of the vehicle respectively.

BRIEF DESCRIPTION OF THE DRAWINGS

FIG. 7 is a time-domain diagram of signals and conditions of components in the triggering device of FIG. 1.

FIG. 9 is a time-domain diagram of signals and conditions of components in the triggering device of FIG. 1.

FIG. 14 is a time-domain diagram of signals and conditions of components in the triggering device of FIG. 10.

FIG. 16 is a block diagram of a triggering device according to a fourth embodiment of this invention.

FIG. 17 is a time-domain diagram of signals and conditions of components in the triggering device of FIG. 16.

FIG. 28 is a time-domain diagram of a first example of signals and conditions of components in the triggering device of FIG. 22.

FIG. 32 is a time-domain diagram of a third example of signals and conditions of components in the triggering device of FIG. 22.

FIG. 37 is a time-domain diagram of a first example of signals and conditions of components in the triggering device of FIG. 33.

FIG. 38 is a time-domain diagram of a second example of signals and conditions of components in the triggering device of FIG. 33.

FIG. 41 is a time-domain diagram of a first example of signals and conditions of components in the triggering device of FIG. 39.

FIG. 42 is a time-domain diagram of a second example of signals and conditions of components in the triggering device of FIG. 39.

DESCRIPTION OF THE PREFERRED EMBODIMENTS

First Embodiment

Figure 1:
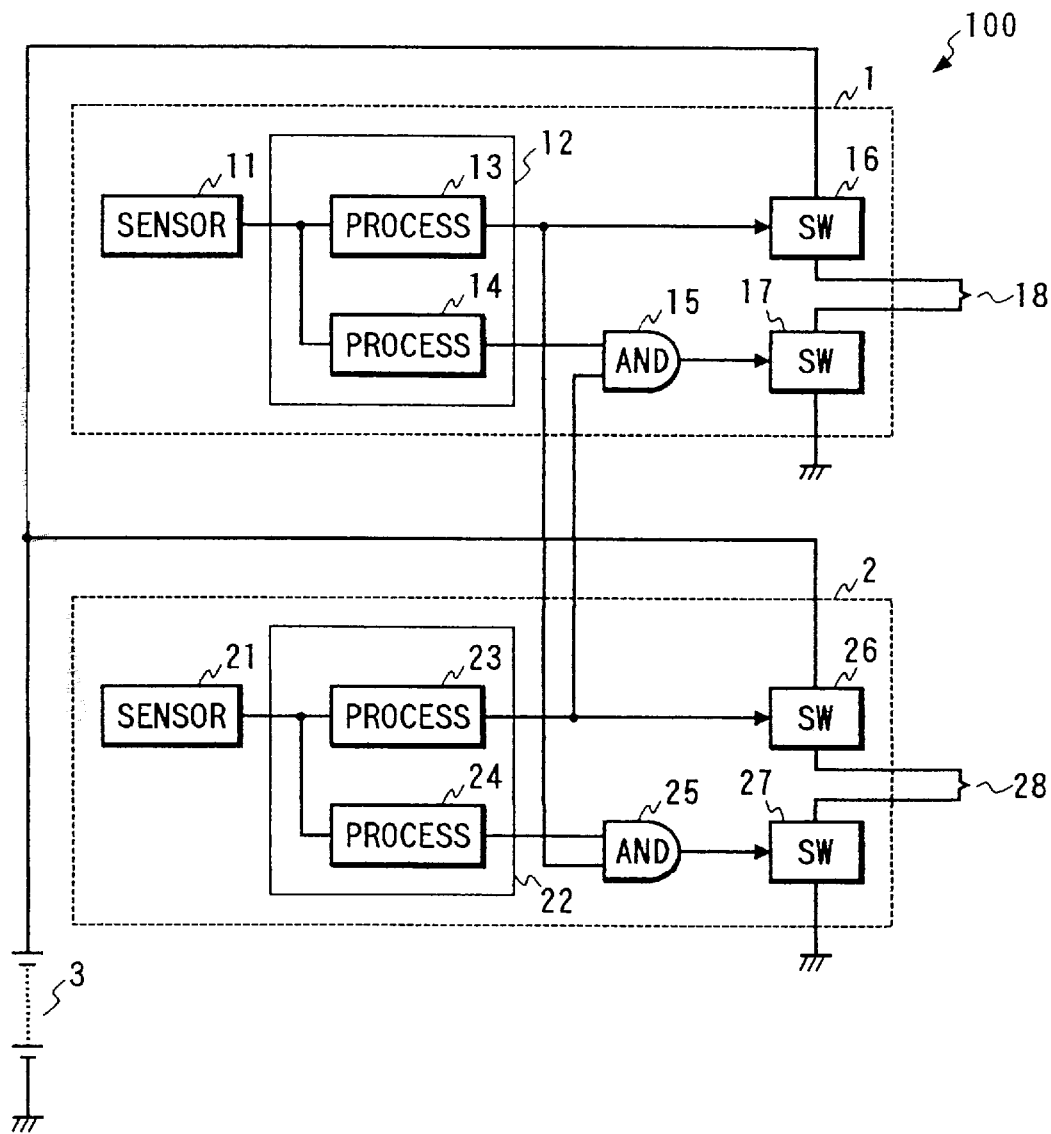
FIG. 1 is a block diagram of a triggering device according to a first embodiment of this invention.

With reference to FIG. 1, a triggering device 100 operates on air-bag devices (not shown) provided at right-hand and left-hand sides of an automotive vehicle respectively. The air-bag devices are located at, for example, right-hand and left-hand doors of the automotive vehicle respectively. The triggering device 100 activates at least one of the air-bag devices when a side of the automotive vehicle collides with an object.

The triggering device 100 includes a first main section 1, a second main section 2, a vehicle battery 3, a first trigger component 18, and a second trigger component 28. Each of the first and second main sections 1 and 2 detects the deceleration (or the acceleration) of the automotive vehicle, and generates a signal representing the detected deceleration. Each of the first and second main sections 1 and 2 processes the deceleration signal, and outputs a signal depending on the result of the processing of the deceleration signal. The first and second trigger components 18 and 28 follow the first and second main sections 1 and 2 respectively. The first and second trigger components 18 and 28 are of the electrically-powered type. The first and second trigger components 18 and 28 serve to activate the air-bag devices respectively. The first trigger component 18 is controlled by the output signal of the first main section 1. The second trigger component 28 is controlled by the output signal of the second main section 2. The vehicle battery 3 is connected to the first and second main sections 1 and 2. The vehicle battery 3 electrically powers the first and second main sections 1 and 2.

The first and second main sections 1 and 2 of the triggering device 100 are provided on regions of a vehicle body floor near the right-hand and left-hand doors respectively. The air-bag devices correspond to first and second safety devices respectively. The right-hand door and the left-hand door of the automotive vehicle correspond to first and second doors respectively.

The first main section 1 of the triggering device 100 includes an acceleration sensor 11, a signal processor 12, an AND circuit 15, and switches 16 and 17. The acceleration sensor 11 detects deceleration (or acceleration) of the body of the automotive vehicle, and outputs a detection signal representative thereof. The signal processor 12 follows the acceleration sensor 11. The signal processor 12 integrates and processes the detection signal outputted from the acceleration sensor 11. The switch 16 follows the signal processor 12. The AND circuit 15 follows the signal processor 12. The switch 17 follows the AND circuit 15. The switch 16, the first trigger component 18, and the switch 17 are connected in series with the vehicle battery 3. The first trigger component 18 is energized in response to the result of AND operation between the switches 16 and 17.

The second main section 2 of the triggering device 100 includes an acceleration sensor 21, a signal processor 22, an AND circuit 25, and switches 26 and 27. The acceleration sensor 21 detects deceleration (or acceleration) of the body of the automotive vehicle, and outputs a detection signal representative thereof. The signal processor 22 follows the acceleration sensor 21. The signal processor 22 integrates and processes the detection signal outputted from the acceleration sensor 21. The switch 26 follows the signal processor 22. The AND circuit 25 follows the signal processor 22. The switch 27 follows the AND circuit 25. The switch 26, the second trigger component 28, and the switch 27 are connected in series with the vehicle battery 3. The second trigger component 28 is energized in response to the result of AND operation between the switches 26 and 27.

The acceleration sensors 11 and 21 correspond to first and second deceleration detecting means respectively. The signal processors 12 and 22 correspond to first and second signal processing means respectively. The AND circuit 15, the switches 16 and 17, and the first trigger component 18 compose first triggering means. The AND circuit 25, the switches 26 and 27, and the second trigger component 28 compose second triggering means. The acceleration sensors 11 and 21 are disposed in inner spaces within the right-hand and left-hand doors respectively. Alternatively, the acceleration sensors 11 and 21 may be fixedly located at positions near the right-hand and left-hand doors respectively.

The signal processor 12 includes first and second sub signal processors 13 and 14 using different threshold values (corresponding to processing levels) for crash judgment or collision decision respectively. The first and second sub signal processors 13 and 14 correspond to first and second signal processors respectively. The first and second sub signal processors 13 and 14 receive the detection signal from the acceleration sensor 11. The first sub signal processor 13 is followed by the switch 16 and a first input terminal of the AND circuit 25. The second sub signal processor 14 is followed by a first input terminal of the AND circuit 15. Each of the first and second sub signal processors 13 and 14 includes a combination of an integrating circuit and a comparator. Each of the first and second sub signal processors 13 and 14 integrates the detection signal outputted from the acceleration sensor 11, and outputs a high-level signal when the resultant integration value reaches a given threshold value.

The signal processor 22 includes first and second sub signal processors 23 and 24 using different threshold values (corresponding to processing levels) for crash judgment or collision decision respectively. The first and second sub signal processors 23 and 24 correspond to third and fourth signal processors respectively. The first and second sub signal processors 23 and 24 receive the detection signal from the acceleration sensor 21. The first sub signal processor 23 is followed by the switch 26 and a second input terminal of the AND circuit 15. The second sub signal processor 24 is followed by a second input terminal of the AND circuit 25. Each of the first and second sub signal processors 23 and 24 includes a combination of an integrating circuit and a comparator. Each of the first and second sub signal processors 23 and 24 integrates the detection signal outputted from the acceleration sensor 21, and outputs a high-level signal when the resultant integration value reaches a given threshold value.

Figure 2:
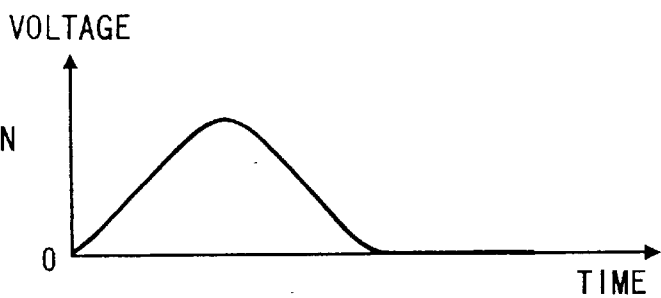
FIG. 2 is a time-domain diagram of the output signal of an acceleration sensor in the triggering device of FIG. 1.
Figure 3:
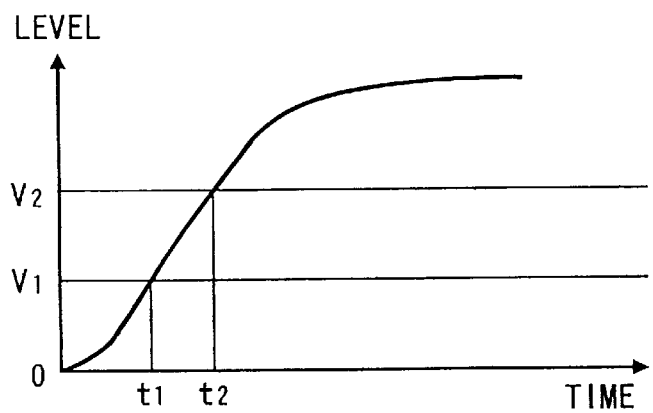
FIG. 3 is a time-domain diagram of the output signal of an integrating circuit in a first sub signal processor in the triggering device of FIG. 1.
Figure 4:
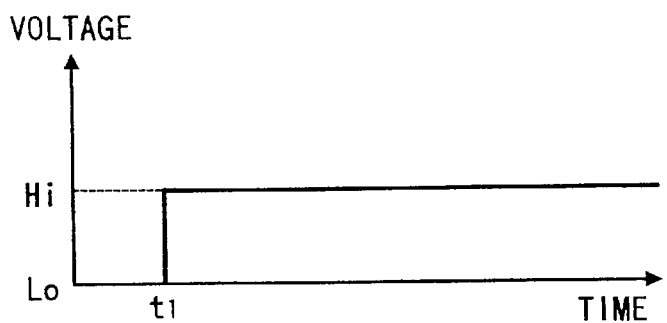
FIG. 4 is a time-domain diagram of the output signal of a comparator in the first sub signal processor in the triggering device of FIG. 1.
Figure 5:
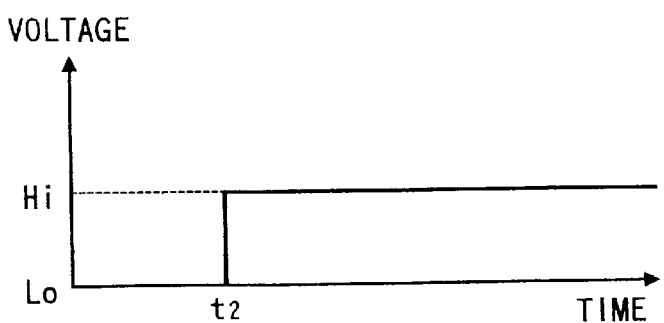
FIG. 5 is a time-domain diagram of the output signal of a comparator in a second sub signal processor in the triggering device of FIG. 1.

It is now assumed that the acceleration sensor 11 detects deceleration of the automotive vehicle, and the voltage of the output signal of the acceleration sensor 11 varies as shown in FIG. 2. As previously described, the integrating circuit in each of the first and second sub signal processors 13 and 14 integrates the output signal of the acceleration sensor 11. The integrating circuit in each of the first and second sub signal processors 13 and 14 generates an integration-resultant signal which varies as shown in FIG. 3. A given threshold value (a given threshold voltage) V1 used by the first sub signal processor 13 is smaller than a given threshold value (a given threshold voltage) V2 used by the second sub signal processor 14. With reference to FIG. 3, the integration-resultant signal reaches the given threshold value V1 at a moment t1, and then reaches the given threshold value V2 at a moment t2. As shown in FIG. 4, the comparator in the first sub signal processor 13 starts to output a high-level signal at the moment t1 in response to the related integration-resultant 25 the As shown in FIG. 5, the comparator in the second sub signal processor 14 starts to output a high-level signal at the moment t2 in response to the related integration resultant signal.

As previously described, the integrating circuit in each of the first and second sub signal processors 23 and 24 integrates the output signal of the acceleration sensor 21. The integrating circuit in each of the first and second sub signal processors 23 and 24 generates an integration-resultant signal. A given threshold value (a given threshold voltage) V3 used by the first sub signal processor 23 is smaller than a given threshold value (a given threshold voltage) V4 used by the second sub signal processor 24. The comparator in the first sub signal processor 23 outputs a high-level signal or a low-level signal in response to the related integration-resultant signal. The comparator in the second sub signal processor 24 outputs a high-level signal or a low-level signal in response to the related integration-resultant signal.

The AND circuit 15 executes AND operation between the output signal of the sub signal processor 14 in the first main section 1 and the output signal of the sub signal processor 23 in the second main section 2. The AND circuit 15 outputs a signal representative of the AND-operation result to the control terminal of the switch 17 in the first main section 1. The AND circuit 25 executes AND operation between the output signal of the sub signal processor 13 in the first main section 1 and the output signal of the sub signal processor 24 in the second main section 2. The AND circuit 25 outputs a signal representative of the AND-operation result to the control terminal of the switch 27 in the second main section 2.

The control terminal of the switch 16 is connected to the output terminal of the first sub signal processor 13 in the first main section 1. The control terminal of the switch 26 is connected to the output terminal of the first sub signal processor 23 in the second main section 2. The switch 16, the first trigger component 18, and the switch 17 are connected in series with the vehicle battery 3. The switch 26, the second trigger component 28, and the switch 27 are connected in series with the vehicle battery 3.

Figure 6:
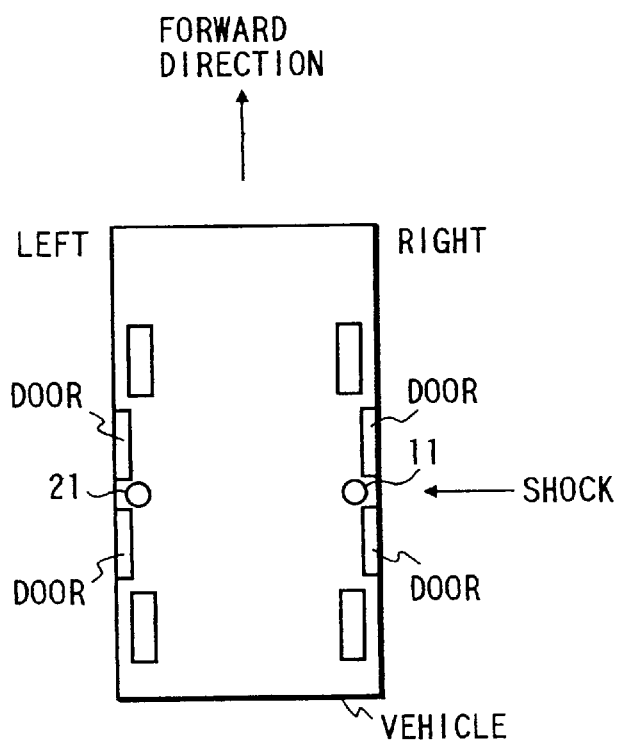
FIG. 6 is a diagram of an automotive vehicle and acceleration sensors.

The triggering device 100 operates as follows. It is now assumed that as shown in FIG. 6, the right-hand side of the automotive vehicle collides with an object. The acceleration sensors 11 and 12 detect deceleration (or acceleration) of the automotive vehicle which is caused by the collision. In this case, the voltage of the output signal of the acceleration sensor 11 which is located at the right-hand side of the automotive vehicle varies such as shown in the portion (a) of FIG. 7 while the voltage of the output signal of the acceleration sensor 21 which is located at the left-hand side of the automotive vehicle varies such as shown in the portion (c) of FIG. 7. During the collision, the voltage of the output signal of the right-side acceleration sensor 11 is greater than the voltage of the output signal of the left-side acceleration sensor 21.

The detection signals are inputted into the signal processors 12 and 22 from the acceleration sensors 11 and 21 respectively.

The detection signal inputted into the signal processor 12 is processed by the first and second sub signal processors 13 and 14 in response to the different threshold values V1 and V2 respectively. The detection signal inputted into the signal processor 22 is processed by the first and second sub signal processors 23 and 24 in response to the different threshold values V3 and V4 respectively.

The output signal of the acceleration sensor 11 is integrated and processed by the integrating circuit in each of the first and second sub signal processors 13 and 14. The integrating circuit in each of the first and second sub signal processors 13 and 14 generates an integration-resultant signal which varies as shown in the portion (b) of FIG. 7. The integration-resultant signal reaches the given threshold value V1 in the first sub signal processor 13 at a moment t1, and then reaches the given threshold value V2 in the second sub signal processor 14 at a moment t2.

The output signal of the acceleration sensor 21 is integrated and processed by the integrating circuit in each of the first and second sub signal processors 23 and 24. The integrating circuit in each of the first and second sub signal processors 23 and 24 generates an integration-resultant signal which varies as shown in the portion (d) of FIG. 7. The integration-resultant signal reaches the given threshold value V3 in the first sub signal processor 23 at a moment t3. During the collision, the voltage of the output signal of the left-side acceleration sensor 21 is smaller than the voltage of the output signal of the right-side acceleration sensor 11. In addition, the level of the integration-resultant signal in the second sub signal processor 24 remains smaller than the given threshold value V4.

As shown in the portion (e) of FIG. 7, the first sub signal processor 13 in the first main section 1 starts to output a high-level signal at the moment t1 at which the related integration-resultant signal reaches the given threshold value V1. As shown in the portion (f) of FIG. 7, the second sub signal processor 14 in the first main section 1 starts to output a high-level signal at the moment t2 at which the related integration-resultant signal reaches the given threshold value V2. The moment t2 follows the moment t1. As shown in the portion (j) of FIG. 7, the switch 16 assumes an ON state in response to the high-level signal outputted from the first sub signal processor 13.

As shown in the portion (g) of FIG. 7, the first sub signal processor 23 in the second main section 2 starts to output a high-level signal at the moment t3 at which the related integration-resultant signal reaches the given threshold value V3. The moment t3 exists between the moments t1 and t2. The integration-resultant signals in the sub signal processors 14 and 23 reach the given threshold values V2 and V3 respectively. At the moment t2, both the two input signals to the AND circuit 15 are in high-level states so that the AND circuit 15 starts to output a high-level signal to the switch 17 as shown in the portion (i) of FIG. 7. As shown in the portion (k) of FIG. 7, the switch 17 assumes an ON state in response to the high-level signal outputted from the AND circuit 15.

In this way, both the switches 16 and 17 assume the ON states upon the collision of the right-hand side of the automotive vehicle with the object. Thus, as shown in the portion (1) of FIG. 7, at the moment t2, the first trigger component 18 is energized and is changed to an ON state so that the air-bag device at the right-hand side of the automotive vehicle is activated.

As previously described, the first sub signal processor 23 in the second main section 2 starts to output a high-level signal at the moment t3 at which the related integration-resultant signal reaches the given threshold value V3. As shown in the portion (n) of FIG. 7, the switch 26 assumes an ON state in response to the high-level signal outputted from the first sub signal processor 23. As previously described, the level of the integration-resultant signal in the second sub signal processor 24 remains smaller than the given threshold value V4. Thus, as shown in the portion (h) of FIG. 7, the second sub signal processor 24 continues to output a low-level signal to the AND circuit 25. The low-level signal outputted from the second sub signal processor 24 to the AND circuit 25 causes the AND circuit 25 to continuously output a low-level signal to the switch 27 as shown in the portion (m) of FIG. 7. Therefore, the switch 27 remains in an OFF state as shown in the portion (o) of FIG. 7. Thus, the second trigger component 28 continues to be in an OFF state as shown in the portion (p) of FIG. 7 so that the air-bag device at the left-hand side of the automotive vehicle is not activated.

In this way, only the air-bag device at the right-hand side of the automotive vehicle can be activated upon a collision of the right-hand side of the automotive vehicle with an object.

Figure 8:
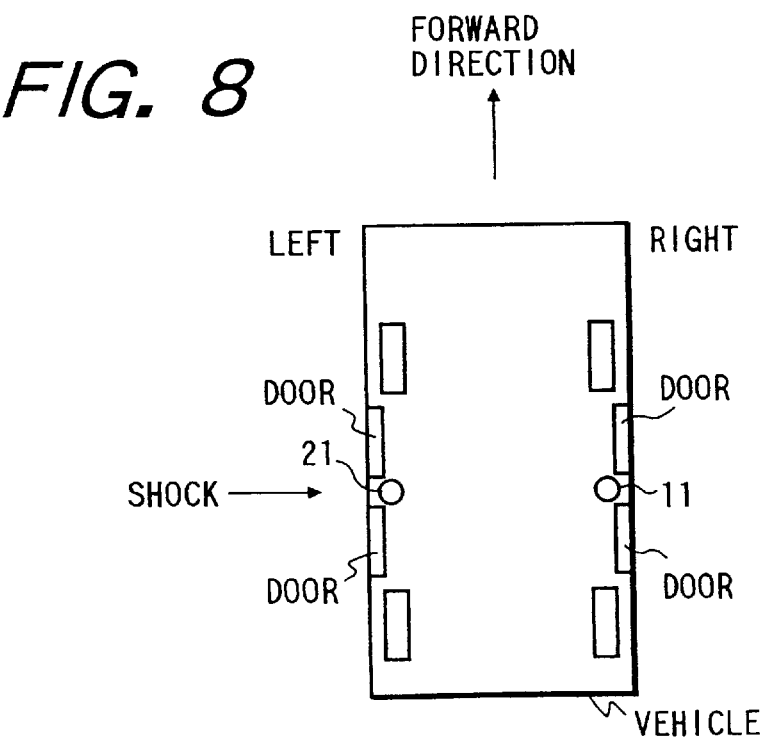
FIG. 8 is a diagram of an automotive vehicle and acceleration sensors.

It is now assumed that as shown in FIG. 8, the left-hand side of the automotive vehicle collides with an object. The acceleration sensors 11 and 12 detect deceleration (or acceleration) of the automotive vehicle which is caused by the collision. In this case, the voltage of the output signal of the acceleration sensor 11 which is located at the right-hand side of the automotive vehicle varies such as shown in the portion (a) of FIG. 9 while the voltage of the output signal of the acceleration sensor 21 which is located at the left-hand side of the automotive vehicle varies such as shown in the portion (c) of FIG. 9. During the collision, the voltage of the output signal of the left-side acceleration sensor 21 is greater than the voltage of the output signal of the right-side acceleration sensor 11.

The detection signals are inputted into the signal processors 12 and 22 from the acceleration sensors 11 and 21 respectively. The detection signal inputted into the signal processor 12 is processed by the first and second sub signal processors 13 and 14 in response to the different threshold values V1 and V2 respectively. The detection signal inputted into the signal processor 22 is processed by the first and second sub signal processors 23 and 24 in response to the different threshold values V3 and V4 respectively.

The output signal of the acceleration sensor 11 is integrated and processed by the integrating circuit in each of the first and second sub signal processors 13 and 14. The integrating circuit in each of the first and second sub signal processors 13 and 14 generates an integration-resultant signal which varies as shown in the portion (b) of FIG. 9. The integration-resultant signal reaches the given threshold value VI in the first sub signal processor 13 at a moment t1. During the collision, the voltage of the output signal of the right-side acceleration sensor 11 is smaller than the voltage of the output signal of the left-side acceleration sensor 21. In addition, the level of the integration-resultant signal in the second sub signal processor 14 remains smaller than the given threshold value V2.

The output signal of the acceleration sensor 21 is integrated and processed by the integrating circuit in each of the first and second sub signal processors 23 and 24. The integrating circuit in each of the first and second sub signal processors 23 and 24 generates an integration-resultant signal which varies as shown in the portion (d) of FIG. 9. The integration-resultant signal reaches the given threshold value V3 in the first sub signal processor 23 at a moment t3, and then reaches the given threshold value V4 in the second sub signal processor 24 at a moment t4. The moment t3 precedes the moment t1. The moment t4 follows the moment t1.

As shown in the portion (g) of FIG. 9, the first sub signal processor 23 in the second main section 2 starts to output a high-level signal at the moment t3 at which the related integration resultant signal reaches the given threshold value V3. As shown in the portion (h) of FIG. 9, the second sub signal processor 24 in the second main section 2 starts to output a high-level signal at the moment t4 at which the related integration-resultant signal reaches the given threshold value V4. The moment t4 follows the moment t3. As shown in the portion (n) of FIG. 9, the switch 26 assumes an ON state in response to the high-level signal outputted from the first sub signal processor 23.

As shown in the portion (e) of FIG. 9, the first sub signal processor 13 in the first main section 1 starts to output a high-level signal at the moment t1 at which the related integration-resultant signal reaches the given threshold value V1. The moment t1 exists between the moments t3 and t4. The integration-resultant signals in the sub signal processors 13 and 24 reach the given threshold values V1 and V4 respectively. At the moment t4, both the two input signals to the AND circuit 25 are in high-level states so that the AND circuit 25 starts to output a high-level signal to the switch 27 as shown in the portion (m) of FIG. 9. As shown in the portion (o) of FIG. 9, the switch 27 assumes an ON state in response to the high-level signal outputted from the AND circuit 25.

In this way, both the switches 26 and 27 assume the ON states upon the collision of the left-hand side of the automotive vehicle with the object. Thus, as shown in the portion (p) of FIG. 9, at the moment t4, the second trigger component 28 is energized and is changed to an ON state so that the air-bag device at the left-hand side of the automotive vehicle is activated.

As previously described, the first sub signal processor 13 in the first main section 1 starts to output a high-level signal at the moment t1 at which the related integration-resultant signal reaches the given threshold value V1. As shown in the portion (j) of FIG. 9, the switch 16 assumes an ON state in response to the high-level signal outputted from the first sub signal processor 13. As previously described, the level of the integration-resultant signal in the second sub signal processor 14 remains smaller than the given threshold value V2. Thus, as shown in the portion (f) of FIG. 9, the second sub signal processor 14 continues to output a low-level signal to the AND circuit 15. The low-level signal outputted from the second sub signal processor 14 to the AND circuit 15 causes the AND circuit 15 to continuously output a low-level signal to the switch 17 as shown in the portion (i) of FIG. 9. Therefore, the switch 17 remains in an OFF state as shown in the portion (k) of FIG. 9. Thus, the first trigger component 18 continues to be in an OFF state as shown in the portion (1) of FIG. 9 so that the air-bag device at the right-hand side of the automotive vehicle is not activated.

In this way, only the air-bag device at the left-hand side of the automotive vehicle can be activated upon a collision of the left-hand side of the automotive vehicle with an object.

As previously described, the first main section 1 includes the AND circuit 15 and the switch 17. The AND circuit 15 executes AND operation between the output signal of the sub signal processor 14 in the first main section 1 and the output signal of the sub signal processor 23 in the second main section 2. The switch 17 which follows the AND circuit 15 operates in response to the result of the AND operation by the AND circuit 15. Accordingly, the first trigger component 18, that is, the air-bag device at the right-hand side of the automotive vehicle, is controlled in response to both the output signals of the acceleration sensors 11 and 21. This design provides a redundancy in the acceleration-responsive control of the first trigger component 18, thereby making it possible to prevent the air-bag device at the right-hand side of the automotive vehicle from being activated by causes other than collisions. Specifically, even in the case where the integration-result signals in the first and second sub signal processors 13 and 14 reach the given threshold values VI and V2 respectively, the switch 17 remains in the OFF state provided that the integration-result signal in the sub signal processor 23 of the second main section 2 does not reach the given threshold value V3. This design enables reliable operation of the triggering device 100.

As previously described, the second main section 2 includes the AND circuit 25 and the switch 27. The AND circuit 25 executes AND operation between the output signal of the sub signal processor 24 in the second main section 2 and the output signal of the sub signal processor 13 in the first main section 1. The switch 27 which follows the AND circuit 25 operates in response to the result of the AND operation by the AND circuit 25. Accordingly, the second trigger component 28, that is, the air-bag device at the left-hand side of the automotive vehicle, is controlled in response to both the output signals of the acceleration sensors 11 and 21. This design provides a redundancy in the acceleration-responsive control of the second trigger component 28, thereby making it possible to prevent the air-bag device at the left-hand side of the automotive vehicle from being activated by causes other than collisions. Specifically, even in the case where the integration-result signals in the first and second sub signal processors 23 and 24 reach the given threshold values V3 and V4 respectively, the switch 27 remains in the OFF state provided that the integration-result signal in the sub signal processor 13 of the first main section 1 does not reach the given threshold value V1. This design enables reliable operation of the triggering device 100.

Although each of the first and second trigger components 18 and 28 responds to both the output signals of the acceleration sensors 11 and 21, there are the two acceleration sensors 11 and 21 and also the two trigger components 18 and 28. This design can implement a miniature structure and a low cost of the triggering device 100.

It should be noted that the first and second main sections 1 and 2 of the triggering device 100 may be provided on pillar portions, locker portions, or front portions of the vehicle body near the right-hand and left-hand doors respectively.

Each of the first and second trigger components 18 and 28 may respond to the output signals of three or more acceleration sensors. The triggering device 100 may be modified to operate on three or more air-bag devices. The triggering device 100 may be applied to air-bag devices which are designed for a frontal crash or an inclined crash.

The triggering device 100 may be additionally provided with a fail-safe function which compensates for the occurrence of a malfunction of one of the acceleration sensors 11 and 21. In an example of the fail-safe function, leading portions of collision-responsive changes in the output signals of the acceleration sensors 11 and 21 are detected, and each of the first and second trigger components 18 and 28 responds to one of the detected leading portions.

The air-bag devices may be replaced by other safety devices such as vehicle safety-belt pretensioners (tighteners).

Second Embodiment

Figure 10:
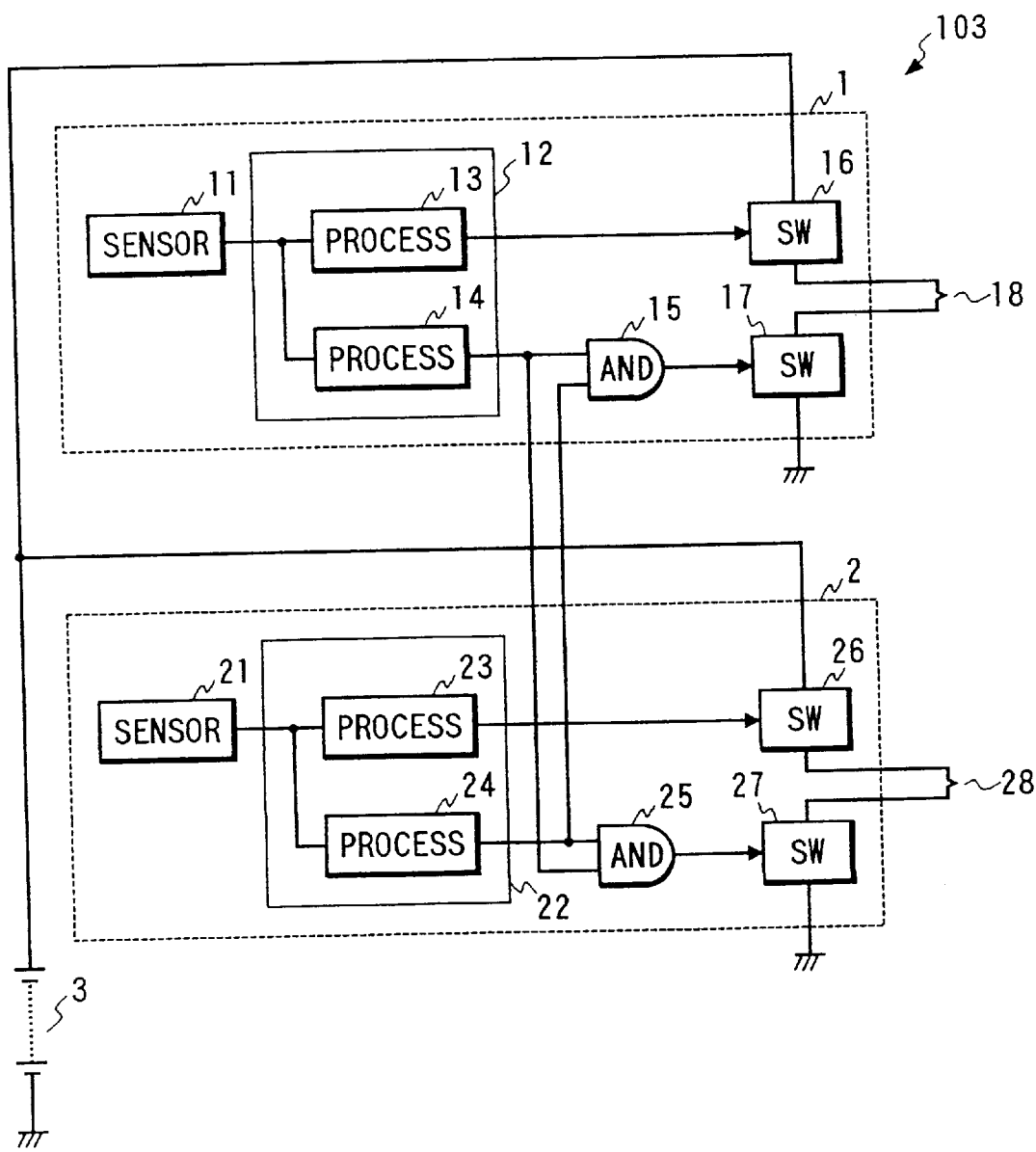
FIG. 10 is a block diagram of a triggering device according to a second embodiment of this invention.

FIG. 10 shows a triggering device 103 according to a second embodiment of this invention. The triggering device 103 is similar to the triggering device 100 of FIG. 1 except for design changes indicated hereinafter. In the triggering device 103, a first input terminal of an AND circuit 15 is connected to the output terminal of a second sub signal processor 14 in a first main section 1, and a second input terminal of the AND circuit 15 is connected to the output terminal of a second sub signal processor 24 in a second main section 2. In the triggering device 103, a first input terminal of an AND circuit 25 is connected to the output terminal of the second sub signal processor 24 in the second main section 2, and a second input terminal of the AND circuit 25 is connected to the output terminal of the second sub signal processor 14 in the first main section 1.

In the triggering device 103, each of the AND circuits 15 and 25 responds to the output signals of the sub signal processors 14 and 24. The sub signal processors 14 and 24 use given threshold values V2 and V4 which are greater than given threshold values V1 and V3 used by sub signal processors 13 and 23 respectively. A change of each of first and second trigger components 18 and 28 to an ON state is allowed provided that integration-result signals in the sub signal processors 14 and 24 reach the given threshold values V2 and V4 respectively. Since the given threshold values V1 and V3 are smaller than the given threshold values V2 and V4 respectively, integration-resultant signals in the sub signal processors 13 and 23 reach the given threshold values V1 and V3 respectively in the case where the integration-result signals in the sub signal processors 14 and 24 reach the given threshold values V2 and V4 respectively.

Accordingly, in the case where the integration-result signals in the sub signal processors 14 and 24 reach the given threshold values V2 and V4 respectively, switches 16 and 26 and also the switches 17 and 27 assume ON states respectively so that the first and second trigger components 18 and 28 change to the ON states at essentially the same time. Thus, in this case, two air-bag devices are activated at essentially the same time.

In the triggering device 103, it is preferable that acceleration sensors 11 and 21 are located in a same side of an automotive vehicle.

Figure 11:
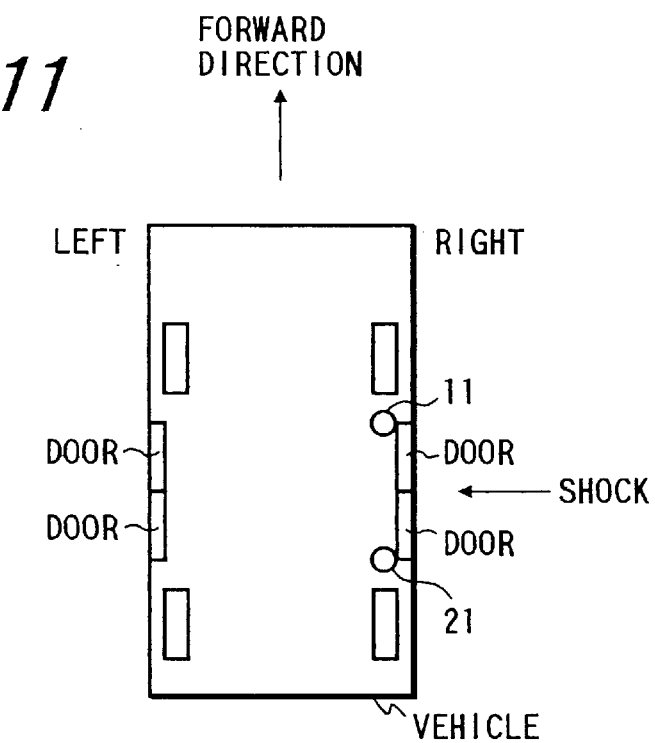
FIG. 11 is a diagram of an automotive vehicle and acceleration sensors.

As shown in FIG. 11, the acceleration sensors 11 and 21 are located near a right-hand front door and a right-hand rear door of the automotive vehicle respectively. The air-bag devices are provided at the right-hand front door and the right-hand rear door of the automotive vehicle respectively.

The triggering device 103 operates as follows. It is now assumed that as shown in FIG. 11, the right-hand side of the automotive vehicle collides with an object. The acceleration sensors 11 and 12 detect deceleration (or acceleration) of the automotive vehicle which is caused by the collision. Since the acceleration sensors 11 and 12 are provided at the same side of the automotive vehicle which undergoes the collision, the voltages of the output signals of the acceleration sensors 11 and 21 are approximately equal to each other and exhibit time-domain variations with large amplitudes as shown in the portions (a) and (c) of FIG. 12 respectively.

The detection signals are inputted into signal processors 12 and 22 from the acceleration sensors 11 and 21 respectively. The detection signal inputted into the signal processor 12 is processed by the first and second sub signal processors 13 and 14 in response to the different threshold values V1 and V2 respectively. The detection signal inputted into the signal processor 22 is processed by the first and second sub signal processors 23 and 24 in response to the different threshold values V3 and V4 respectively.

The output signal of the acceleration sensor 11 is integrated and processed by the integrating circuit in each of the first and second sub signal processors 13 and 14. The integrating circuit in each of the first and second sub signal processors 13 and 14 generates an integration-resultant signal which varies as shown in the portion (b) of FIG. 12. The integration-resultant signal reaches the given threshold value V1 in the first sub signal processor 13 at a moment t1, and then reaches the given threshold value V2 in the second sub signal processor 14 at a moment t2.

The output signal of the acceleration sensor 21 is integrated and processed by the integrating circuit in each of the first and second sub signal processors 23 and 24. The integrating circuit in each of the first and second sub signal processors 23 and 24 generates an integration-resultant signal which varies as shown in the portion (d) of FIG. 12. The integration-resultant signal reaches the given threshold value V3 in the first sub signal processor 23 at a moment t3, and then reaches the given threshold value V4 in the second sub signal processor 24 at a moment t4.

Figure 12:
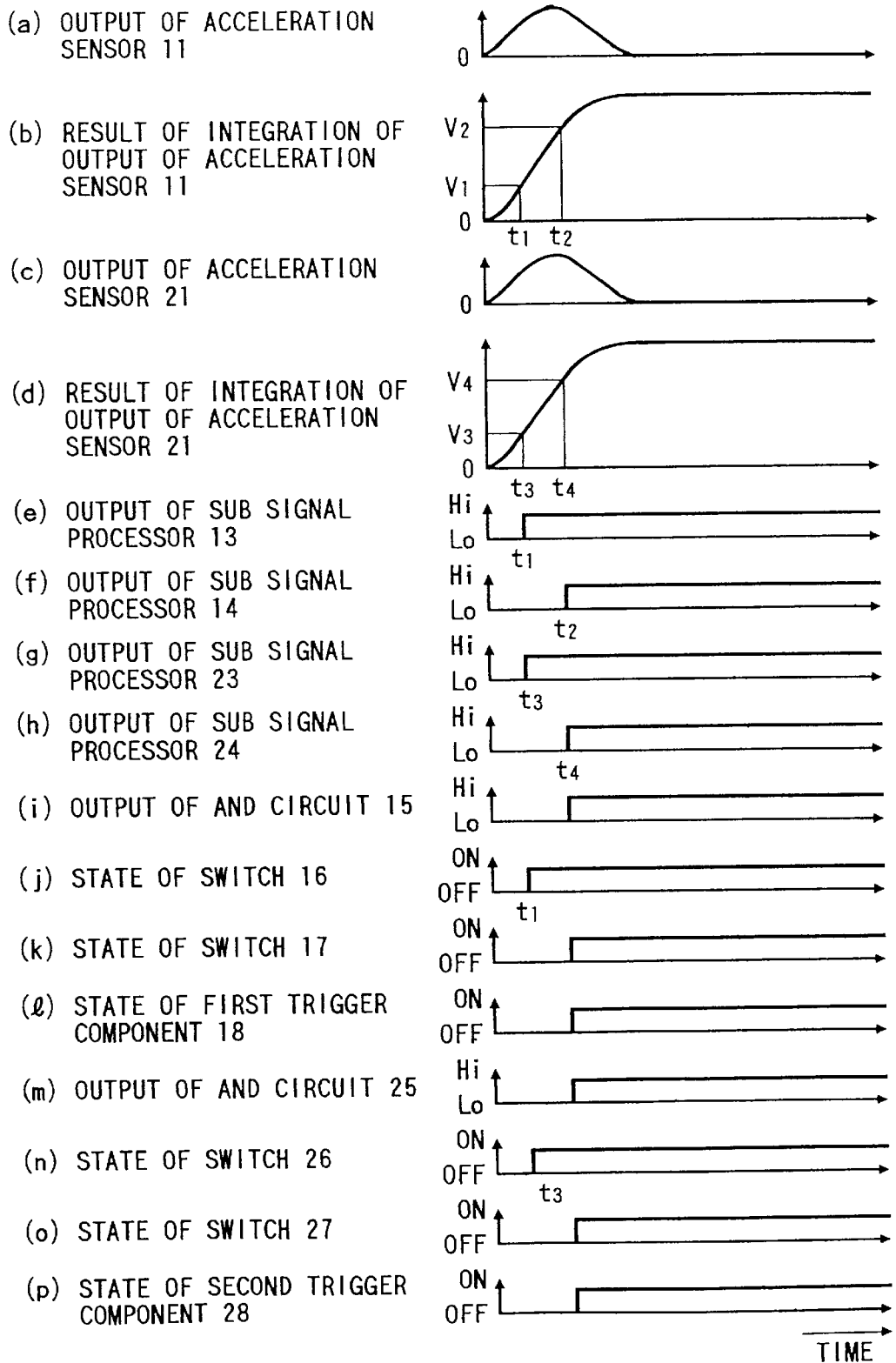
FIG. 12 is a time-domain diagram of signals and conditions of components in the triggering device of FIG. 10.

As shown in the portion (e) of FIG. 12, the first sub signal processor 13 in the first main section 1 starts to output a high-level signal at the moment t1 at which the related integration-resultant signal reaches the given threshold value V1. As shown in the portion (f) portion of FIG. 12, the second sub signal processor 14 in the first main section 1 starts to output a high-level signal at the moment t2 at which the related integration-resultant signal reaches the given threshold value V2. The moment t2 follows the moment t1. As shown in the portion (j) of FIG. 12, the switch 16 assumes an ON state in response to the high-level signal outputted from the first sub signal processor 13.

As shown in the portion (g) of FIG. 12, the first sub signal processor 23 in the second main section 2 starts to output a high-level signal at the moment t3 at which the related integration-resultant signal reaches the given threshold value V3. As shown in the portion (h) of FIG. 12, the second sub signal processor 24 in the second main section 2 starts to output a high-level signal at the moment t4 at which the related integration-resultant signal reaches the given threshold value V4. The moment t4 follows the moment t3. As shown in the portion (n) of FIG. 12, the switch 26 assumes an ON state in response to the high-level signal outputted from the first sub signal processor 23.

Since the integration-resultant signals in the sub signal processors 14 and 24 reach the given threshold values V2 and V4 respectively, both the two input signals to the AND circuit 15 are in high-level states so that the AND circuit 15 starts to output a high-level signal to the switch 17 as shown in the portion (i) of FIG. 12. As shown in the portion (k) of FIG. 12, the switch 17 assumes an ON state in response to the high-level signal outputted from the AND circuit 15. At substantially the same time, the AND circuit 25 starts to output a high-level signal to the switch 27 as shown in the portion (m) of FIG. 12. As shown in the portion (o) of FIG. 12, the switch 27 assumes an ON state in response to the high-level signal outputted from the AND circuit 25.

In this way, both the switches 16 and 17 assume the ON states upon the collision of the right-hand side of the automotive vehicle with the object. Thus, as shown in the portion (1) of FIG. 12, the first trigger component 18 is energized and is changed to an ON state so that the air-bag device at the right-hand front door of the automotive vehicle is activated. In addition, both the switches 26 and 27 assume the ON states upon the collision of the right-hand side of the automotive vehicle with the object. Thus, as shown in the portion (p) of FIG. 12, the second trigger component 28 is energized and is changed to an ON state so that the air-bag device at the right-hand rear door of the automotive vehicle is activated. The activation of the air-bag device at the right-hand rear door of the automotive vehicle is substantially simultaneous with the activation of the air-bag device at the right-hand front door of the automotive vehicle.

Figure 13:
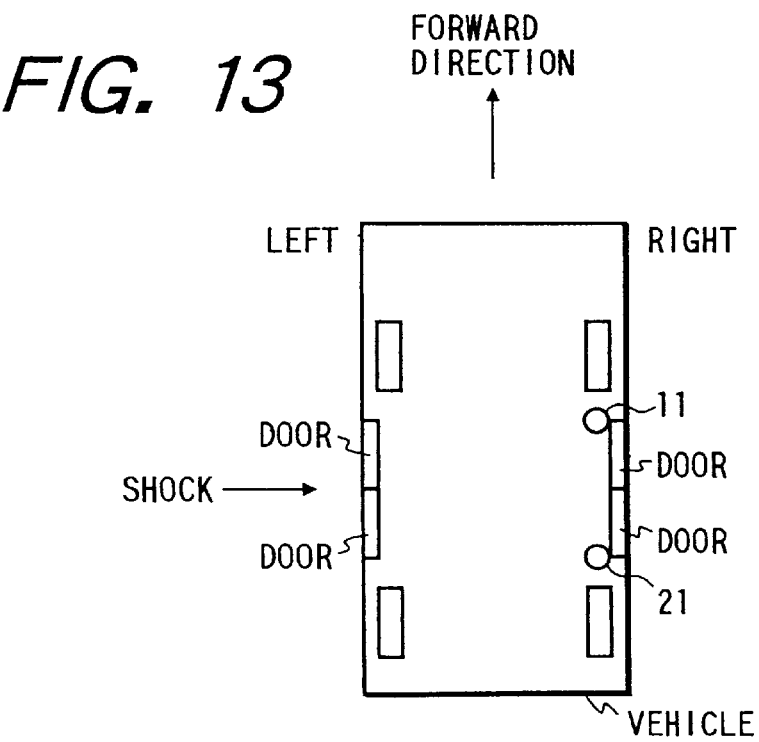
FIG. 13 is a diagram of an automotive vehicle and acceleration sensors.

It is now assumed that as shown in FIG. 13, the left-hand side of the automotive vehicle collides with an object. The acceleration sensors 11 and 12 detect deceleration (or acceleration) of the automotive vehicle which is caused by the collision. Since the acceleration sensors 11 and 12 are provided at the same side of the automotive vehicle which is remote from the position of the collision, the voltages of the output signals of the acceleration sensors 11 and 21 are approximately equal to each other and exhibit time-domain variations with small amplitudes as shown in the portions (a) and (c) of FIG. 14 respectively.

The detection signals are inputted into signal processors 12 and 22 from the acceleration sensors 11 and 21 respectively. The detection signal inputted into the signal processor 12 is processed by the first and second sub signal processors 13 and 14 in response to the different threshold values V1 and V2 respectively. The detection signal inputted into the signal processor 22 is processed by the first and second sub signal processors 23 and 24 in response to the different threshold values V3 and V4 respectively.

The output signal of the acceleration sensor 11 is integrated and processed by the integrating circuit in each of the first and second sub signal processors 13 and 14. The integrating circuit in each of the first and second sub signal processors 13 and 14 generates an integration-resultant signal which varies as shown in the portion (b) of FIG. 14. The integration-resultant signal reaches the given threshold value V1 in the first sub signal processor 13 at a moment t1 but does not reach the given threshold value V2 in the second sub signal processor 14. It should be noted that the given threshold value V2 is greater than the given threshold value V1.

The output signal of the acceleration sensor 21 is integrated and processed by the integrating circuit in each of the first and second sub signal processors 23 and 24. The integrating circuit in each of the first and second sub signal processors 23 and 24 generates an integration-resultant signal which varies as shown in the portion (d) of FIG. 14. The integration-resultant signal reaches the given threshold value V3 in the first sub signal processor 23 at a moment t3 but does not reach the given threshold value V4 in the second sub signal processor 24. It should be noted that the given threshold value V4 is greater than the given threshold value V3.

As shown in the portion (e) of FIG. 14, the first sub signal processor 13 in the first main section 1 starts to output a high-level signal at the moment t1 at which the related integration-resultant signal reaches the given threshold value V1. As shown in the portion (f) of FIG. 14, the second sub signal processor 14 in the first main section 1 continues to output a low-level signal since the integration-result signal in the second sub signal processor 14 does not reach the given threshold value V2. As shown in the portion (j) of FIG. 14, the switch 16 assumes an ON state in response to the high-level signal outputted from the first sub signal processor 13.

As shown in the portion (g) of FIG. 14, the first sub signal processor 23 in the second main section 2 starts to output a high-level signal at the moment t3 at which the related integration-resultant signal reaches the given threshold value V3. As shown in the portion (h) of FIG. 14, the second sub signal processor 24 in the second main section 2 continues to output a low-level signal since the integration-result signal in the second sub signal processor 24 does not reach the given threshold value V4. As shown in the portion (n) of FIG. 14, the switch 26 assumes an ON state in response to the high-level signal outputted from the first sub signal processor 23.

Since the integration-resultant signals in the sub signal processors 14 and 24 do not reach the given threshold values V2 and V4 respectively, both the two input signals to the AND circuit 15 are in low-level states so that the AND circuit 15 continues to output a low-level signal to the switch 17 as shown in the portion (i) of FIG. 14. As shown in the portion (k) of FIG. 14, the switch 17 is kept in an OFF state by the low-level signal outputted from the AND circuit 15. In addition, both the two input signals to the AND circuit 25 are in the low-level states so that the AND circuit 25 continues to output a low-level signal to the switch 27 as shown in the portion (m) of FIG. 14. As shown in the portion (o) of FIG. 14, the switch 27 Is kept in an OFF state by the low-level signal outputted from the AND circuit 25.

In this way, the switches 16 and 26 are changed to the ON states while the switches 17 and 27 are kept in the OFF states.

Thus, the first trigger component 18 continues to be in an OFF state as shown in the portion (1) of FIG. 14 so that the air-bag device at the right-hand front door of the automotive vehicle is not activated. In addition, the second trigger component 28 continues to be in an OFF state as shown in the portion (p) of FIG. 14 so that the air-bag device at the right-hand rear door of the automotive vehicle is not activated.

As understood from the previous description, each of the first and second trigger components 18 and 28 responds to both the output signals of the acceleration sensors 11 and 21. This design provides a redundancy in the acceleration-responsive control of each of the first and second trigger components 18 and 28. The redundancy results in an advantage of the triggering device 103. The acceleration sensors 11 and 21 are located at positions of the same side of the automotive vehicle near the front and rear doors respectively. Accordingly, the air-bag devices can be approximately simultaneously activated upon a collision between that side of the automotive vehicle and an object. In addition, it is possible to prevent the air-bag devices from being activated upon a collision between the other side of the automotive vehicle and an object.

Each of the first and second trigger components 18 and 28 may respond to the output signals of three or more acceleration sensors. The triggering device 103 may be modified to operate on three or more air-bag devices. The triggering device 103 may be applied to air-bag devices which are designed for a frontal crash or an inclined crash.

The triggering device 103 may be additionally provided with a fail-safe function which compensates for the occurrence of a malfunction of one of the acceleration sensors 11 and 21. In an example of the fail-safe function, leading portions of collision-responsive changes in the output signals of the acceleration sensors 11 and 21 are detected, and each of the first and second trigger components 18 and 28 responds to one of the detected leading portions.

The air-bag devices may be replaced by other safety devices such as vehicle safety-belt pretensioners (tighteners).

Third Embodiment

Figure 15:
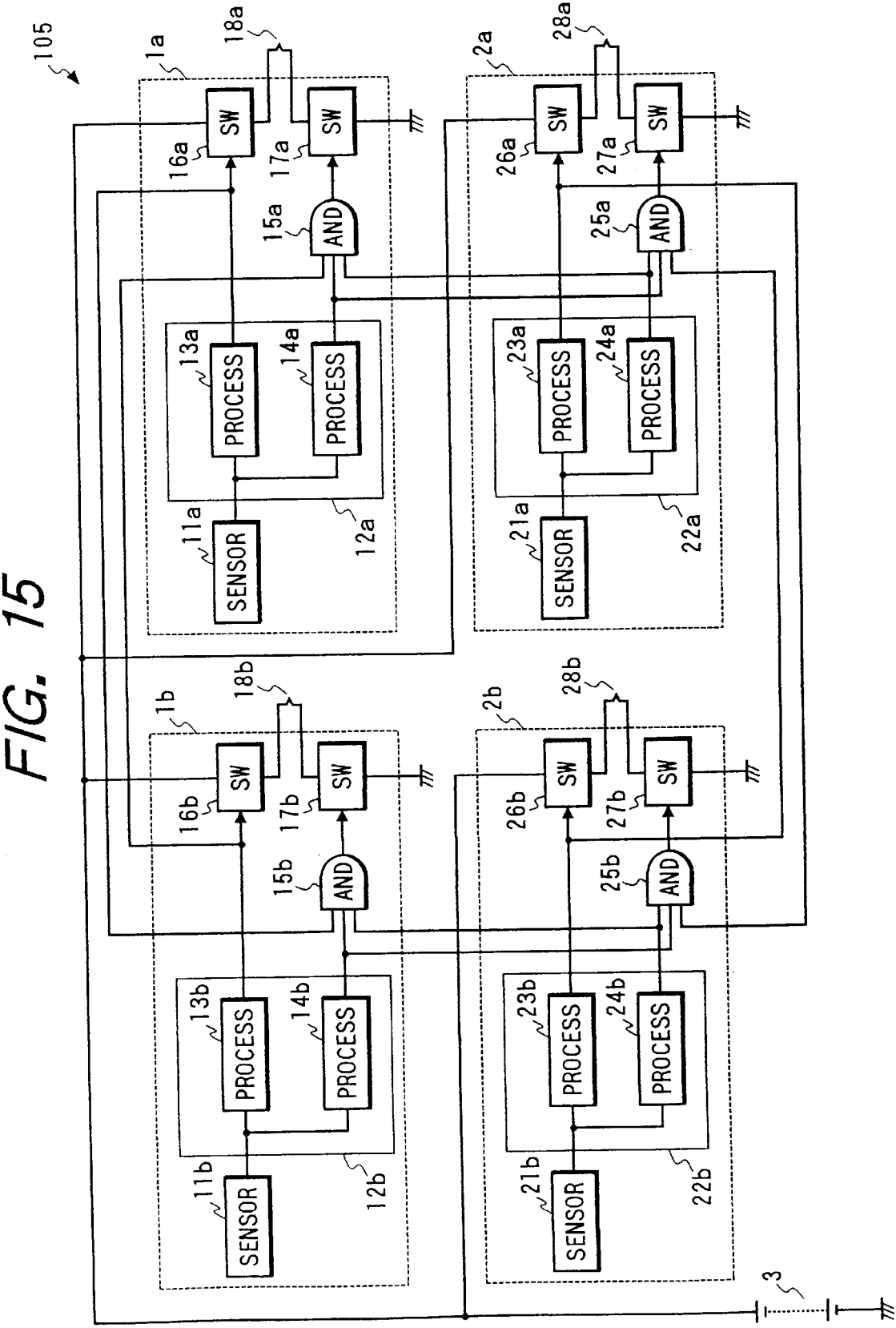
FIG. 15 is a block diagram of a triggering device according to a third embodiment of this invention.

With reference to FIG. 15, a triggering device 105 operates on air-bag devices (not shown) provided at a front part and a rear part of a right-hand side of an automotive vehicle and at a front part and a rear part of a left-hand side of the automotive vehicle respectively.

The triggering device 105 includes a first main section 1a, a second main section 2a, a third main section 1b, and a fourth main section 2b, a vehicle battery 3, a first trigger component 18a, a second trigger component 28a, a third trigger component 18b, and a fourth trigger component 28b. The first, second, third, and fourth main sections 1a, 2a, 1b, and 2b are located at the front part and the rear part of the right-hand side of the automotive vehicle and the front part and the rear part of the left-hand side of the automotive vehicle respectively. Each of the first, second, third, and fourth main sections 1a, 2a, 1b, and 2b detects the deceleration (or the acceleration) of the automotive vehicle, and generates a signal representing the detected deceleration. Each of the first, second, third, and fourth main sections 1a, 2a, 1b, and 2b processes the deceleration signal, and outputs a signal depending on the result of the processing of the deceleration signal.

The first, second, third, and fourth trigger components 18a, 28a, 18b, and 28b follow the first, second, third, and fourth main sections 1a, 2a, 1b, and 2b respectively. The first, second, third, and fourth trigger components 18a, 28a, 18b, and 28b are of the electrically-powered type. The first, second, third, and fourth trigger components 18a, 28a, 18b, and 28b serve to activate the air-bag devices respectively. The first trigger component 18a is controlled by the output signal of the first main section 1a. The second trigger component 28a is controlled by the output signal of the second main section 2a. The third trigger component 18b is controlled by the output signal of the third main section 1b. The fourth trigger component 28b is controlled by the output signal of the fourth main section 2b.

The vehicle battery 3 is connected to the first, second, third, and fourth main sections 1a, 2a, 1b, and 2b. The vehicle battery 3 electrically powers the first, second, third, and fourth main sections 1a, 2a, 1b, and 2b.

The first main section 1a of the triggering device 105 includes an acceleration sensor 11a, a signal processor 12a, an AND circuit 15a, and switches 16a and 17a. The acceleration sensor 11a detects deceleration (or acceleration) of the body of the automotive vehicle, and outputs a detection signal representative thereof. The signal processor 12a follows the acceleration sensor 11a. The signal processor 12a integrates and processes the detection signal outputted from the acceleration sensor 11a. The switch 16a follows the signal processor 12a. The AND circuit 15a follows the signal processor 12a. The switch 17a. Follows the AND circuit 15a. The switch 16a, the first trigger component 18a, and the switch 17a. are connected in series with the vehicle battery 3. The first trigger component 18a is energized in response to the result of AND operation between the switches 16a and 17a.

The second main section 2a of the triggering device 105 includes an acceleration sensor 21a, a signal processor 22a, an AND circuit 25a, and switches 26a and 27a. The acceleration sensor 21a detects deceleration (or acceleration) of the body of the automotive vehicle, and outputs a detection signal representative thereof. The signal processor 22a follows the acceleration sensor 21a. The signal processor 22a integrates and processes the detection signal outputted from the acceleration sensor 21a. The switch 26a follows the signal processor 22a. The AND circuit 25a follows the signal processor 22a. The switch 27a follows the AND circuit 25a. The switch 26a, the second trigger component 28a, and the switch 27a are connected in series with the vehicle battery 3. The second trigger component 28a is energized in response to the result of AND operation between the switches 26a and 27a.

The third main section 1b of the triggering device 105 includes an acceleration sensor 11b, a signal processor 12b, an AND circuit 15b, and switches 16b and 17b. The acceleration sensor 11b detects deceleration (or acceleration) of the body of the automotive vehicle, and outputs a detection signal representative thereof. The signal processor 12b follows the acceleration sensor 11b. The signal processor 12b integrates and processes the detection signal outputted from the acceleration sensor 11b. The switch 16b follows the signal processor 12b. The AND circuit 15b follows the signal processor 12b. The switch 17b follows the AND circuit 15b. The switch 16b, the third trigger component 18b, and the switch 17b are connected in series with the vehicle battery 3. The third trigger component 18b is energized in response to the result of AND operation between the switches 16b and 17b.

The fourth main section 2b of the triggering device 105 includes an acceleration sensor 21b, a signal processor 22b, an AND circuit 25b, and switches 26b and 27b. The acceleration sensor 21b detects deceleration (acceleration) of the body of the automotive vehicle, and outputs a detection signal representative thereof. The signal processor 22b follows the acceleration sensor 21b. The signal processor 22b integrates and processes the detection signal outputted from the acceleration sensor 21b. The switch 26b follows the signal processor 22b. The AND circuit 25b follows the signal processor 22b. The switch 27b follows the AND circuit 25b. The switch 26b, the fourth trigger component 28b, and the switch 27b are connected in series with the vehicle battery 3. The fourth trigger component 28b is energized in response to the result of AND operation between the switches 26b and 27b.

The signal processor 12a includes first and second sub signal processors 13a and 14a using different threshold values (corresponding to processing levels) for crash judgment or collision decision respectively. The first and second sub signal processors 13a and 14a receive the detection signal from the acceleration sensor 11a. The first sub signal processor 13a is followed by the switch 16a and a first input terminal of the AND circuit 15b. The second sub signal processor 14a is followed by a first input terminal of the AND circuit 15a and a first input terminal of the AND circuit 25a. Each of the first and second sub signal processors 13a and 14a includes a combination of an integrating circuit and a comparator. Each of the first and second sub signal processors 13a and 14a integrates the detection signal outputted from the acceleration sensor 11a, and outputs a high-level signal when the resultant integration value reaches a given threshold value.

The signal processor 22a includes first and second sub signal processors 23a and 24a using different threshold values (corresponding to processing levels) for crash judgment or collision decision respectively. The first and second sub signal processors 23a and 24a receive the detection signal from the acceleration sensor 21a. The first sub signal processor 23a is followed by the switch 26a and a first input terminal of the AND circuit 25b. The second sub signal processor 24a is followed by a second input terminal of the AND circuit 25a and a second input terminal of the AND circuit 15a. Each of the first and second sub signal processors 23a and 24a includes a combination of an integrating circuit and a comparator. Each of the first and second sub signal processors 23a and 24a integrates the detection signal outputted from the acceleration sensor 21a, and outputs a high-level signal when the resultant integration value reaches a given threshold value.

The signal processor 12b includes first and second sub signal processors 13b and 14b using different threshold values (corresponding to processing levels) for crash judgment or collision decision respectively. The first and second sub signal processors 13b and 14b receive the detection signal from the acceleration sensor 11b. The first sub signal processor 13b is followed by the switch 16b and a third input terminal of the AND circuit 15a. The second sub signal processor 14b is followed by a second input terminal of the AND circuit 15b and a second input terminal of the AND circuit 25b. Each of the first and second sub signal processors 13b and 14b includes a combination of an integrating circuit and a comparator. Each of the first and second sub signal processors 13b and 14b integrates the detection signal outputted from the acceleration sensor 11b, and outputs a high-level signal when the resultant integration value reaches a given threshold value.

The signal processor 22b includes first and second sub signal processors 23b and 24b using different threshold values (corresponding to processing levels) for crash judgment or collision decision respectively. The first and second sub signal processors 23b and 24b receive the detection signal from the acceleration sensor 21b. The first sub signal processor 23b is followed by the switch 26b and a third input terminal of the AND circuit 25a. The second sub signal processor 24b is followed by a third input terminal of the AND circuit 25b and a third input terminal of the AND circuit 15b. Each of the first and second sub signal processors 23b and 24b includes a combination of an integrating circuit and a comparator. Each of the first and second sub signal processors 23b and 24b integrates the detection signal outputted from the acceleration sensor 21b, and outputs a high-level signal when the resultant integration value reaches a given threshold value.

The given threshold value in the first sub signal processor 13a is smaller than the given threshold value in the second sub signal processor 14a. The given threshold value in the first sub signal processor 23a is smaller than the given threshold value in the second sub signal processor 24a. The given threshold value in the first sub signal processor 13b is smaller than the given threshold value in the second sub signal processor 14b. The given threshold value in the first sub signal processor 23b is smaller than the given threshold value in the second sub signal processor 24b.

Upon a collision between the right-hand side of the automotive vehicle and an object, only the air-bag devices located at the right-hand side of the automotive vehicle can be approximately simultaneously activated. Upon a collision between the left-hand side of the automotive vehicle and an object, only the air-bag devices located at the left-hand side of the automotive vehicle can be approximately simultaneously activated.

Each of the first, second, third, and fourth trigger components 18a, 28a, 18b, and 28b may respond to the output signals of four or more acceleration sensors. The triggering device 105 may be modified to operate on five or more air-bag devices. The triggering device 105 may be applied to air-bag devices which are designed for a frontal crash or an inclined crash.

The triggering device 105 may be additionally provided with a fail-safe function which compensates for the occurrence of a malfunction of at least one of the acceleration sensors 11a, 21a, 11b, and 21b. In an example of the fail-safe function, leading portions of collision-responsive changes in the output signals of the acceleration sensors 11a, 21a, 11b, and 21b are detected, and each of the first, second, third, and fourth trigger components 18a, 28a, 18b, and 28b responds to one of the detected leading portions.

The air-bag devices may be replaced by other safety devices such as vehicle safety-belt pretensioners (tighteners).

Fourth Embodiment

With reference to FIG. 16, a triggering device 101 operates on air-bag devices (not shown) provided at right-hand and left-hand sides of an automotive vehicle respectively. The air-bag devices are located at, for example, right-hand and left-hand doors of the automotive vehicle respectively. The triggering device 101 activates at least one of the air-bag devices when a side of the automotive vehicle collides with an object.

The triggering device 101 includes a first main section 10, a second main section 20, a vehicle battery 3, a first trigger component 18, and a second trigger component 28. Each of the first and second main sections 10 and 20 detects the deceleration (or the acceleration) of the automotive vehicle, and generates a signal representing the detected deceleration. Each of the first and second main sections 10 and 20 processes the deceleration signal, and outputs a signal depending on the result of the processing of the deceleration signal. The first and second trigger components 18 and 28 follow the first and second main sections 10 and 20 respectively. The first and second trigger components 18 and 28 are of the electrically-powered type. The first and second trigger components 18 and 28 serve to activate the air-bag devices respectively. The first trigger component 18 is controlled by the output signal of the first main section 10. The second trigger component 28 is controlled by the output signal of the second main section 20. The vehicle battery 3 is connected to the first and second main sections 10 and 20. The vehicle battery 3 electrically powers the first and second main sections 10 and 20.

The first main section 10 of the triggering device 101 includes an acceleration sensor 11, a signal processor 12, and switches 16 and 17. The acceleration sensor 11 detects deceleration (or acceleration) of the body of the automotive vehicle, and outputs a detection signal representative thereof. The signal processor 12 follows the acceleration sensor 11. The signal processor 12 integrates and processes the detection signal outputted from the acceleration sensor 11. The control terminal of the switch 17 follows the signal processor 12. The switch 16, the first trigger component 18, and the switch 17 are connected in series with the vehicle battery 3. The first trigger component 18 is energized in response to the result of AND operation between the switches 16 and 17.

The second main section 20 of the triggering device 101 includes an acceleration sensor 21, a signal processor 22, and switches 26 and 27. The acceleration sensor 21 detects deceleration (or acceleration) of the body of the automotive vehicle, and outputs a detection signal representative thereof. The signal processor 22 follows the acceleration sensor 21. The signal processor 22 integrates and processes the detection signal outputted from the acceleration sensor 21. The control terminal of the switch 26 follows the signal processor 12 in the first main section 10. The control terminal of the switch 27 follows the signal processor 22. The switch 26, the second trigger component 28, and the switch 27 are connected in series with the vehicle battery 3. The second trigger component 28 Is energized in response to the result of AND operation between the switches 26 and 27.

The acceleration sensors 11 and 21 are disposed in inner spaces within the right-hand and left-hand doors respectively. Alternatively, the acceleration sensors 11 and 21 may be fixedly located at positions near the right-hand and left-hand doors respectively. The acceleration sensor 11 outputs a positive detection signal upon a collision between the right-hand side of the automotive vehicle and an object. The acceleration sensor 11 outputs a negative detection signal upon a collision between the left-hand side of the automotive vehicle and an object. The acceleration sensor 21 outputs a negative detection signal upon a collision between the right-hand side of the automotive vehicle and an object. The acceleration sensor 21 outputs a positive detection signal upon a collision between the left-hand side of the automotive vehicle and an object.

The signal processor 12 includes first and second sub signal processors 13 and 14 using different threshold values (corresponding to processing levels) for crash judgment or collision decision respectively. The first and second sub signal processors 13 and 14 receive the detection signal from the acceleration sensor 11. The first sub signal processor 13 is followed by the control terminal of the switch 26. The second sub signal processor 14 is followed by the control terminal of the switch 17. Each of the first and second sub signal processors 13 and 14 includes a combination of an integrating circuit and a comparator. The first sub signal processor 13 integrates the negative detection signal outputted from the acceleration sensor 11, and outputs a high-level signal when the resultant integration value reaches one of given threshold values V1 and V3. The second sub signal processor 14 integrates the positive detection signal outputted from the acceleration sensor 11, and outputs a high-level signal when the resultant integration value reaches one of given threshold values V2 and V4.

The signal processor 22 includes first and second sub signal processors 23 and 24 using different threshold values (corresponding to processing levels) for crash judgment or collision decision respectively. The first and second sub signal processors 23 and 24 receive the detection signal from the acceleration sensor 21. The first sub signal processor 23 is followed by the control terminal of the switch 16. The second sub signal processor 24 is followed by the control terminal of the switch 27. Each of the first and second sub signal processors 23 and 24 includes a combination of an integrating circuit and a comparator. The first sub signal processor 23 integrates the negative detection signal outputted from the acceleration sensor 21, and outputs a high-level signal when the resultant integration value reaches one of the given threshold values V1 and V3. The second sub signal processor 24 integrates the positive detection signal outputted from the acceleration sensor 21, and outputs a high-level signal when the resultant integration value reaches one of the given threshold values V2 and V4.

The absolute values of the given threshold values V1 and V3 used in the sub signal processors 13 and 23 are smaller than the absolute values of the given threshold values V2 and V4 used in the sub signal processors 14 and 24.

The triggering device 101 operates as follows. It is now assumed that the right-hand side of the automotive vehicle collides with an object. The acceleration sensors 11 and 12 detect deceleration (or acceleration) of the automotive vehicle which is caused by the collision. In this case, the acceleration sensor 11 which is located at the right-hand side of the automotive vehicle outputs a positive detection signal with a large amplitude such as shown in the portion (a) of FIG. 17. On the other hand, the acceleration sensor 21 which is located at the left-hand side of the automotive vehicle outputs a negative detection signal with a small amplitude such as shown in the portion (c) of FIG. 17.

The positive detection signal outputted from the acceleration sensor 11 is integrated and processed by the sub signal processor 14 but is not integrated and processed by the sub signal processor 13. Accordingly, the output signal of the sub signal processor 13 remains in a low-level state as shown in the portion (e) of FIG. 17.

On the other hand, the sub signal processor 14 generates an effective integration-resultant signal which varies as shown in the portion (b) of FIG. 17.

The negative detection signal outputted from the acceleration sensor 21 is integrated and processed by the sub signal processor 23 but is not integrated and processed by the sub signal processor 24. Accordingly, the output signal of the sub signal processor 24 remains in a low-level state as shown in the portion (h) of FIG. 17. On the other hand, the sub signal processor 23 generates an effective integration-resultant signal which varies as shown in the portion (d) of FIG. 17.

The integration-resultant signal in the sub signal processor 14 reaches the given threshold value V2 at a moment t2 as shown in the portion (b) of FIG. 17. At the moment t2, the sub signal processor 14 starts to output a high-level signal as shown in the portion (f) of FIG. 17. As shown in the portion (j) of FIG. 17, the switch 17 assumes an ON state in response to the high-level signal outputted from the sub signal processor 14.

The integration-resultant signal in the sub signal processor 23 reaches the given threshold value V3 at a moment t3 as shown in the portion (d) of FIG. 17. The moment t3 precedes the moment t2. At the moment t3, the sub signal processor 23 starts to output a high-level signal as shown in the portion (g) of FIG. 17. As shown in the portion (i) of FIG. 17, the switch 16 assumes an ON state in response to the high-level signal outputted from the sub signal processor 23.

In this way, both the switches 16 and 17 assume the ON states upon the collision of the right-hand side of the automotive vehicle with the object. Thus, as shown in the portion (k) of FIG. 7, at the moment t2, the first trigger component 18 is energized and is changed to an ON state so that the air-bag device at the right-hand side of the automotive vehicle is activated.

As previously described, the output signal of the sub signal processor 13 remains in the low-level state (see the portion (e) of FIG. 17). As shown in the portion (1) of FIG. 17, the switch 26 is kept in an OFF state by the low-level output signal of the sub signal processor 13. As previously described, the output signal of the sub signal processor 24 remains in the low-level state (see the portion (h) of FIG. 17). As shown in the portion (m) of FIG. 17, the switch 27 is kept in an OFF state by the low-level output signal of the sub signal processor 24.

In this way, both the switches 26 and 27 remain in the OFF states upon the collision of the right-hand side of the automotive vehicle with the object. Thus, the second trigger component 28 continues to be in an OFF state as shown in the portion (n) of FIG. 17 so that the air-bag device at the left-hand side of the automotive vehicle Is not activated.

It is now assumed that the left-hand side of the automotive vehicle collides with an object. The acceleration sensors 11 and 12 detect deceleration (or acceleration) of the automotive vehicle which is caused by the collision. In this case, the acceleration sensor 11 which is located at the right-hand side of the automotive vehicle outputs a negative detection signal with a small amplitude such as shown in the portion (a) of FIG. 18. On the other hand, the acceleration sensor 21 which is located at the left-hand side of the automotive vehicle outputs a positive detection signal with a large amplitude such as shown in the portion (c) of FIG. 18.

The negative detection signal outputted from the acceleration sensor 11 is integrated and processed by the sub signal processor 13 but is not integrated and processed by the sub signal processor 14. Accordingly, the output signal of the sub signal processor 14 remains in a low-level state as shown in the portion (f) of FIG. 18. On the other hand, the sub signal processor 13 generates an effective integration-resultant signal which varies as shown in the portion (b) of FIG. 18.

The positive detection signal outputted from the acceleration sensor 21 is integrated and processed by the sub signal processor 24 but is not integrated and processed by the sub signal processor 23. Accordingly, the output signal of the sub signal processor 23 remains in a low-level state as shown in the portion (g) of FIG. 18. On the other hand, the sub signal processor 24 generates an effective integration-resultant signal which varies as shown in the portion (d) of FIG. 18.

Figure 18:
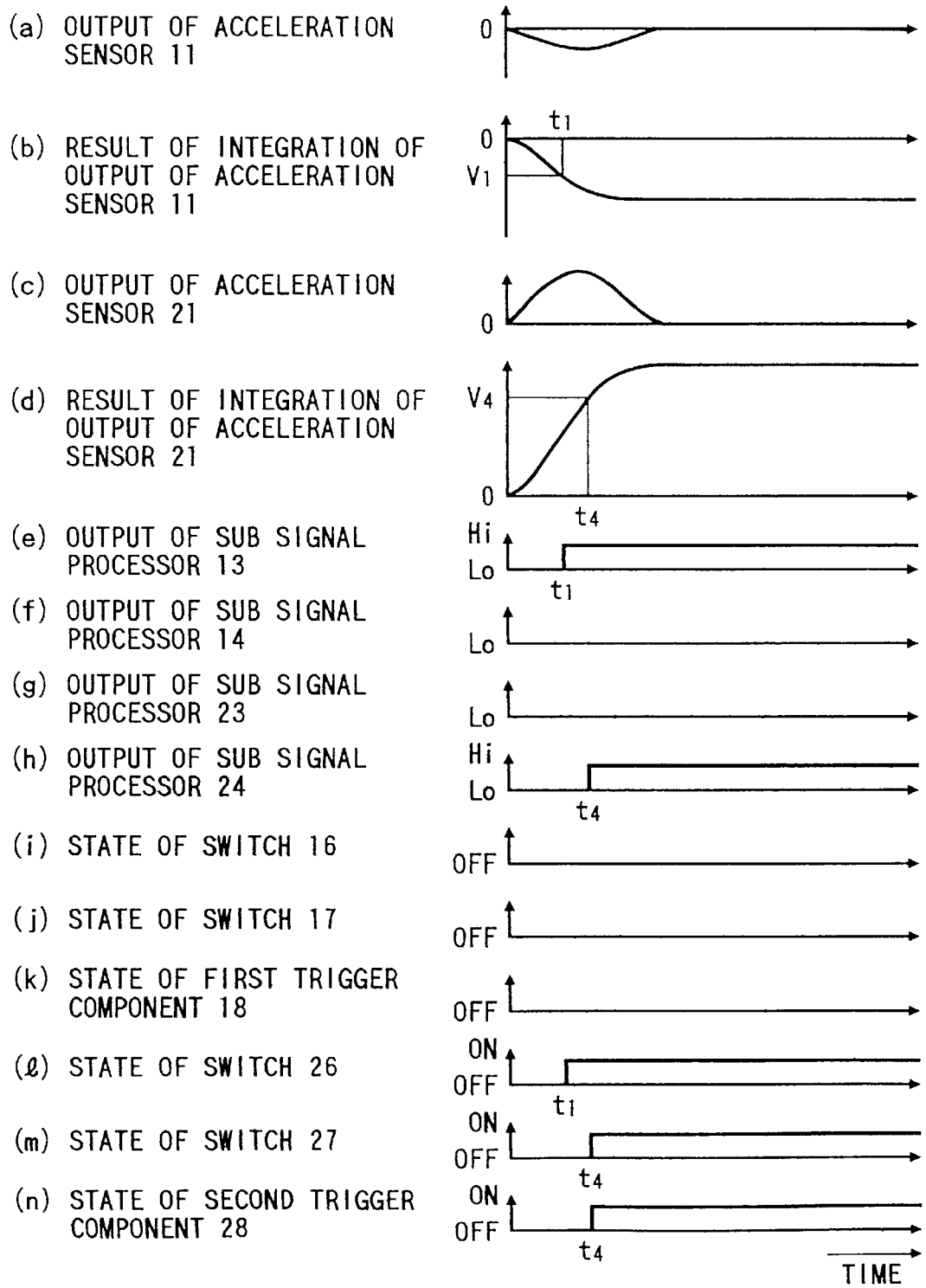
FIG. 18 is a time-domain diagram of signals and conditions of components in the triggering device of FIG. 16.

The integration-resultant signal in the sub signal processor 13 reaches the given threshold value V1 at a moment t1 as shown in the portion (b) of FIG. 18. At the moment t1, the sub signal processor 13 starts to output a high-level signal as shown in the portion (e) of FIG. 18. As shown in the portion (1) of FIG. 18, the switch 26 assumes an ON state in response to the high-level signal outputted from the sub signal processor 13.

The integration-resultant signal in the sub signal processor 24 reaches the given threshold value V4 at a moment t4 as shown in the portion (d) of FIG. 18. The moment t4 follows the moment t1. At the moment t4, the sub signal processor 24 starts to output a high-level signal as shown in the portion (h) of FIG. 18. As shown in the portion (m) of FIG. 18, the switch 27 assumes an ON state in response to the high-level signal outputted from the sub signal processor 24.

In this way, both the switches 26 and 27 assume the ON states upon the collision of the left-hand side of the automotive vehicle with the object. Thus, as shown in the portion (n) of FIG. 18, at the moment t4, the second trigger component 28 is energized and is changed to an ON state so that the air-bag device at the left-hand side of the automotive vehicle is activated.

As previously described, the output signal of the sub signal processor 14 remains in the low-level state (see the portion (f) of FIG. 18). As shown in the portion (j) of FIG. 18, the switch 17 is kept in an OFF state by the low-level output signal of the sub signal processor 14. As previously described, the output signal of the sub signal processor 23 remains in the low-level state (see the portion (g) of FIG. 18). As shown in the portion (i) of FIG. 18, the switch 16 is kept in an OFF state by the low-level output signal of the sub signal processor 23.

In this way, both the switches 16 and 17 remain in the OFF states upon the collision of the left-hand side of the automotive vehicle with the object. Thus, the first trigger component 18 continues to be in an OFF state as shown in the portion (k) of FIG. 18 so that the air-bag device at the right-hand side of the automotive vehicle is not activated.

As understood from the previous description, the triggering device 101 can active only the air-bag device at the side of the automotive vehicle which undergoes a collision. Since each of the first and second trigger components 18 and 28 responds to both the output signals of the acceleration sensors 11 and 21, the acceleration-responsive control of the first and second trigger components 18 and 28 is provided with a redundancy. This design can prevent the air-bag devices from being activated by causes other than collisions.

There are the two acceleration sensors 11 and 21 and also the two trigger components 18 and 28. This design can implement a miniature structure and a low cost of the triggering device 101.

The acceleration sensor 11 may be modified to output a negative detection signal upon a collision between the right-hand side of the automotive vehicle and an object, and to output a positive detection signal upon a collision between the left-hand side of the automotive vehicle and an object. In this case, the positive detection signal outputted from the acceleration sensor 11 is effectively processed by the sub signal processor 13. On the other hand, the negative detection signal outputted from the acceleration sensor 11 is effectively processed by the sub signal processor 14.

The acceleration sensor 21 may be modified to output a positive detection signal upon a collision between the right-hand side of the automotive vehicle and an object, and to output a negative detection signal upon a collision between the left-hand side of the automotive vehicle and an object. In this case, the positive detection signal outputted from the acceleration sensor 21 is effectively processed by the sub signal processor 23. On the other hand, the negative detection signal outputted from the acceleration sensor 21 is effectively processed by the sub signal processor 24.

Each of the first and second trigger components 18 and 28 may respond to the output signals of three or more acceleration sensors. The triggering device 101 may be modified to operate on three or more air-bag devices. The triggering device 101 may be applied to air-bag devices which are designed for a frontal crash or an inclined crash.

The triggering device 101 may be additionally provided with a fail-safe function which compensates for the occurrence of a malfunction of one of the acceleration sensors 11 and 21. In an example of the fail-safe function, leading portions of collision-responsive changes in the output signals of the acceleration sensors 11 and 21 are detected, and each of the first and second trigger components 18 and 28 responds to one of the detected leading portions.

The air-bag devices may be replaced by other safety devices such as vehicle safety-belt pretensioners (tighteners).

Fifth Embodiment

Figure 19:
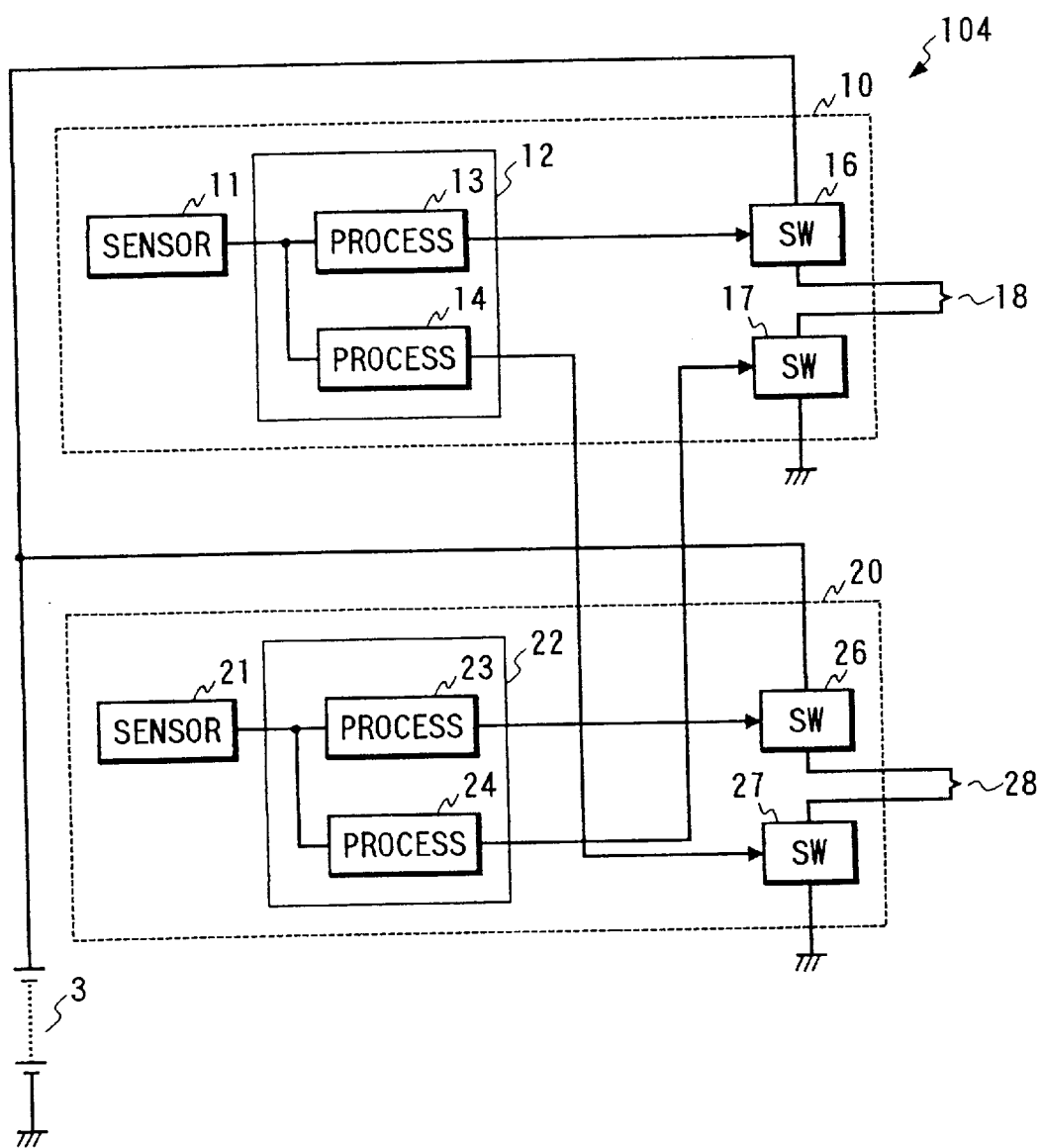
FIG. 19 is a block diagram of a triggering device according to a fifth embodiment of this invention.

FIG. 19 shows a triggering device 104 according to a fifth embodiment of this invention. The triggering device 104 is similar to the triggering device 101 of FIG. 1 except for design changes indicated hereinafter. In the triggering device 101, a sub signal processor 13 is followed by the control terminal of a switch 26, and a sub signal processor 14 is followed by the control terminal of a switch 17. Further, a sub signal processor 23 is followed by the control terminal of a switch 16, and a sub signal processor 24 is followed by the control terminal of a switch 27.

Acceleration sensors 11 and 21 output detection signals void of polarities. Each of the sub signal processors 13 and 14 includes a combination of an integrating circuit and a comparator. Each of the sub signal processors 13 and 14 integrates the detection signal outputted from the acceleration sensor 11, and outputs a high-level signal when the resultant integration value reaches a given threshold value. Each of the sub signal processors 23 and 24 integrates the detection signal outputted from the acceleration sensor 21, and outputs a high-level signal when the resultant integration value reaches a given threshold value.

The given threshold value used by the sub signal processor 13 is smaller than the given threshold value used by the sub signal processor 14. The given threshold value used by the sub signal processor 23 is smaller than the given threshold value used by the sub signal processor 24.

It is preferable that the acceleration sensors 11 and 21 and also air-bag devices are located at a same side of an automotive vehicle.

Each of first and second trigger components 18 and 28 may respond to the output signals of three or more acceleration sensors.

The triggering device 104 may be modified to operate on three or more air-bag devices. The triggering device 104 may be applied to air-bag devices which are designed for a frontal crash or an inclined crash.

The triggering device 104 may be additionally provided with a fail-safe function which compensates for the occurrence of a malfunction of one of the acceleration sensors 11 and 21. In an example of the fail-safe function, leading portions of collision-responsive changes in the output signals of the acceleration sensors 11 and 21 are detected, and each of the first and second trigger components 18 and 28 responds to one of the detected leading portions.

The air-bag devices may be replaced by other safety devices such as vehicle safety-belt pretensioners (tighteners).

Sixth Embodiment

Figure 20:
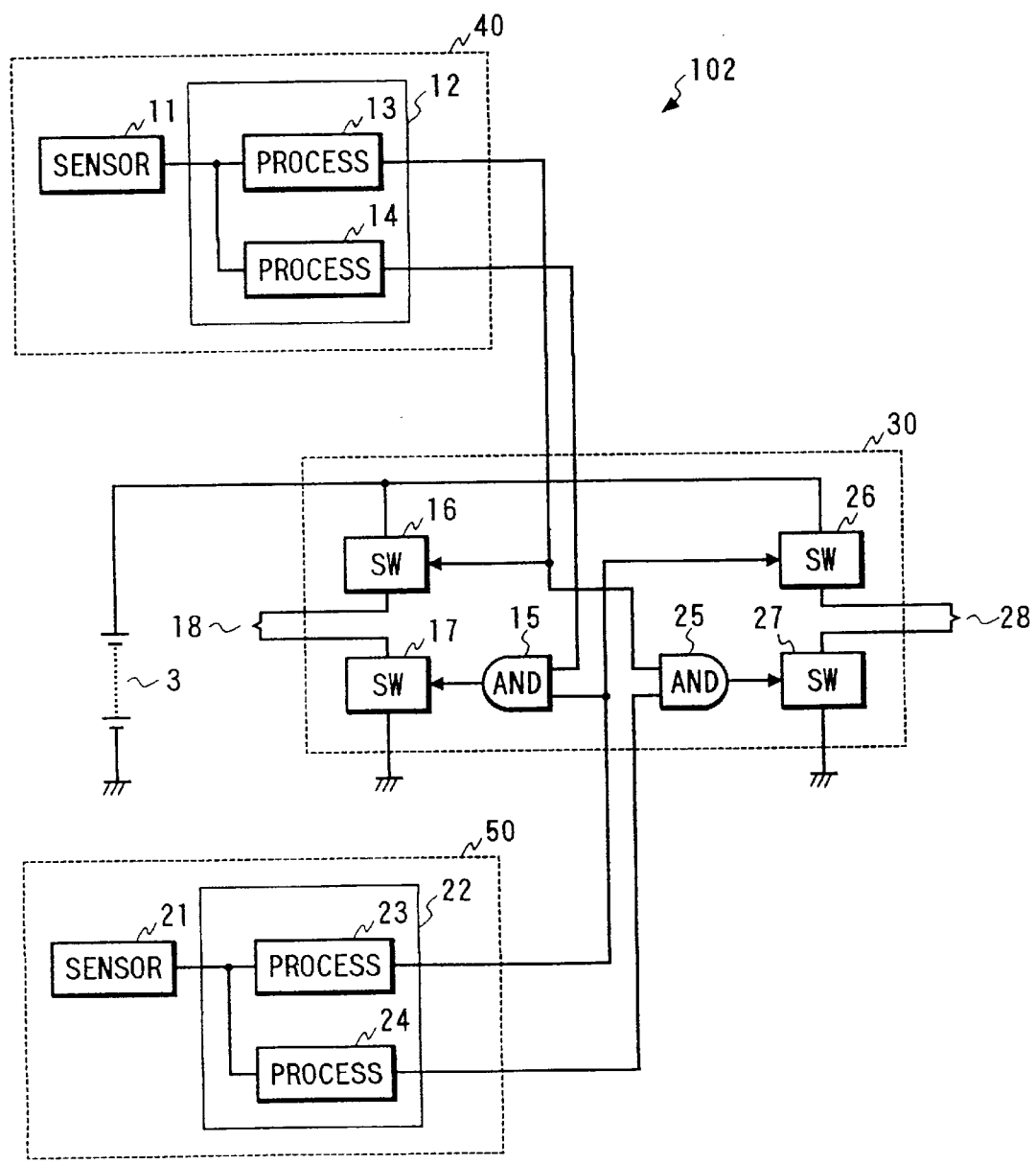
FIG. 20 is a block diagram of a triggering device according to a sixth embodiment of this invention.

With reference to FIG. 20, a triggering device 102 operates on air-bag devices (not shown) provided in an automotive vehicle. The triggering device 102 activates at least one of the air-bag devices when the automotive vehicle collides with an object.

The triggering device 102 includes a judging section 30, a first detecting section 40, a second detecting section 50, a vehicle battery 3, a first trigger component 18, and a second trigger component 28. Each of the first and second detecting sections 40 and 50 detects the deceleration (or the acceleration) of the automotive vehicle, and generates a signal representing the detected deceleration. Each of the first and second detecting sections 40 and 50 processes the deceleration signal, and outputs a signal depending on the result of the processing of the deceleration signal.

The judging section 30 follows the first and second detecting sections 40 and 50. The judging section 30 determines whether or not the air-bag devices should be activated by referring to the output signals of the first and second detecting sections 40 and 50. The first and second trigger components 18 and 28 follow the judging section 30. The first and second trigger components 18 and 28 are of the electrically-powered type. The first and second trigger components 18 and 28 serve to activate the air-bag devices respectively. The first and second trigger components 18 and 28 are controlled by output signals of the judging section 30. The vehicle battery 3 is connected to the judging section 30. The vehicle battery 3 electrically powers the judging section 30.

The first detecting section 40 of the triggering device 102 includes an acceleration sensor 11 and a signal processor 12. The acceleration sensor 11 detects deceleration (or acceleration) of the body of the automotive vehicle, and outputs a detection signal representative thereof. The signal processor 12 follows the acceleration sensor 11. The signal processor 12 integrates and processes the detection signal outputted from the acceleration sensor 11.

The signal processor 12 includes first and second sub signal processors 13 and 14 using different threshold values (corresponding to processing levels) for crash detection respectively. The first and second sub signal processors 13 and 14 receive the detection signal from the acceleration sensor 11. Each of the first and second sub signal processors 13 and 14 includes a combination of an integrating circuit and a comparator. Each of the first and second sub signal processors 13 and 14 integrates the detection signal outputted from the acceleration sensor 11, and outputs a high-level signal when the resultant integration value reaches a given threshold value. The given threshold value used by the first sub signal processor 13 is smaller than the given threshold value used by the second sub signal processor 14.

The second detecting section 50 of the triggering device 102 includes an acceleration sensor 21 and a signal processor 22. The acceleration sensor 21 detects deceleration (or acceleration) of the body of the automotive vehicle, and outputs a detection signal representative thereof. The signal processor 22 follows the acceleration sensor 21. The signal processor 22 integrates and processes the detection signal outputted from the acceleration sensor 21.

The signal processor 22 includes first and second sub signal processors 23 and 24 using different threshold values (corresponding to processing levels) for crash detection respectively. The first and second sub signal processors 23 and 24 receive the detection signal from the acceleration sensor 21. Each of the first and second sub signal processors 23 and 24 includes a combination of an integrating circuit and a comparator. Each of the first and second sub signal processors 23 and 24 integrates the detection signal outputted from the acceleration sensor 21, and outputs a high-level signal when the resultant integration value reaches a given threshold value. The given threshold value used by the first sub signal processor 23 is smaller than the given threshold value used by the second sub signal processor 24.

The judging section 30 of the triggering device 102 includes an AND circuit 15, switches 16 and 17, an AND circuit 25, and switches 26 and 27. A first input terminal of the AND circuit 15 is connected to the output terminal of the sub signal processor 23. A second input terminal of the AND circuit 15 is connected to the output terminal of the sub signal processor 14. The output terminal of the AND circuit 15 is connected to the control terminal of the switch 17. The control terminal of the switch 16 is connected to the output terminal of the sub signal processor 13. The switch 16, the first trigger component 18, and the switch 17 are connected in series with the vehicle battery 3. The first trigger component 18 is energized in response to the result of AND operation between the switches 16 and 17.

A first input terminal of the AND circuit 25 is connected to the output terminal of the sub signal processor 24. A second input terminal of the AND circuit 25 is connected to the output terminal of the sub signal processor 13. The output terminal of the AND circuit 25 is connected to the control terminal of the switch 27. The control terminal of the switch 26 is connected to the output terminal of the sub signal processor 23. The switch 26, the second trigger component 28, and the switch 27 are connected in series with the vehicle battery 3. The second trigger component 28 is energized in response to the result of AND operation between the switches 26 and 27.

Since each of the first and second trigger components 18 and 28 responds to both the output signals of the acceleration sensors 11 and 21, the acceleration-responsive control of the first and second trigger components 18 and 28 is provided with a redundancy. This design can prevent the air-bag devices from being activated by causes other than collisions.

There are the two acceleration sensors 11 and 21 and also the two trigger components 18 and 28. This design can implement a miniature structure and a low cost of the triggering device 102.

The triggering device 102 is basically separated into three hardware portions, that is, the judging section 30 and the first and second detecting sections 40 and 50. According to this design, it is easy to locate the first and second detecting sections 40 and 50 at crash zones to be detected. Furthermore, the judging section 30 can be located at any place in the automotive vehicle. Accordingly, it is possible to increase the degree of freedom in designing.

The air-bag devices may be replaced by other safety devices such as vehicle safety-belt pretensioners (tighteners).

Seventh Embodiment

Figure 21:
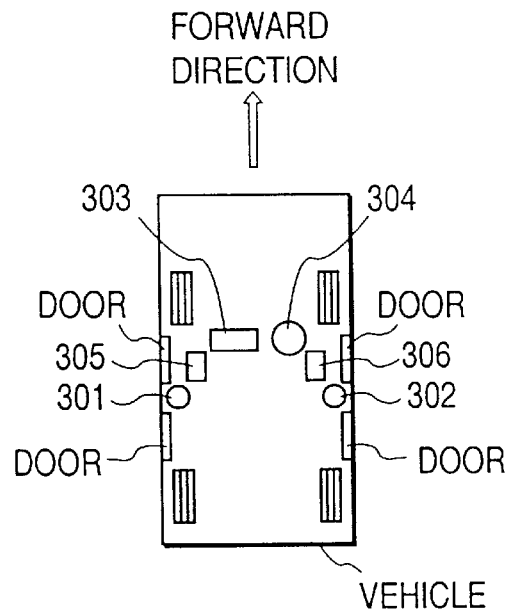
FIG. 21 is a diagram of an automotive vehicle, sensor units, and air-bag devices.

With reference to FIG. 21, sensor units 301 and 302 are located at left-hand and right-hand side portions of a vehicle body, respectively. The vehicle body is equipped with front air-bag devices 303 and 304 for a front passenger's seat and a driver's seat, respectively. In addition, the vehicle body is equipped with side air-bag devices 305 and 306 for the front passenger's seat and the driver's seat, respectively.

The sensor units 301 and 302 are disposed within front-left and front-right vehicle doors, respectively. The sensor units 301 and 302 may be located near the front-left and front-right vehicle doors, respectively.

The front air-bag devices 303 and 304 are located in front of the front passenger's seat and the driver's seat, respectively. The front air-bag devices 303 and 304 can be triggered and activated in response to a collision in a longitudinal direction of the vehicle body such as a frontal collision, an offset collision, or an oblique collision. When the front air-bag devices 303 and 304 are activated, bags therein are unfolded and expanded to protect occupants in the front passenger's seat and the driver's seat from collision shocks respectively.

The side air-bag devices 305 and 306 are located at outer sides of the front passenger's seat and the driver's seat, respectively. The side air-bag devices 305 and 306 can be triggered and activated in response to side collisions causing decelerations in width-wise directions (transverse directions or lateral directions) of the vehicle body. When the side air-bag devices 305 and 306 are activated, bags therein are unfolded and expanded to protect occupants in the front passenger's seat and the driver's seat from collision shocks respectively.

Figure 22:
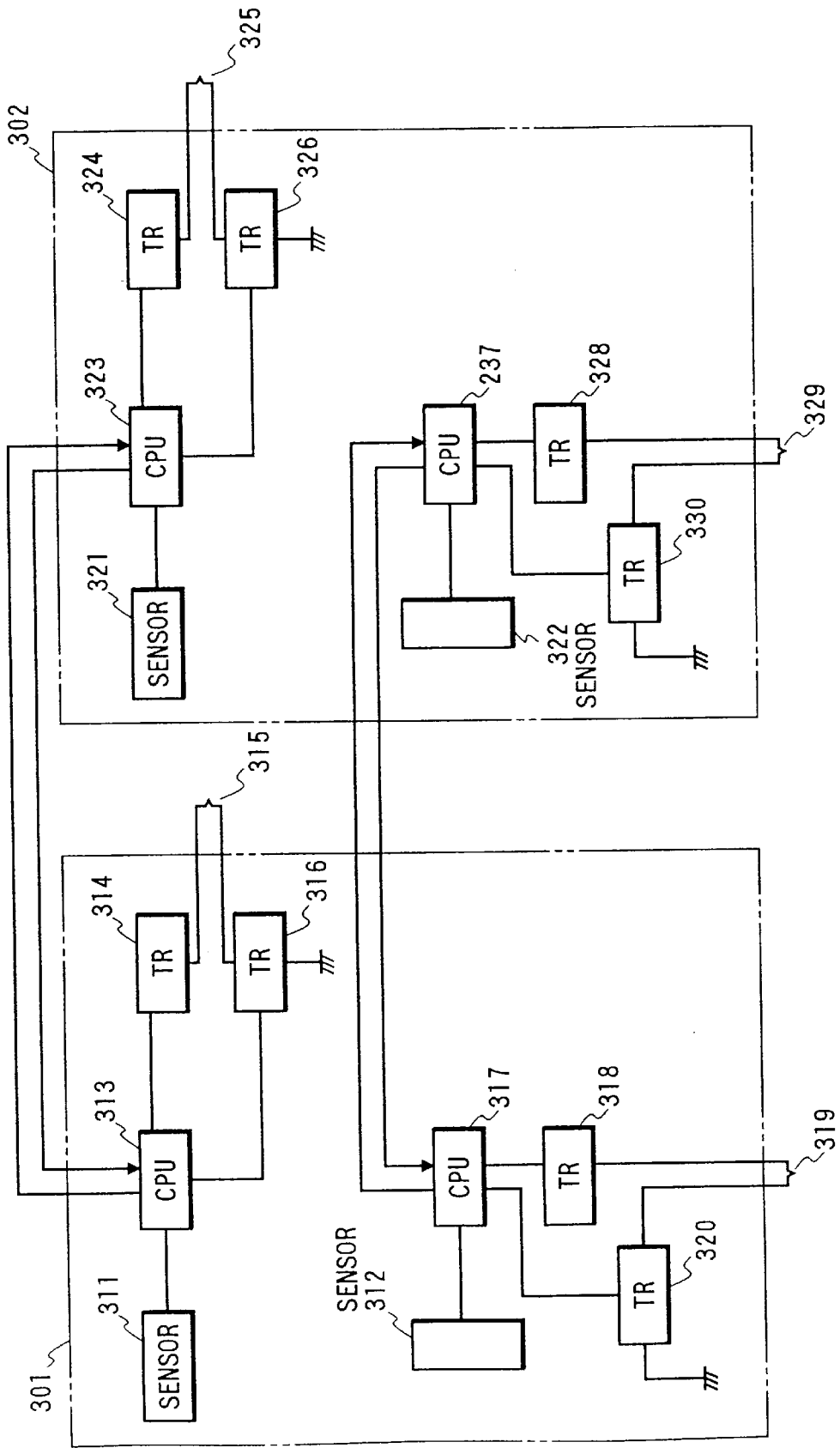
FIG. 22 is a block diagram of a triggering device according to a seventh embodiment of this invention.

As shown in FIG. 22, the sensor unit 301 includes an acceleration sensor 311 and a CPU 313 which are designed to detect deceleration in the longitudinal direction of the vehicle body. Furthermore, the sensor unit 301 includes transistors 314 and 316. The acceleration sensor 311 is connected to the CPU 313. The CPU 313 is connected to the transistors 314 and 316. The transistors 314 and 316 serve as switches, respectively. A squib (a trigger component) 315 is connected between the transistors 314 and 316.

The sensor unit 302 includes an acceleration sensor 321 and a CPU 323 which are designed to detect deceleration in the longitudinal direction of the vehicle body. Furthermore, the sensor unit 302 includes transistors 324 and 326. The acceleration sensor 321 is connected to the CPU 323. The CPU 323 is connected to the transistors 324 and 326. The transistors 324 and 326 serve as switches, respectively. A squib (a trigger component) 325 is connected between the transistors 324 and 326. The CPU 323 is connected to the CPU 313 in the sensor unit 301.

The sensor units 301 and 302 are formed as separate units respectively. The sensor units 301 and 302 constitute two hardware devices respectively.

The acceleration sensors 311 and 321 have structures similar to each other. Thus, only the acceleration sensor 311 will be explained in more detail.

Figure 23:
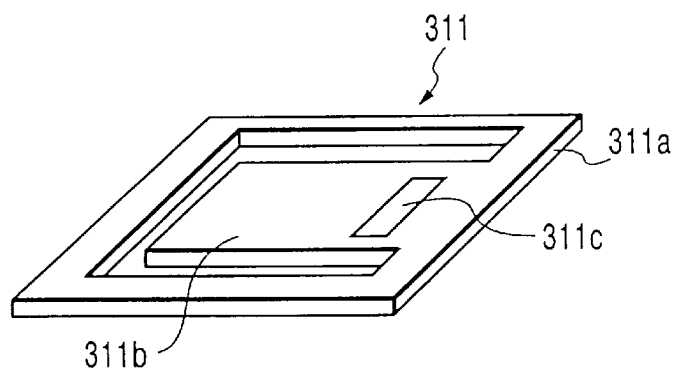
FIG. 23 is a perspective view of an acceleration sensor.

As shown in FIG. 23, the acceleration sensor 311 has a frame 311a, a cantilever 311b, and a gauge portion 311c. The cantilever 311b has a plate-like shape. One end of the cantilever 311b is fixed to the inner edge of one side of the frame 311a. It is preferable that the cantilever 311b integrally extends from one side of the frame 311a. The other end of the cantilever 311b is designed as a free end. The gauge portion 311c is formed on a part of the cantilever 311b near the fixed end thereof. The gauge portion 311c includes a piezoelectric element or a piezoelectric member. The acceleration sensor 311 has a plate-like shape. When the acceleration sensor 311 is subjected to acceleration (deceleration) in a direction perpendicular to the major surfaces of the cantilever 311b, the free end of the cantilever 311b moves in response to the acceleration (the deceleration) and the gauge portion 311c generates an electric signal depending on the movement of the cantilever 311b.

Figure 24:
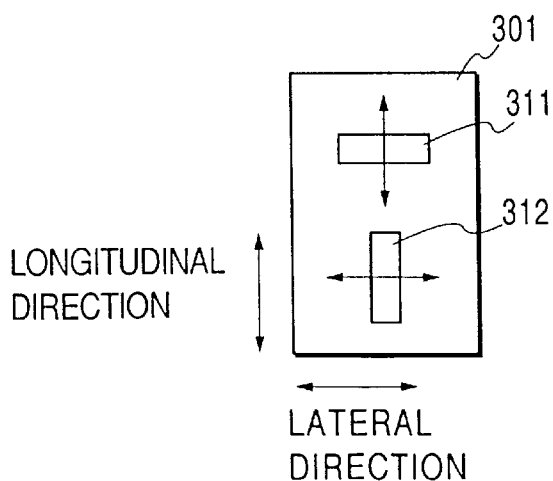
FIG. 24 is a diagram of acceleration sensors in a sensor unit of FIG. 21.

With reference to FIG. 24, the acceleration sensor 311 in the sensor unit 301 is located relative to the vehicle body such that a direction perpendicular to major surfaces of the acceleration sensor 311 (the major surfaces of the cantilever 311b) agrees with the longitudinal direction of the vehicle body. Thus, the cantilever 311b responds to deceleration in the longitudinal direction of the vehicle body. Accordingly, the acceleration sensor 311 is sensible to deceleration in the longitudinal direction of the vehicle body.

Figure 25:
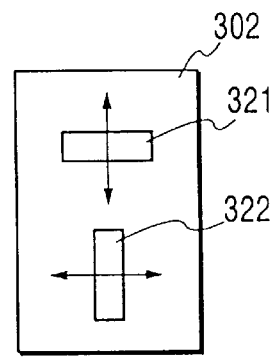
FIG. 25 is a diagram of acceleration sensors in another sensor unit of FIG. 21.

With reference to FIG. 25, the acceleration sensor 321 in the sensor unit 302 is located relative to the vehicle body such that a direction perpendicular to major surfaces of the acceleration sensor 321 (major surfaces of a cantilever in the acceleration sensor 321) agrees with the longitudinal direction of the vehicle body. Thus, the cantilever in the acceleration sensor 321 responds to deceleration in the longitudinal direction of the vehicle body. Accordingly, the acceleration sensor 321 is sensible to deceleration in the longitudinal direction of the vehicle body.

The CPU 313 includes a combination of an I/O port (an interface), a processing section, a ROM, and a RAM. The CPU 313 operates in accordance with a program stored in the ROM. Similarly, the CPU 323 includes a combination of an I/O port (an interface), a processing section, a ROM, and a RAM. The CPU 323 operates in accordance with a program stored in the ROM.

The programs for controlling the CPU's 313 and 323 are designed to implement the following processes. The CPU 313 subjects a detection signal from the acceleration sensor 311 (an output signal of the acceleration sensor 311) to an integration process. When the result of the integration process becomes equal to or greater than a predetermined value, the CPU 313 turns on the transistors 314 and 316. It is preferable that when an integration result value related to the detection signal from the acceleration sensor 311 reaches a predetermined threshold value V11, the CPU 313 turns on the transistor 316. The CPU 323 subjects a detection signal from the acceleration sensor 321 (an output signal of the acceleration sensor 321) to an integration process. When the result of the integration process becomes equal to or greater than a predetermined value, the CPU 323 turns on the transistors 324 and 326. It is preferable that when an integration result value related to the detection signal from the acceleration sensor 321 reaches the predetermined threshold value V11, the CPU 323 turns on the transistor 326. The CPU's 313 and 323 communicate with each other. The CPU 313 turns on the transistor 314 when the following conditions are satisfied. One of the integration result values related to the detection signals from the acceleration sensors 311 and 321 reaches a predetermined threshold value V12 greater than the predetermined threshold value V11 while the integration result value related to the detection signal from the acceleration sensor 321 is equal to or greater than the predetermined threshold value V11. The CPU 323 turns on the transistor 324 when the following conditions are satisfied. One of the integration result values related to the detection signals from the acceleration sensors 311 and 321 reaches the predetermined threshold value V12 while the integration result value related to the detection signal from the acceleration sensor 311 is equal to or greater than the predetermined threshold value V11.

The squibs 315 and 325 are trigger elements for activating or firing the front air-bag devices 303 and 304, respectively. The squib 315 is connected in series with the transistors 314 and 316 and a power supply (not shown). When both the transistors 314 and 316 fall into ON states, the squib 315 is energized and activated by the power supply. Otherwise, the squib 315 remains inactive. The squib 325 is connected in series with the transistors 324 and 326 and a power supply (not shown). When both the transistors 324 and 326 fall into ON states, the squib 325 is energized and activated by the power supply. Otherwise, the squib 325 remains inactive.

As shown in FIG. 22, the sensor unit 301 includes an acceleration sensor 312 and a CPU 317 which are designed to detect deceleration in the width-wise direction (the transverse direction or the lateral direction) of the vehicle body. Furthermore, the sensor unit 301 includes transistors 318 and 320. The acceleration sensor 312 is connected to the CPU 317. The CPU 317 is connected to the transistors 318 and 320. The transistors 318 and 320 serve as switches, respectively. A squib (a trigger component) 319 is connected between the transistors 318 and 320.

The sensor unit 302 includes an acceleration sensor 322 and a CPU 327 which are designed to detect deceleration in the width-wise direction (the transverse direction or the lateral direction) of the vehicle body. Furthermore, the sensor unit 302 includes transistors 328 and 330. The acceleration sensor 322 is connected to the CPU 327. The CPU 327 is connected to the transistors 328 and 330. The transistors 328 and 330 serve as switches, respectively. A squib (a trigger component) 329 is connected between the transistors 328 and 330. The CPU 327 is connected to the CPU 317 in the sensor unit 301.

The acceleration sensors 312 and 322 have structures which are similar to the structure of the acceleration sensor 311 (see FIG. 23).

With reference to FIG. 24, the acceleration sensor 312 in the sensor unit 301 is located relative to the vehicle body such that a direction perpendicular to major surfaces of the acceleration sensor 312 (major surfaces of a cantilever in the acceleration sensor 312) agrees with the width-wise direction of the vehicle body. Thus, the cantilever in the acceleration sensor 312 responds to deceleration in the width-wise direction of the vehicle body. Accordingly, the acceleration sensor 312 is sensible to deceleration in the width-wise direction of the vehicle body.

With reference to FIG. 25, the acceleration sensor 322 in the sensor unit 302 is located relative to the vehicle body such that a direction perpendicular to major surfaces of the acceleration sensor 322 (major surfaces of a cantilever in the acceleration sensor 322) agrees with the width-wise direction of the vehicle body. Thus, the cantilever in the acceleration sensor 322 responds to deceleration in the width-wise direction of the vehicle body. Accordingly, the acceleration sensor 322 is sensible to deceleration in the width-wise direction of the vehicle body.

The CPU 317 includes a combination of an I/O port (an interface), a processing section, a ROM, and a RAM. The CPU 317 operates in accordance with a program stored in the ROM. Similarly, the CPU 327 includes a combination of an I/O port (an interface), a processing section, a ROM, and a RAM. The CPU 327 operates in accordance with a program stored in the ROM.

The programs for controlling the CPU's 317 and 327 are designed to implement the following processes. The CPU 317 subjects a detection signal from the acceleration sensor 312 (an output signal of the acceleration sensor 312) to an integration process. When the result of the integration process becomes equal to or greater than a predetermined value, the CPU 317 turns on the transistors 318 and 320. It is preferable that when an integration result value related to the detection signal from the acceleration sensor 312 reaches a predetermined threshold value V13, the CPU 317 turns on the transistor 320. The CPU 327 subjects a detection signal from the acceleration sensor 322 (an output signal of the acceleration sensor 322) to an integration process. When the result of the integration process becomes equal to or greater than a predetermined value, the CPU 327 turns on the transistors 328 and 330. It is preferable that when an integration result value related to the detection signal from the acceleration sensor 322 reaches the predetermined threshold value V13, the CPU 327 turns on the transistor 330. The CPU's 317 and 327 communicate with each other. The CPU 317 turns on the transistor 318 when the following conditions are satisfied. The integration result value related to the detection signal from the acceleration sensor 312 reaches a predetermined threshold value V14 greater than the predetermined threshold value V13 while the integration result value related to the detection signal from the acceleration sensor 322 is equal to or greater than the predetermined threshold value V13. The CPU 327 turns on the transistor 328 when the following conditions are satisfied. The integration result value related to the detection signal from the acceleration sensor 322 reaches the predetermined threshold value V14 while the integration result value related to the detection signal from the acceleration sensor 312 is equal to or greater than the predetermined threshold value V13.

The squibs 319 and 329 are trigger elements for activating or firing the side air-bag devices 305 and 306, respectively. The squib 319 is connected in series with the transistors 318 and 320 and a power supply (not shown). When both the transistors 318 and 320 fall into ON states, the squib 319 is energized and activated by the power supply. Otherwise, the squib 319 remains inactive. The squib 329 is connected in series with the transistors 328 and 330 and a power supply (not shown). When both the transistors 328 and 330 fall into ON states, the squib 329 is energized and activated by the power supply. Otherwise, the squib 329 remains inactive.

Figure 26:
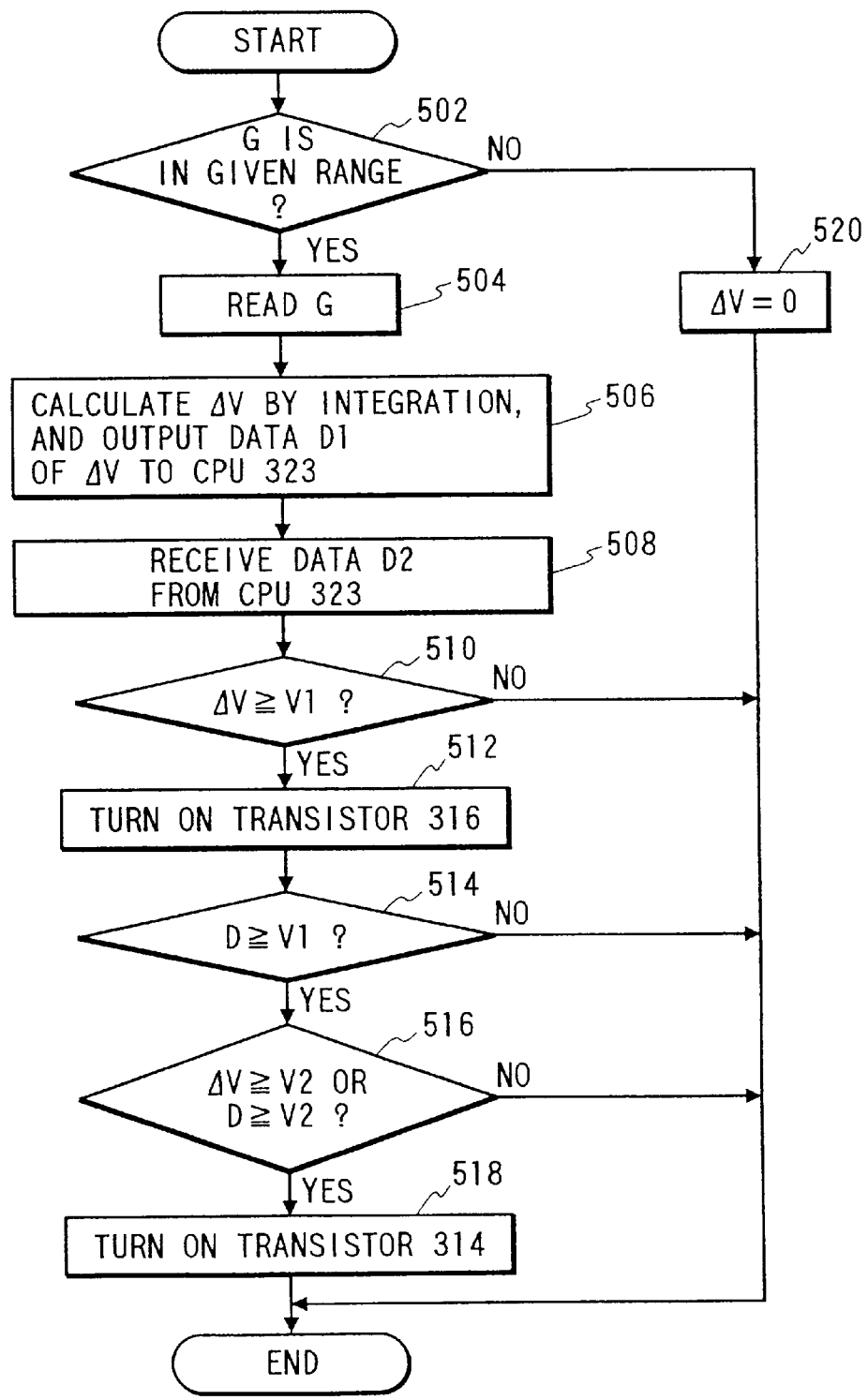
FIG. 26 is a flowchart of a program for controlling a CPU in FIG. 22.

FIG. 26 is a flowchart of the program for controlling the CPU 313. The program in FIG. 26 is periodically reiterated. As shown in FIG. 26, a first step 502 of the program decides whether or not the level (the voltage or the amplitude) of the detection signal from the acceleration sensor 311 is in a predetermined range. The decision by the step 502 is designed to determine whether or not the vehicle body has a chance of undergoing a collision. When the level of the detection signal from the acceleration sensor 311 is in the predetermined range, that is, when the vehicle body has a chance of undergoing a collision, the program advances from the step 502 to a step 504. Otherwise, the program advances from the step 502 to a step 520.

The step 504 reads out or samples the detection signal from the acceleration sensor 311 to update the information of the detection signal from the acceleration sensor 311.

A step 506 following the step 504 subjects the information of the detection signal from the acceleration sensor 311 to processing which corresponds to integrating the detection signal from the acceleration sensor 311. The step 506 calculates the integration result value $\Delta V$ related to the detection signal from the acceleration sensor 311. Then, the step 506 outputs data D1 of the integration result value $\Delta V$ to the CPU 323.

A step 508 subsequent to the step 506 receives data D2 from the CPU 323. The data D2 represents an integration result value related to the detection signal from the acceleration sensor 321.

A step 510 following the step 508 compares the integration result value ΔV with the predetermined threshold value V11. When the integration result value ΔV is equal to or greater than the predetermined threshold value V11, the program advances from the step 510 to a step 512. Otherwise, the program exits from the step 510, and then the current execution cycle of the program ends.

The step 512 turns on the transistor 316. It should be noted that the transistor 316 is normally in an OFF state. After the step 512, the program advances to a step 514.

The step 514 compares the integration result value represented by the data D2 with the predetermined threshold value V11. When the integration result value represented by the data D2 is equal to or greater than the predetermined threshold value V11, the program advances from the step 514 to a step 516. Otherwise, the program exits from the step 514, and then the current execution cycle of the program ends.

The step 516 compares the integration result value ΔV with the predetermined threshold value V12. Also, the step 516 compares the integration result value represented by the data D2 with the predetermined threshold value V12. It should be noted that the predetermined threshold value V12 is greater than the predetermined threshold value V11. When at least one of the integration result value ΔV and the integration result value represented by the data D2 is equal to or greater than the predetermined threshold value V12, it is decided that the vehicle body is undergoing a frontal collision. In this case, the program advances from the step 516 to a step 518. Otherwise, the program exits from the step 516, and then the current execution cycle of the program ends.

The step 518 turns on the transistor 314. It should be noted that the transistor 314 is normally in an OFF state. After the step 518, the current execution cycle of the program ends.

The step 520 clears the integration result value ΔV to "0". After the step 520, the current execution cycle of the program ends.

Generally, when the vehicle body is undergoing a frontal collision, both the transistors 314 and 316 are turned on by the steps 512 and 518. Thus, in this case, the squib 315 is activated so that the front air-bag device 303 for the front passenger's seat is started to operate.

On the other hand, when the step 514 finds the integration result value represented by the data D2 to be smaller than the predetermined threshold value V11, it is decided that the vehicle body is not undergoing a frontal collision. Also, when the step 516 finds both the integration result value ΔV and the integration result value represented by the data D2 to be smaller than the predetermined threshold value V12, it is decided that the vehicle body is not undergoing a frontal collision. In these cases, the step 518 remains unexecuted so that the transistor 314 continues to be in the OFF state. Thus, in these cases, the squib 315 remains inactive, and also the front air-bag device 303 for the front passenger's seat continues to be inactive.

The program for controlling the CPU 323 is similar to the program for controlling the CPU 313 which is shown in FIG. 26. The CPU 323 controls the transistors 324 and 326 in response to the detection signal from the acceleration sensor 321 and the integration-result-value data D1 from the CPU 313. The control of the transistors 324 and 326 by the CPU 323 is similar to the control of the transistors 314 and 316 by the CPU 313. When it is decided that the vehicle body is undergoing a frontal collision, the CPU 323 turns on both the transistors 324 and 326. Thus, in this case, the squib 325 is activated so that the front air-bag device 304 for the driver's seat is started to operate.

The program for controlling the CPU 317 is similar to the program for controlling the CPU 313 except for the following design changes. The program for controlling the CPU 317 uses the predetermined threshold value V13 instead of the predetermined threshold value V11. The program for controlling the CPU 317 uses the predetermined threshold value V14 instead of the predetermined threshold value V12. In the program for controlling the CPU 317, a step corresponding to the step 516 of FIG. 26 implements only comparison between the predetermined threshold value V14 and an integration result value related to the output signal of the acceleration sensor 312. The CPU 317 handles the absolute value of information related to the output signal of the acceleration sensor 312. The CPU 317 controls the transistors 318 and 320 in response to the detection signal from the acceleration sensor 312 and integration-result-value data from the CPU 327. The control of the transistors 318 and 320 by the CPU 317 is similar to the control of the transistors 314 and 316 by the CPU 313. When it is decided that the left-hand side of the vehicle body is undergoing a collision, the CPU 317 turns on both the transistors 318 and 320. Thus, in this case, the squib 319 is activated so that the side air-bag device 305 for the front passenger's seat is started to operate.

The program for controlling the CPU 327 is similar to the program for controlling the CPU 313 except for the following design changes. The program for controlling the CPU 327 uses the predetermined threshold value V13 instead of the predetermined threshold value V11. The program for controlling the CPU 327 uses the predetermined threshold value V14 instead of the predetermined threshold value V12. In the program for controlling the CPU 327, a step corresponding to the step 516 of FIG. 26 implements only comparison between the predetermined threshold value V14 and an integration result value related to the output signal of the acceleration sensor 322. The CPU 327 handles the absolute value of information related to the output signal of the acceleration sensor 322. The CPU 327 controls the transistors 328 and 330 in response to the detection signal from the acceleration sensor 322 and integration-result-value data from the CPU 317. The control of the transistors 328 and 330 by the CPU 327 is similar to the control of the transistors 314 and 316 by the CPU 313. When it is decided that the right-hand side of the vehicle body is undergoing a collision, the CPU 327 turns on both the transistors 328 and 330. Thus, in this case, the squib 329 is activated so that the side air-bag device 306 for the driver's seat is started to operate.

Figure 27:
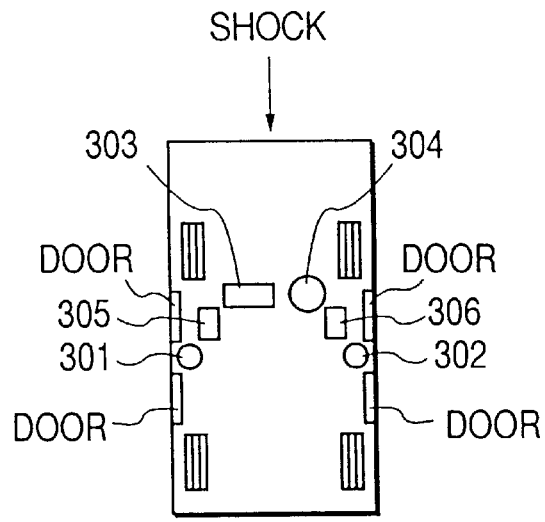
FIG. 27 is a diagram of an automotive vehicle, sensor units, air-bag devices, and a direction of a shock on the vehicle.

It is assumed that as shown in FIG. 27, the vehicle body is undergoing a frontal collision. In this case, as shown in the portions (a) and (c) of FIG. 28, the output signals of the acceleration sensors 311 and 312 change in approximately equal waveforms. The output signal of the acceleration sensor 311 Is subjected by the CPU 313 to an integration process. The result of this integration process changes as shown in the portion (b) of FIG. 28. The output signal of the acceleration sensor 321 is subjected by the CPU 323 to an integration process. The result of this integration process changes as shown in the portion (d) of FIG. 28.

With reference to the portion (b) of FIG. 28, the integration result value related to the output signal of the acceleration sensor 311 reaches the predetermined threshold value V11 at a moment t20. At a subsequent moment t21, the integration result value related to the output signal of the acceleration sensor 311 reaches the predetermined threshold value V12 which is greater than the predetermined threshold value V11. With reference to the portion (d) of FIG. 28, the integration result value related to the output signal of the acceleration sensor 321 reaches the predetermined threshold value V11 at a moment t22 near the moment t20. At a subsequent moment t23 immediately preceding the moment t21, the integration result value related to the output signal of the acceleration sensor 321 reaches the predetermined threshold value V12.

As shown in the portion (e) of FIG. 28, at the moment t20 at which the integration result value related to the output signal of the acceleration sensor 311 reaches the predetermined threshold value V11, the transistor 316 is turned on by the CPU 313. As shown in the portion (h) of FIG. 28, at the moment t22 at which the integration result value related to the output signal of the acceleration sensor 321 reaches the predetermined threshold value V11, the transistor 326 is turned on by the CPU 323.

The CPU 313 turns on the transistor 314 when the following conditions are satisfied. First, one of the integration result values related to the output signals of the acceleration sensors 311 and 321 reaches the predetermined threshold value V12. Second, both the integration result values remain equal to or greater than the predetermined threshold value V11. Specifically, as shown in the portion (f) of FIG. 28, at the moment t23 at which the integration result value related to the output signal of the acceleration sensor 321 reaches the predetermined threshold value V12, the transistor 314 is turned on. Thus, as shown in the portion (g) of FIG. 28, at the moment t23, the squib 315 is changed to an ON state. When the squib 315 is changed to the ON state, the front air-bag device 303 for the front passenger's seat is started to operate.

The CPU 323 turns on the transistor 324 when the following conditions are satisfied. First, one of the integration result values related to the output signals of the acceleration sensors 311 and 321 reaches the predetermined threshold value V12. Second, both the integration result values remain equal to or greater than the predetermined threshold value V11. Specifically, as shown in the portion (i) of FIG. 28, at the moment t23 at which the integration result value related to the output signal of the acceleration sensor 321 reaches the predetermined threshold value V12, the transistor 324 is turned on. Thus, as shown in the portion (j) of FIG. 28, at the moment t23, the squib 325 is changed to an ON state. When the squib 325 is changed to the ON state, the front air-bag device 304 for the driver's seat is started to operate. In this way, the front air-bag devices 303 and 304 are simultaneously triggered or activated.

As understood from the previous explanation, the sensor unit 301 uses the detection signal from the acceleration sensor 321 of the sensor unit 302 in controlling the squib 315. Similarly, the sensor unit 302 uses the detection signal from the acceleration sensor 311 of the sensor unit 301 in controlling the squib 325. Accordingly, there is provided a redundancy in the control of the squibs 315 and 325. The redundancy provides an increased reliability of operation of the sensor units 301 and 302. The acceleration sensor 311 is used by both the sensor units 301 and 302. The acceleration sensor 321 is used by both the sensor units 301 and 302. Accordingly, a small number of the acceleration sensors 311 and 321 suffices. This is advantageous in structural simplicity and cost.

Generally, the acceleration sensors 312 and 322 are insensible to deceleration in the longitudinal direction of the vehicle body. When the vehicle body is subjected to deceleration in the longitudinal direction, the squibs 319 and 329 thus remain inactive. Accordingly, upon a frontal collision, the side air-bag devices 305 and 306 are prevented from operating.

Figure 29:
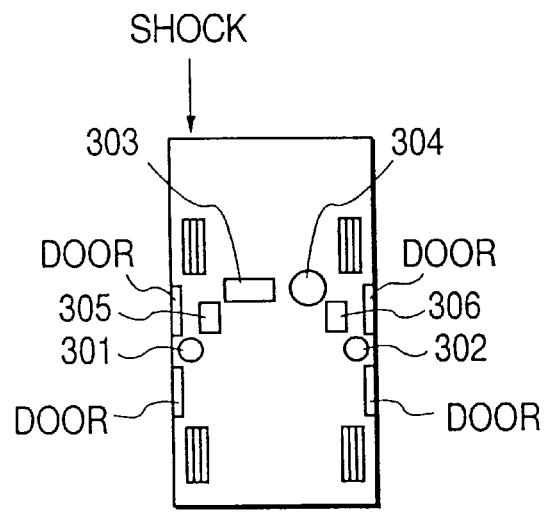
FIG. 29 is a diagram of an automotive vehicle, sensor units, air-bag devices, and a direction of a shock on the vehicle.

It is assumed that as shown in FIG. 29, the left-hand portion of the vehicle body is undergoing an offset collision. In this case, as shown in the portions (a) and (c) of FIG. 30, the output signals of the acceleration sensors 311 and 312 change in significantly different waveforms, respectively. Since the left-hand portion of the vehicle body is undergoing an offset collision, a level peak of the output signal of the acceleration sensor 311 is greater than a level peak of the output signal of the acceleration sensor 321. The output signal of the acceleration sensor 311 is subjected by the CPU 313 to the integration process. The result of this integration process changes as shown in the portion (b) of FIG. 30. The output signal of the acceleration sensor 321 is subjected by the CPU 323 to the integration process. The result of this integration process changes as shown in the portion (d) of FIG. 30.

Figure 30:
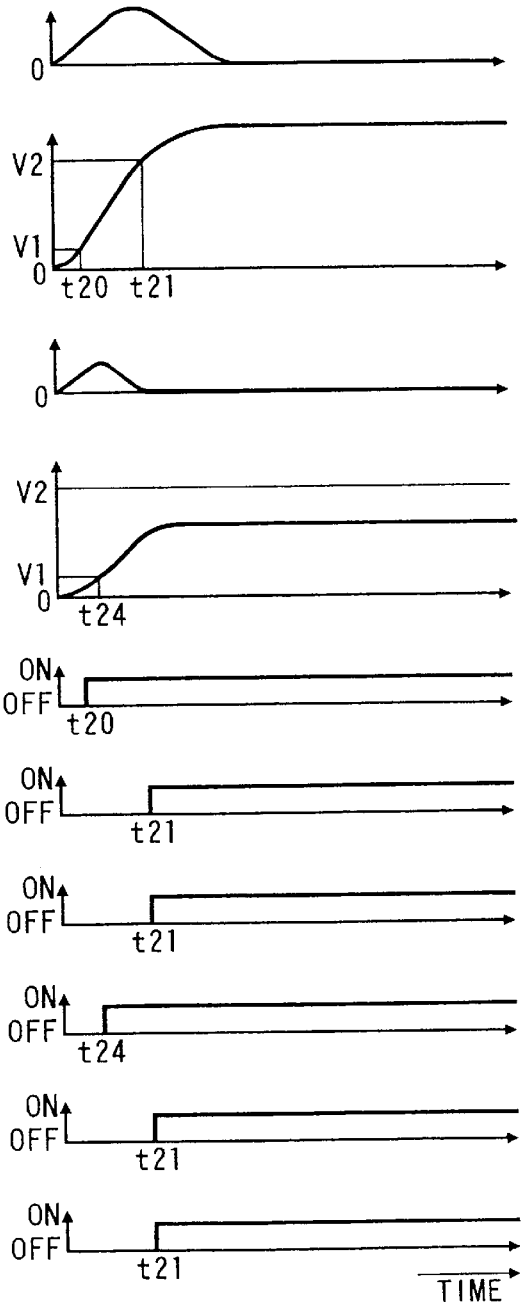
FIG. 30 is a time-domain diagram of a second example of signals and conditions of components in the triggering device of FIG. 22.

With reference to the portion (b) of FIG. 30, the integration result value related to the output signal of the acceleration sensor 311 reaches the predetermined threshold value V11 at a moment t20. At a subsequent moment t21, the integration result value related to the output signal of the acceleration sensor 311 reaches the predetermined threshold value V12 which is greater than the predetermined threshold value V11. With reference to the portion (d) of FIG. 30, the integration result value related to the output signal of the acceleration sensor 321 reaches the predetermined threshold value V11 at a moment t24 between the moments t20 and t21. The integration result value related to the output signal of the acceleration sensor 321 remains smaller than the predetermined threshold value V12.

As shown in the portion (e) of FIG. 30, at the moment t20 at which the integration result value related to the output signal of the acceleration sensor 311 reaches the predetermined threshold value V11, the transistor 316 is turned on by the CPU 313. As shown in the portion (h) of FIG. 30, at the moment t24 at which the integration result value related to the output signal of the acceleration sensor 321 reaches the predetermined threshold value V11, the transistor 326 is turned on by the CPU 323.

The CPU 313 turns on the transistor 314 when the following conditions are satisfied. First, one of the integration result values related to the output signals of the acceleration sensors 311 and 321 reaches the predetermined threshold value V12. Second, both the integration result values remain equal to or greater than the predetermined threshold value V11. Specifically, as shown in the portion (f) of FIG. 30, at the moment t21 at which the integration result value related to the output signal of the acceleration sensor 311 reaches the predetermined threshold value V12, the transistor 314 is turned on. Thus, as shown in the portion (g) of FIG. 30, at the moment t21, the squib 315 is changed to the ON state. When the squib 315 is changed to the ON state, the front air-bag device 303 for the front passenger's seat is started to operate.

The CPU 323 turns on the transistor 324 when the following conditions are satisfied. First, one of the integration result values related to the output signals of the acceleration sensors 311 and 321 reaches the predetermined threshold value V12. Second, both the integration result values remain equal to or greater than the predetermined threshold value V11. Specifically, as shown in the portion (i)

of FIG. 30, at the moment t21 at which the integration result value related to the output signal of the acceleration sensor 311 reaches the predetermined threshold value V12, the transistor 324 is turned on. Thus, as shown in the portion (j) of FIG. 30, at the moment t21, the squib 325 is changed to an ON state. When the squib 325 is changed to the ON state, the front air-bag device 304 for the driver's seat is started to operate. In this way, the front air-bag devices 303 and 304 are simultaneously fired or activated.

As understood from the previous explanation, OR operation is implemented between the decisions as to the integration result values related to the output signals of the acceleration sensors 311 and 321. When the left-hand portion of the vehicle body is undergoing an offset collision, the integration result value related to the output signal of the acceleration sensor 311 reaches the predetermined threshold value V12 although the integration result value related to the acceleration sensor 321 remains below the predetermined threshold value V12. Therefore, as previously explained, the front air-bag devices 303 and 304 are triggered and activated. In this case, the side air-bag devices 305 and 306 are prevented from operating.

When the right-hand portion of the vehicle body is undergoing an offset collision, the integration result value related to the output signal of the acceleration sensor 321 reaches the predetermined threshold value V12 and the integration result value related to the acceleration sensor 311 becomes equal to or greater than the predetermined threshold value V11. Therefore, in this case, the front air-bag devices 303 and 304 are simultaneously triggered and activated.

During the occurrence of deceleration such that the integration result values related to the output signals of the acceleration sensors 311 and 321 exceed the predetermined threshold value V11 but do not reach the predetermined threshold value V12, the transistors 314 and 324 remain in the OFF states. Thus, in this case, the squibs 315 and 325 remain inactive, and the front air-bag devices 303 and 304 continue to be inactive. Accordingly, the front air-bag devices 303 and 304 are prevented from responding to small deceleration such as deceleration which occurs during stop of the vehicle body or deceleration caused by vibration of the vehicle body during the travel thereof. It is thus possible to attain an adequate reliability of the control of the squibs 315 and 325.

Figure 31:
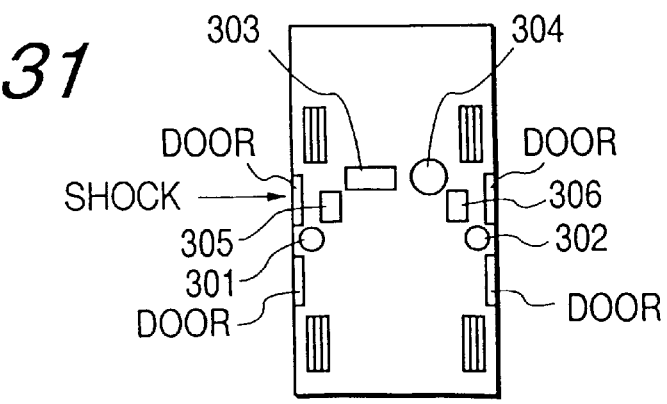
FIG. 31 is a diagram of an automotive vehicle, sensor units, air-bag devices, and a direction of a shock on the vehicle.

It is assumed that as shown in FIG. 31, the vehicle body is undergoing a side collision from the left. In this case, as shown in the portions (a) and (c) of FIG. 32, the output signals of the acceleration sensors 312 and 322 change in significantly different waveforms, respectively. Since the vehicle body is undergoing a side collision from the left, a level peak of the output signal of the acceleration sensor 312 is greater than a level peak of the output signal of the acceleration sensor 322. The output signal of the acceleration sensor 312 is subjected by the CPU 317 to an integration process. The result of this integration process changes as shown in the portion (b) of FIG. 32. The output signal of the acceleration sensor 322 is subjected by the CPU 327 to an integration process. The result of this integration process changes as shown in the portion (d) of FIG. 32.

With reference to the portion (b) of FIG. 32, the integration result value related to the output signal of the acceleration sensor 312 reaches the predetermined threshold value V13 at a moment t26. At a subsequent moment t27, the integration result value related to the output signal of the acceleration sensor 312 reaches the predetermined threshold value V14 which is greater than the predetermined threshold value V13. With reference to the portion (d) of FIG. 32, the integration result value related to the output signal of the acceleration sensor 322 reaches the predetermined threshold value V13 at a moment t28 between the moments t26 and t27. The integration result value related to the output signal of the acceleration sensor 322 remains smaller than the predetermined threshold value V14.

As shown in the portion (e) of FIG. 32, at the moment t26 at which the integration result value related to the output signal of the acceleration sensor 312 reaches the predetermined threshold value V13, the transistor 320 is turned on by the CPU 317. As shown in the portion (h) of FIG. 32, at the moment t28 at which the integration result value related to the output signal of the acceleration sensor 322 reaches the predetermined threshold value V13, the transistor 330 is turned on by the CPU 327.

The CPU 317 turns on the transistor 318 when the following conditions are satisfied. The integration result value related to the output signal of the acceleration sensor 312 reaches the predetermined threshold value V14 while the integration result value related to the output signal of the acceleration sensor 322 remains equal to or greater than the predetermined threshold value V13. Specifically, as shown in the portion (f) of FIG. 32, at the moment t27 at which the integration result value related to the output signal of the acceleration sensor 312 reaches the predetermined threshold value V14, the transistor 318 is turned on. Thus, as shown in the portion (g) of FIG. 32, at the moment t27, the squib 319 is changed to the ON state. When the squib 319 is changed to the ON state, the side air-bag device 305 for the front passenger's seat is started to operate.

The integration result value related to the output signal of the acceleration sensor 322 remains below the predetermined threshold value V14. Therefore, as shown in the portion (i) of FIG. 32, the transistor 328 remains in the OFF state. As shown in the portion (j) of FIG. 32, the squib 329 continues to be inactive also. Thus, in this case, the side air-bag device 306 for the driver's seat is not started to operate.

Generally, the acceleration sensors 311 and 321 are insensible to deceleration in the width-wise direction of the vehicle body. When the vehicle body is subjected to deceleration in the width-wise direction, the squibs 315 and 325 thus remain inactive. Accordingly, upon a side collision, the front air-bag devices 303 and 304 are prevented from operating.

It is assumed that the vehicle body is undergoing a side collision from the right. In this case, the output signals of the acceleration sensors 312 and 322 change in significantly different waveforms, respectively. Since the vehicle body is undergoing a side collision from the right, a level peak of the output signal of the acceleration sensor 322 is greater than a level peak of the output signal of the acceleration sensor 312. The output signal of the acceleration sensor 312 is subjected by the CPU 317 to the integration process. The result of this integration process changes in time domain. The output signal of the acceleration sensor 322 is subjected by the CPU 327 to the integration process. The result of this integration process changes in time domain. The integration result value related to the output signal of the acceleration sensor 312 exceeds the predetermined threshold value V13 but does not reach the predetermined threshold value V14. On the other hand, the integration result value related to the output signal of the acceleration sensor 322 successively reaches the predetermined threshold values V13 and V14.

When the integration result value related to the output signal of the acceleration sensor 312 reaches the predetermined threshold value V13, the transistor 320 is turned on by the CPU 317. When the integration result value related to the output signal of the acceleration sensor 322 reaches the predetermined threshold value V13, the transistor 330 is turned on by the CPU 327.

The CPU 327 turns on the transistor 328 when the following conditions are satisfied. The integration result value related to the output signal of the acceleration sensor 322 reaches the predetermined threshold value V14 while the integration result value related to the output signal of the acceleration sensor 312 remains equal to or greater than the predetermined threshold value V13. In this case, the transistor 328 is actually turned on. Thus, the squib 329 is changed to the ON state. When the squib 329 is changed to the ON state, the side air-bag device 306 for the driver's seat is started to operate.

In this case, the integration result value related to the output signal of the acceleration sensor 312 remains below the predetermined threshold value V14. Therefore, the transistor 318 remains in the OFF state, and the squib 319 continues to be inactive. Thus, in this case, the side air-bag device 305 for the front passenger's seat is not started to operate.

As understood from the previous explanation, it is unnecessary to provide any safety sensor which is required by the arrangement disclosed in Japanese published unexamined patent application 5-38998. This is advantageous in structural simplicity and cost. The sensor units 301 and 302 are formed as two hardware pieces, respectively. Thus, the sensor units 301 and 302 can be easily mounted on the vehicle body.

This embodiment may be modified to control side air-bag devices for rear passenger's seats or safety-belt pretensioners. This embodiment may also be modified to cope with a collision against the rear of the vehicle body.

Eighth Embodiment

Figure 33:
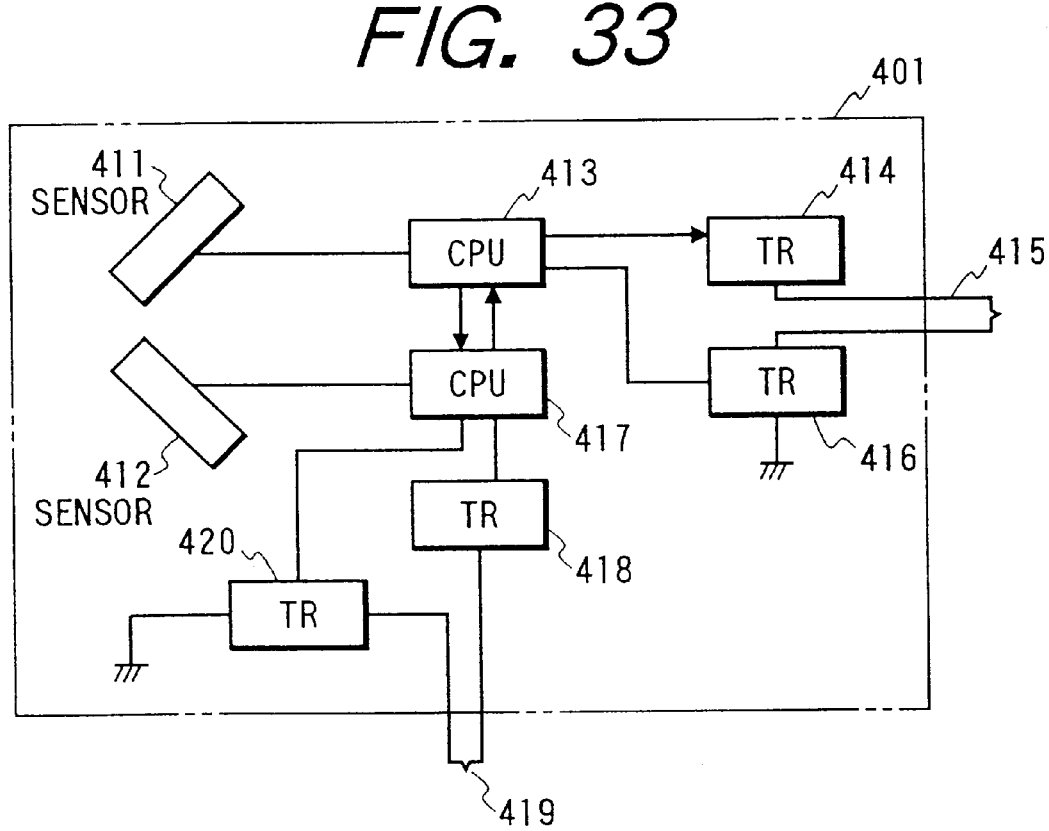
FIG. 33 is a block diagram of a first sensor unit in a triggering device according to an eighth embodiment of this invention.

With reference to FIG. 33, a sensor unit 401 located at a left-hand side portion of a vehicle body includes acceleration sensors 411 and 412. The acceleration sensors 411 and 412 are orientated relative to the vehicle body as follows. Directions perpendicular to major surfaces of the acceleration sensors 411 and 412 form predetermined angles (for example, about 45 degrees) with respect to a longitudinal direction of the vehicle body as viewed in a plane horizontal with respect to the vehicle body.

The sensor unit 401 also includes CPU's 413 and 417, and transistors 414, 416, 418, and 420. The acceleration sensor 411 is connected to the CPU 413. The CPU 413 is connected to the transistors 414 and 416. The transistors 414 and 416 serve as switches, respectively. A squib (a trigger component) 415 is connected between the transistors 414 and 416. The acceleration sensor 412 is connected to the CPU 417. The CPU 417 is connected to the transistors 418 and 420. The transistors 418 and 420 serve as switches, respectively. The CPU 417 is also connected to the CPU 413. A squib (a trigger component) 419 is connected between the transistors 418 and 420.

Figure 34:
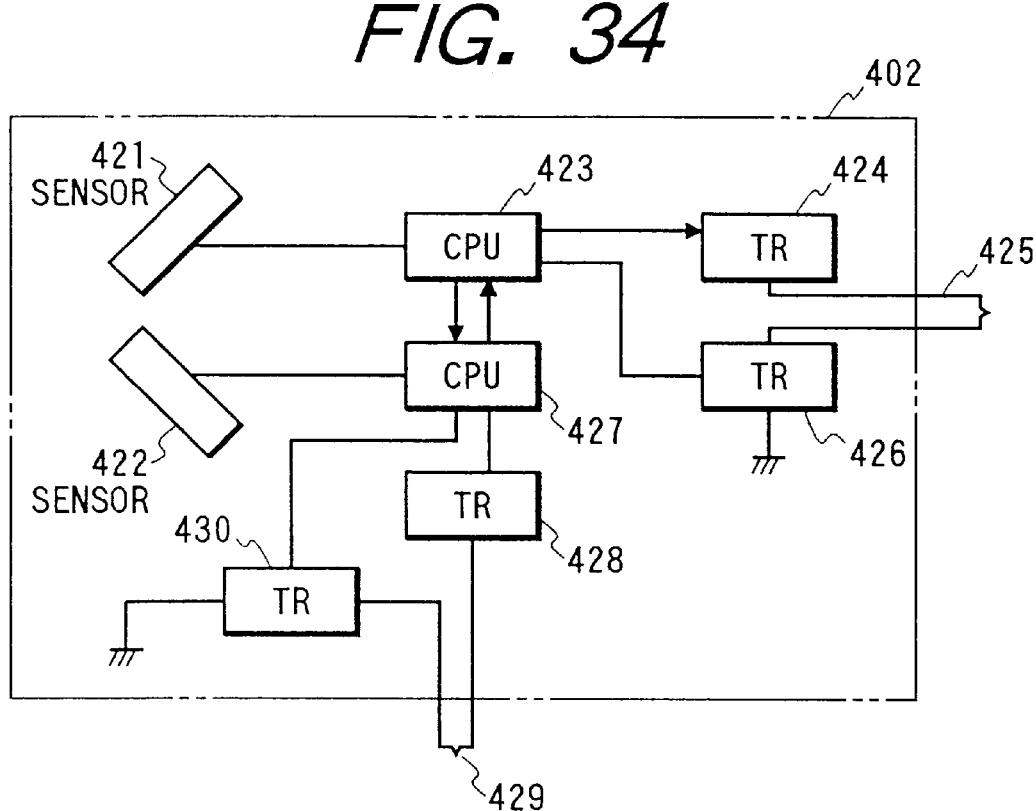
FIG. 34 is a block diagram of a second sensor unit in the triggering device according to the eighth embodiment of this invention.

With reference to FIG. 34, a sensor unit 402 located at a right-hand side portion of the vehicle body includes acceleration sensors 421 and 422. The acceleration sensors 421 and 422 are orientated relative to the vehicle body as follows. Directions perpendicular to major surfaces of the acceleration sensors 421 and 422 form predetermined angles (for example, about 45 degrees) with respect to the longitudinal direction of the vehicle body as viewed in a plane horizontal with respect to the vehicle body.

The sensor unit 402 also includes CPU's 423 and 427, and transistors 424, 426, 428, and 430. The acceleration sensor 421 is connected to the CPU 423. The CPU 423 is connected to the transistors 424 and 426. The transistors 424 and 426 serve as switches, respectively. A squib (a trigger component) 425 is connected between the transistors 424 and 426. The acceleration sensor 422 is connected to the CPU 427. The CPU 427 is connected to the transistors 428 and 430. The transistors 428 and 430 serve as switches, respectively. The CPU 427 is also connected to the CPU 423. A squib (a trigger component) 429 is connected between the transistors 428 and 430.

The squibs 415 and 425 are trigger elements to activate or fire front air-bag devices for a front passenger's seat and a driver's seat, respectively. The squib 415 is connected in series with the transistors 414 and 416 and a power supply (not shown). When both the transistors 414 and 416 fall into ON states, the squib 415 is energized and activated by the power supply. Otherwise, the squib 415 remains inactive. The squib 425 is connected in series with the transistors 424 and 426 and a power supply (not shown). When both the transistors 424 and 426 fall into ON states, the squib 425 is energized and activated by the power supply. Otherwise, the squib 425 remains inactive.

The squibs 419 and 429 are trigger elements to activate or fire side air-bag devices for the front passenger's seat and the driver's seat, respectively. The squib 419 is connected in series with the transistors 418 and 420 and a power supply (not shown). When both the transistors 418 and 420 fall into ON states, the squib 419 is energized and activated by the power supply. Otherwise, the squib 419 remains inactive. The squib 429 is connected in series with the transistors 428 and 430 and a power supply (not shown). When both the transistors 428 and 430 fall into ON states, the squib 429 is energized and activated by the power supply. Otherwise, the squib 429 remains inactive.

Figure 35:
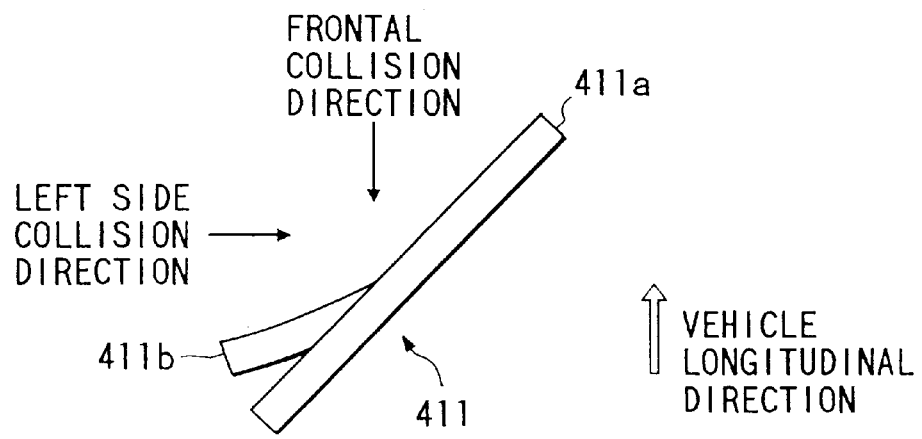
FIG. 35 is a side view of an acceleration sensor.

The acceleration sensors 411, 412, 421, and 422 have structures similar to each other. As shown in FIG. 35, the acceleration sensor 411 has a frame 41 1a and a cantilever 411b. The cantilever 411b extends from the frame 411a. As previously explained, the direction perpendicular to the major surfaces of the acceleration sensor 411 inclines with respect to the longitudinal direction of the vehicle body. Therefore, the cantilever 11b is displaced in the case where the vehicle body undergoes deceleration due to a collision at the front and also in the case where the vehicle body undergoes deceleration due to a side collision from the left. Thus, the acceleration sensor 411 is sensible to deceleration in the longitudinal direction and also the width-wise direction of the vehicle body. Similarly, each of the acceleration sensors 412, 421, and 422 is sensible to deceleration in the longitudinal direction and also the width-wise direction of the vehicle body.

The acceleration sensors 411 and 412 are oriented in directions which differ from each other by a predetermined angle with respect to the longitudinal direction of the vehicle body. The acceleration sensors 421 and 422 are oriented in directions which differ from each other by a predetermined angle with respect to the longitudinal direction of the vehicle body.

Each of the acceleration sensors 411, 412, 421, and 422 outputs a detection signal which has a positive polarity or a negative polarity depending on the direction of deceleration acting thereon. The detection signal from the acceleration sensor 411 assumes a positive polarity when the acceleration sensor 411 is subjected to deceleration due to a collision at the front or a side collision from the left. The detection signal from the acceleration sensor 412 assumes a positive polarity when the acceleration sensor 412 is subjected to deceleration due to a collision at the front. The detection signal from the acceleration sensor 412 assumes a negative polarity when the acceleration sensor 412 is subjected to deceleration due to a side collision from the left. The detection signal from the acceleration sensor 421 assumes a positive polarity when the acceleration sensor 421 is subjected to deceleration due to a collision at the front or a side collision from the right. The detection signal from the acceleration sensor 422 assumes a positive polarity when the acceleration sensor 422 is subjected to deceleration due to a collision at the front. The detection signal from the acceleration sensor 422 assumes a negative polarity when the acceleration sensor 422 is subjected to deceleration due to a side collision from the right.

The direction of a collision can be decided by a combination of the polarities of the detection signals from the acceleration sensors 411, 412, 421, and 422. In the case where both the polarities of the detection signals from the acceleration sensors 411 and 421 are positive while both the polarities of the detection signals from the acceleration sensors 412 and 422 are positive, it is decided that a collision at the front occurs. In the case where the polarities of the detection signals from the acceleration sensors 411, 412, 421, and 422 are positive, negative, negative, and positive respectively, it is decided that a side collision from the left occurs. In the case where the polarities of the detection signals from the acceleration sensors 411, 412, 421, and 422 are negative, positive, positive, and negative respectively, it is decided that a side collision from the right occurs. In the case where both the polarities of the detection signals from the acceleration sensors 411 and 421 are negative while both the polarities of the detection signals from the acceleration sensors 412 and 422 are negative, it is decided that a collision from the rear occurs.

Regarding the sensor unit 401, it is understood that the vehicle body is subjected to deceleration in the longitudinal direction when the polarities of the detection signals from the acceleration sensors 411 and 412 are equal. Furthermore, it is understood that the vehicle body is subjected to deceleration in the width-wise direction when the polarities of the detection signals from the acceleration sensors 411 and 412 are different.

Regarding the sensor unit 402, it is understood that the vehicle body is subjected to deceleration in the longitudinal direction when the polarities of the detection signals from the acceleration sensors 421 and 422 are equal. Furthermore, it is understood that the vehicle body is subjected to deceleration in the width-wise direction when the polarities of the detection signals from the acceleration sensors 421 and 422 are different.

In this embodiment, the direction of a collision is decided by a combination of the polarities of integration result values related to output signals of the acceleration sensors 411, 412, 421, and 422.

The CPU 413 includes a combination of an I/O port (an interface), a processing section, a ROM, and a RAM. The CPU 413 operates in accordance with a program stored in the ROM. Similarly, the CPU 417 includes a combination of an I/O port (an interface), a processing section, a ROM, and a RAM. The CPU 417 operates in accordance with a program stored in the ROM.

The CPU 423 includes a combination of an I/O port (an interface), a processing section, a ROM, and a RAM. The CPU 423 operates in accordance with a program stored in the ROM. Similarly, the CPU 427 includes a combination of an I/O port (an interface), a processing section, a ROM, and a RAM. The CPU 427 operates in accordance with a program stored in the ROM.

The programs for controlling the CPU's 413, 417, 423, and 427 are designed to implement the following processes. In the case where the polarities of integration result values related to the detection signals from the acceleration sensors 411 and 412 are positive and the integration result values reach a predetermined value, the CPU 413 operates to activate the squib 415 to trigger the front air-bag device for the front passenger's seat. Thereby, an occupant in the front passenger's seat can be protected from a collision at the front. In the case where the polarities of the integration result values related to the detection signals from the acceleration sensors 411 and 412 are positive and negative respectively and the integration result values reach predetermined values respectively, the CPU 417 operates to activate the squib 419 to trigger the side air-bag device for the front passenger's seat. Thereby, an occupant in the front passenger's seat can be protected from a side collision from the left. In the case where the polarities of integration result values related to the detection signals from the acceleration sensors 421 and 422 are positive and the integration result values reach a predetermined value, the CPU 423 operates to activate the squib 425 to trigger the front air-bag device for the driver's seat. Thereby, an occupant in the driver's seat can be protected from a collision at the front. In the case where the polarities of the integration result values related to the detection signals from the acceleration sensors 421 and 422 are positive and negative respectively and the integration result values reach predetermined values respectively, the CPU 427 operates to activate the squib 429 to trigger the side air-bag device for the driver's seat. Thereby, an occupant in the driver's seat can be protected from a side collision from the right.

Figure 36:
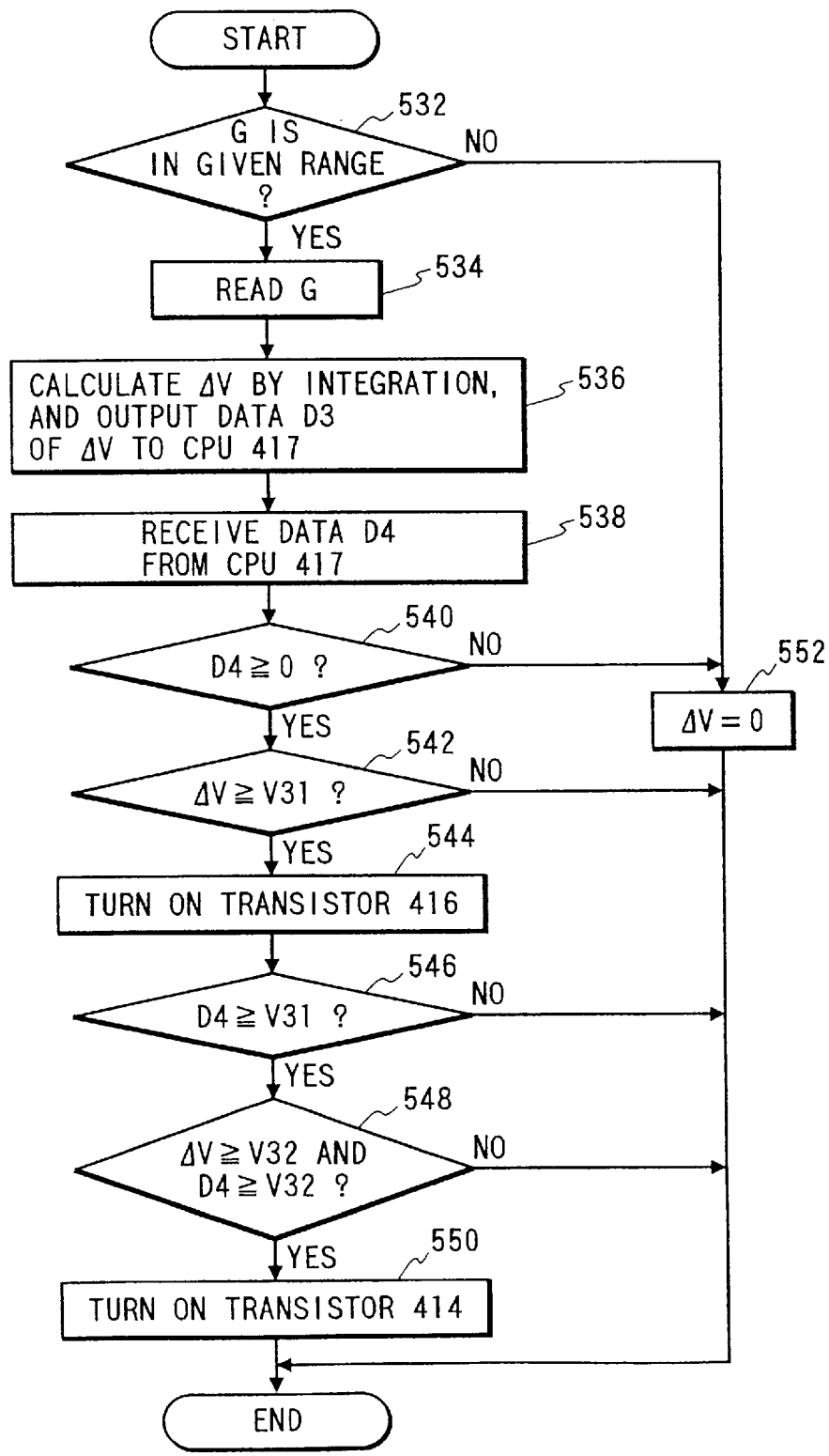
FIG. 36 is a flowchart of a program for controlling a CPU in FIG. 33.

FIG. 36 is a flowchart of the program for controlling the CPU 413. The program in FIG. 36 is periodically reiterated. As shown in FIG. 36, a first step 532 of the program decides whether or not the level (the voltage or the amplitude) of the detection signal from the acceleration sensor 411 is in a predetermined range. The decision by the step 532 is designed to determine whether or not the vehicle body has a chance of undergoing a collision. When the level of the detection signal from the acceleration sensor 411 is in the predetermined range, that is, when the vehicle body has a chance of undergoing a collision, the program advances from the step 532 to a step 534. Otherwise, the program advances from the step 532 to a step 552.

The step 534 reads out or samples the detection signal from the acceleration sensor 411 to update the information of the detection signal from the acceleration sensor 411.

A step 536 following the step 534 subjects the information of the detection signal from the acceleration sensor 411 to processing which corresponds to integrating the detection signal from the acceleration sensor 411. The step 536 calculates the integration result value ΔV related to the detection signal from the acceleration sensor 411. Then, the step 536 outputs data D3 of the integration result value ΔV to the CPU 417.

A step 538 subsequent to the step 536 receives data D4 from the CPU 417. The data D4 represents an integration result value related to the detection signal from the acceleration sensor 412.

A step 540 following the step 538 compares the integration result value represented by the data D4 with "0" to decide the polarity of the integration result value. When the integration result value represented by the data D4 is equal to or greater than "0", that is, when the polarity of the integration result value is not negative, the program advances from the step 540 to a step 542. In this case, it is decided that the vehicle body is subjected to deceleration in the longitudinal direction. When the integration result value represented by the data D4 is smaller than "0", that is, when the polarity of the integration result value is negative, the program advances from the step 540 to the step 552.

The step 542 compares the integration result value ΔV with a predetermined threshold value V31. When the integration result value ΔV is equal to or greater than the predetermined threshold value V31, the program advances from the step 542 to a step 544. Otherwise, the program exits from the step 542, and then the current execution cycle of the program ends.

The step 544 turns on the transistor 416. It should be noted that the transistor 416 is normally in an OFF state. After the step 544, the program advances to a step 546.

The step 546 compares the integration result value represented by the data D4 with the predetermined threshold value V31. When the integration result value represented by the data D4 is equal to or greater than the predetermined threshold value V31, the program advances from the step 546 to a step 548. Otherwise, the program exits from the step 546, and then the current execution cycle of the program ends.

The step 548 compares the integration result value ΔV with a predetermined threshold value V32. The predetermined threshold value V32 is greater than the predetermined threshold value V31. Also, the step 548 compares the integration result value represented by the data D4 with the predetermined threshold value V32. When both the integration result value ΔV and the integration result value represented by the data D4 are equal to or greater than the predetermined threshold value V32, it is decided that the vehicle body is undergoing a collision at the front. In this case, the program advances from the step 548 to a step 550. Otherwise, the program exits from the step 548, and then the current execution cycle of the program ends.

The step 550 turns on the transistor 414. It should be noted that the transistor 414 is normally in an OFF state. After the step 550, the current execution cycle of the program ends.

The step 552 clears the integration result value ΔV to "0". After the step 552, the current execution cycle of the program ends.

Generally, when the vehicle body is undergoing a frontal collision, both the transistors 414 and 416 are turned on by the steps 544 and 550. Thus, in this case, the squib 415 is activated so that the front air-bag device for the front passenger's seat is started to operate.

On the other hand, when the step 546 finds the integration result value represented by the data D4 to be smaller than the predetermined threshold value V31, it is decided that the vehicle body is not undergoing a frontal collision. Also, when the step 548 finds at least one of the integration result value ΔV and the integration result value represented by the data D4 to be smaller than the predetermined threshold value V32, it is decided that the vehicle body is not undergoing a frontal collision. In these cases, the step 550 remains unexecuted so that the transistor 414 continues to be in the OFF state. Thus, in these cases, the squib 415 remains inactive, and also the front air-bag device for the front passenger's seat continues to be inactive.

The program for controlling the CPU 417 is similar to the program for controlling the CPU 413 except for the following design changes. The CPU 417 is programmed to use the detection signal from the acceleration sensor 412 and also the data D3 from the CPU 413 which represents the integration result value related to the output signal of the acceleration sensor 411. In the program for controlling the CPU 417, a threshold value for the integration result value related to the output signal of the acceleration sensor 412 is set as a negative value. The CPU 417 controls the transistors 418 and 420 as the CPU 413 controls the transistors 414 and 416. Specifically, in the case where the integration result value related to the detection signal from the acceleration sensor 412 is negative and is equal to or smaller than a predetermined threshold value −V31, the CPU 417 turns on the transistor 420. In the case where the integration result value related to the detection signal from the acceleration sensor 412 is equal to or smaller than a predetermined threshold value −V32 while the integration result value represented by the data D3 is equal to or greater than the predetermined threshold value V32, the CPU 417 turns on the transistor 418. When it is decided that the left-hand side of the vehicle body is undergoing a collision, the CPU 417 turns on both the transistors 418 and 420. Thus, in this case, the squib 419 is activated so that the side air-bag device for the front passenger's seat is started to operate.

The program for controlling the CPU 423 is similar to the program for controlling the CPU 413 except for the following design changes. The CPU 423 is programmed to use the detection signal from the acceleration sensor 421 and also data from the CPU 427 which represents an integration result value related to the output signal of the acceleration sensor 422. The CPU 423 controls the transistors 424 and 426 as the CPU 413 controls the transistors 414 and 416. When it is decided that the vehicle body is undergoing a collision at the front, the CPU 423 turns on both the transistors 424 and 426. Thus, in this case, the squib 425 is activated so that the front air-bag device for the driver's seat is started to operate.

The program for controlling the CPU 427 is similar to the program for controlling the CPU 413 except for the following design changes. The CPU 427 is programmed to use the detection signal from the acceleration sensor 422 and also data from the CPU 423 which represents the integration result value related to the output signal of the acceleration sensor 421. In the program for controlling the CPU 427, a threshold value for the integration result value related to the output signal of the acceleration sensor 422 is set as a negative value. The CPU 427 controls the transistors 428 and 430 as the CPU 413 controls the transistors 414 and 416. Specifically, in the case where the integration result value related to the detection signal from the acceleration sensor 422 is negative and is equal to or smaller than a predetermined threshold value −V31, the CPU 427 turns on the transistor 430. In the case where the integration result value related to the detection signal from the acceleration sensor 422 is equal to or smaller than a predetermined threshold value −V32 while the integration result value represented by the data from the CPU 423 is equal to or greater than the predetermined threshold value V32, the CPU 427 turns on the transistor 428. When it is decided that the right-hand side of the vehicle body is undergoing a collision, the CPU 427 turns on both the transistors 428 and 430. Thus, in this case, the squib 429 is activated so that the side air-bag device for the driver's seat is started to operate.

It is assumed that the vehicle body is undergoing a frontal collision. In this case, the acceleration sensors 411 and 412 detect deceleration caused by the frontal collision. Accordingly, as shown in the portions (a) and (c) of FIG. 37, the output signals of the acceleration sensors 411 and 412 change in approximately equal waveforms having positive polarities. The output signal of the acceleration sensor 411 is subjected by the CPU 413 to an integration process. The result of this integration process changes as shown in the portion (b) of FIG. 37. The output signal of the acceleration sensor 412 is subjected by the CPU 417 to an integration process. The result of this integration process changes as shown in the portion (d) of FIG. 37.

With reference to the portion (b) of FIG. 37, the integration result value related to the output signal of the acceleration sensor 411 reaches the predetermined threshold value V31 at a moment t30. At a subsequent moment t31, the integration result value related to the output signal of the acceleration sensor 411 reaches the predetermined threshold value V32 which is greater than the predetermined threshold value V31. With reference to the portion (d) of FIG. 37, the integration result value related to the output signal of the acceleration sensor 412 reaches the predetermined threshold value V31 at a moment t32 near the moment t30. At a subsequent moment t33 immediately following the moment t31, the integration result value related to the output signal of the acceleration sensor 412 reaches the predetermined threshold value V32.

As shown in the portion (e) of FIG. 37, at the moment t30 at which the integration result value related to the output signal of the acceleration sensor 411 reaches the predetermined threshold value V31, the transistor 416 is turned on by the CPU 413. At the moment t32, although the integration result value related to the output signal of the acceleration sensor 412 reaches the predetermined threshold value V31, the detection signal from the acceleration sensor 412 is positive and hence it is decided that a side collision from the left does not occur. Thus, as shown in the portions (h) and (i) of FIG. 37, the CPU 417 holds the transistors 418 and 420 in the OFF states. Accordingly, the squib 419 remains inactive as shown in the portion (j) of FIG. 37, and the side air-bag device for the front passenger's seat continues to be inactive.

At the moment t33 at which both the integration result values related to the output signals of the acceleration sensors 411 and 412 become equal to or greater than the predetermined threshold value V32, the CPU 413 turns on the transistor 414 as shown in the portion (f) of FIG. 37. Thus, as shown in the portion (g) of FIG. 37, at the moment t33, the squib 415 is changed to an ON state. When the squib 415 is changed to the ON state, the front air-bag device for the front passenger's seat is started to operate.

In this way, the sensor unit 401 uses the polarities of the detection signals from the acceleration sensors 411 and 412 (or the polarities of the integration result values related to the output signals of the acceleration sensors 411 and 412), thereby triggering the front air-bag device without activating the side air-bag device upon a frontal collision. Similarly, the sensor unit 402 uses the polarities of the detection signals from the acceleration sensors 421 and 422 (or the polarities of the integration result values related to the output signals of the acceleration sensors 421 and 422), thereby triggering the front air-bag device without activating the side air-bag device upon a frontal collision.

The sensor units 401 and 402 may be modified to reliably cope with an offset collision. In this modification, each of the front air-bag devices is controlled by a result of OR operation between trigger signals for the front air-bag devices as in the embodiment of FIG. 22. Furthermore, each of the side air-bag devices is controlled by a result of OR operation between trigger signals for the side air-bag devices as in the embodiment of FIG. 22.

It is assumed that the vehicle body is undergoing a side collision from the left. In this case, the acceleration sensors 411 and 412 detect deceleration caused by the side collision from the left. Accordingly, as shown in the portions (a) and (c) of FIG. 38, the output signals of the acceleration sensors 411 and 412 change in significantly different waveforms having a positive polarity and a negative polarity, respectively. The output signal of the acceleration sensor 411 is subjected by the CPU 413 to an integration process. The result of this integration process changes as shown in the portion (b) of FIG. 38. The output signal of the acceleration sensor 412 is subjected by the CPU 417 to an integration process. The result of this integration process changes as shown in the portion (d) of FIG. 38.

With reference to the portion (b) of FIG. 38, the integration result value related to the output signal of the acceleration sensor 411 reaches the predetermined threshold value V31 at a moment t34. At a subsequent moment t35, the integration result value related to the output signal of the acceleration sensor 411 reaches the predetermined threshold value V32 which is greater than the predetermined threshold value V31. With reference to the portion (d) of FIG. 38, the integration result value related to the output signal of the acceleration sensor 412 reaches the predetermined threshold value −V31 at a moment t36 near the moment t34. Then, the integration result value related to the output signal of the acceleration sensor 412 reaches the predetermined threshold value −V32 at a moment t37 immediately preceding the moment t35.

As shown in the portion (e) of FIG. 38, at the moment t34 at which the integration result value related to the output signal of the acceleration sensor 411 reaches the predetermined threshold value V31, the transistor 416 is turned on by the CPU 413. As shown in the portion (h) of FIG. 38, at the moment t36 at which the integration result value related to the output signal of the acceleration sensor 412 reaches the predetermined threshold value −V31, the transistor 418 is turned on by the CPU 417.

As previously explained, the CPU 413 is informed by the CPU 417 of the integration result value related to the output signal of the acceleration sensor 412. Since the integration result value related to the output signal of the acceleration sensor 412 is negative (see the portion (d) of FIG. 38), the CPU 413 decides that deceleration does not occur in the longitudinal direction of the vehicle body. Thus, the CPU 413 holds the transistor 414 in the OFF state as shown in the portion (d) of FIG. 38. Accordingly, the squib 415 remains inactive as shown in the portion (g) of FIG. 38, and the front air-bag device for the front passenger's seat continues to be inactive.

The CPU 417 is informed by the CPU 413 of the integration result value related to the output signal of the acceleration sensor 411. The CPU 417 turns on the transistor 420 when the following conditions are satisfied. First, the integration result values related to the output signals of the acceleration sensors 411 and 412 are positive and negative respectively. Second, the integration result value related to the output signal of the acceleration sensor 411 is equal to or greater than the predetermined threshold value V32 while the integration result value related to the output signal of the acceleration sensor 412 is equal to or smaller than the predetermined threshold value −V32. Specifically, as shown in the portion (i) of FIG. 38, at the moment t35 at which the integration result value related to the output signal of the acceleration sensor 411 reaches the predetermined threshold value V32, the transistor 420 is turned on. Thus, as shown in the portion (j) of FIG. 38, at the moment t35, the squib 419 is changed to the ON state. When the squib 419 is changed to the ON state, the side air-bag device for the front passenger's seat is started to operate.

In this case, the levels of the output signals of the acceleration sensors 421 and 422 in the sensor unit 402 are relatively small. Furthermore, a combination of the polarities of the output signals of the acceleration sensors 421 and 422 (the polarities of the integration result values related to the output signals of the acceleration sensors 421 and 422) does not correspond to activation of the front air-bag device and the side air-bag device for the driver's seat. Accordingly, the sensor unit 402 holds the squibs 425 and 429 inactive so that the front air-bag device and the side air-bag device for the driver's seat continue to be inactive.

As previously explained, upon a side collision from the left, the polarities of the detection signals from the acceleration sensors 411 and 412 (the polarities of the integration result values related to the output signals of the acceleration sensors 411 and 412) are used in triggering the side air-bag device for the front passenger's seat without activating the front air-bag device for the front passenger's seat.

Similarly, upon a side collision from the right, the sensor unit 402 activates the squib 429 while holding the squib 425 inactive. Accordingly, in this case, the side air-bag device for the driver's seat is triggered while the front air-bag device for the driver's seat continues to be inactive. At this time, the levels of the output signals of the acceleration sensors 411 and 412 in the sensor unit 401 are relatively small. Furthermore, a combination of the polarities of the output signals of the acceleration sensors 411 and 412 (the polarities of the integration result values related to the output signals of the acceleration sensors 411 and 412) does not correspond to activation of the front air-bag device and the side air-bag device for the front passenger's seat. Accordingly, the sensor unit 401 holds the squibs 415 and 419 inactive so that the front air-bag device and the side air-bag device for the front passenger's seat continue to be inactive.

According to a modification of this embodiment, the acceleration sensors in each of the sensor units 401 and 402 are designed so that the detection signals from the acceleration sensors will have different polarities in response to deceleration in the longitudinal direction of the vehicle body and will have equal polarities in response to deceleration in the width-wise direction of the vehicle body. A direction of deceleration is decided on the basis of a combination of the polarities of the detection signals.

According to another modification of this embodiment, the directions perpendicular to the major surfaces of the acceleration sensors 411 and 412 form predetermined angles different from about 45 degrees with respect to the longitudinal direction of the vehicle body as viewed in the plane horizontal with respect to the vehicle body.

This embodiment may be modified to control side air-bag devices for rear passenger's seats or safety-belt pretensioners. This embodiment may also be modified to cope with a collision against the rear of the vehicle body.

Ninth Embodiment

Figure 39:
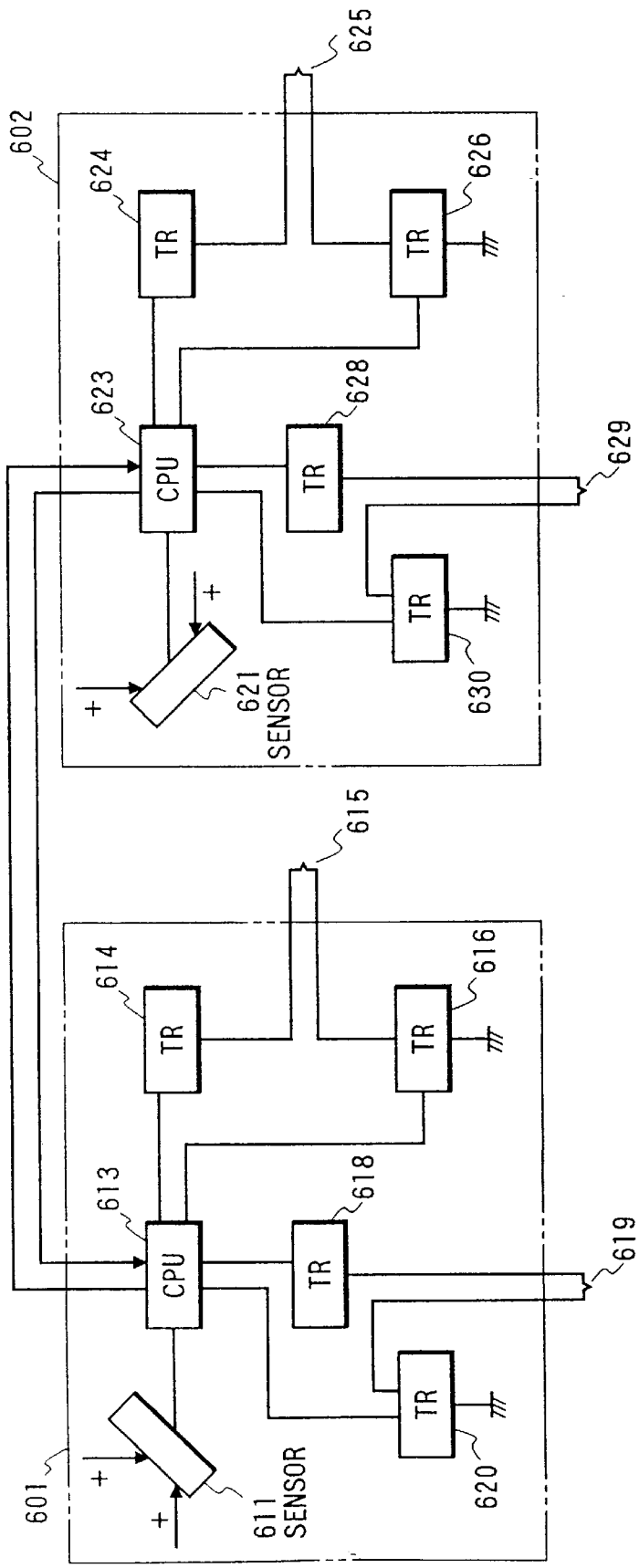
FIG. 39 is a block diagram of a triggering device according to a ninth embodiment of this invention.

With reference to FIG. 39, a sensor unit 601 located at a left-hand side portion of a vehicle body includes an acceleration sensor 611. A sensor unit 602 located at a right-hand side portion of the vehicle body includes an acceleration sensor 621. The acceleration sensors 611 and 612 are oriented in such a manner that they will be symmetrical with respect to a longitudinal axis of the vehicle body as viewed in a plane horizontal with respect to the vehicle body. The acceleration sensors 611 and 621 have structures similar to each other.

The sensor unit 601 also includes a CPU 613, and transistors 614, 616, 618, and 620. The acceleration sensor 611 is connected to the CPU 613. The CPU 613 is connected to the transistors 614, 616, 618, and 620. The transistors 614, 616, 618, and 620 serve as switches, respectively. A squib (a trigger component) 615 is connected between the transistors 614 and 616. A squib (a trigger component) 619 is connected between the transistors 618 and 620.

The sensor unit 602 also includes a CPU 623, and transistors 624, 626, 628, and 630. The acceleration sensor 621 is connected to the CPU 623. The CPU 623 is connected to the transistors 624, 626, 628, and 630. The transistors 624, 626, 628, and 630 serve as switches, respectively. The CPU 623 is also connected to the CPU 613 in the sensor unit 601. A squib (a trigger component) 625 is connected between the transistors 624 and 626. A squib (a trigger component) 629 is connected between the transistors 628 and 630.

The squibs 615 and 625 are trigger elements to activate or fire front air-bag devices for a front passenger's seat and a driver's seat, respectively. The squib 615 is connected in series with the transistors 614 and 616 and a power supply (not shown). When both the transistors 614 and 616 fall into ON states, the squib 615 is energized and activated by the power supply. Otherwise, the squib 615 remains inactive. The squib 625 is connected in series with the transistors 624 and 626 and a power supply (not shown).

When both the transistors 624 and 626 fall into ON states, the squib 625 is energized and activated by the power supply. Otherwise, the squib 625 remains inactive.

The squibs 619 and 629 are trigger elements to activate or fire side air-bag devices for the front passenger's seat and the driver's seat, respectively. The squib 619 is connected in series with the transistors 618 and 620 and a power supply (not shown). When both the transistors 618 and 620 fall into ON states, the squib 619 is energized and activated by the power supply. Otherwise, the squib 619 remains inactive. The squib 629 is connected in series with the transistors 628 and 630 and a power supply (not shown). When both the transistors 628 and 630 fall into ON states, the squib 629 is energized and activated by the power supply. Otherwise, the squib 629 remains inactive.

The acceleration sensor 611 outputs a detection signal of a positive polarity in response to a shock from the front. Also, the acceleration sensor 611 outputs a detection signal of a positive polarity in response to a shock from the left. The acceleration sensor 621 outputs a detection signal of a positive polarity in response to a shock from the front. Also, the acceleration sensor 621 outputs a detection signal of a positive polarity in response to a shock from the right. The direction of a collision against the vehicle body can be decided from a combination of the polarities of the output signals of the acceleration sensors 611 and 621.

In the case where both the polarities of the detection signals from the acceleration sensors 611 and 621 are positive, it is decided that a collision at the front occurs. In the case where the polarities of the detection signals from the acceleration sensors 611 and 621 are positive and negative respectively, it is decided that a side collision from the left occurs. In the case where the polarities of the detection signals from the acceleration sensors 611 and 621 are negative and positive respectively, it is decided that a side collision from the right occurs. In the case where both the polarities of the detection signals from the acceleration sensors 611 and 621 are negative, it is decided that a collision from the rear occurs.

In this embodiment, the direction of a collision against the vehicle body is decided from a combination of the polarities of integration result values related to the output signals of the acceleration sensors 611 and 621.

The CPU 613 includes a combination of an I/O port (an interface), a processing section, a ROM, and a RAM. The CPU 613 operates in accordance with a program stored in the ROM. Similarly, the CPU 623 includes a combination of an I/O port (an interface), a processing section, a ROM, and a RAM. The CPU 623 operates in accordance with a program stored in the ROM.

Figure 40:
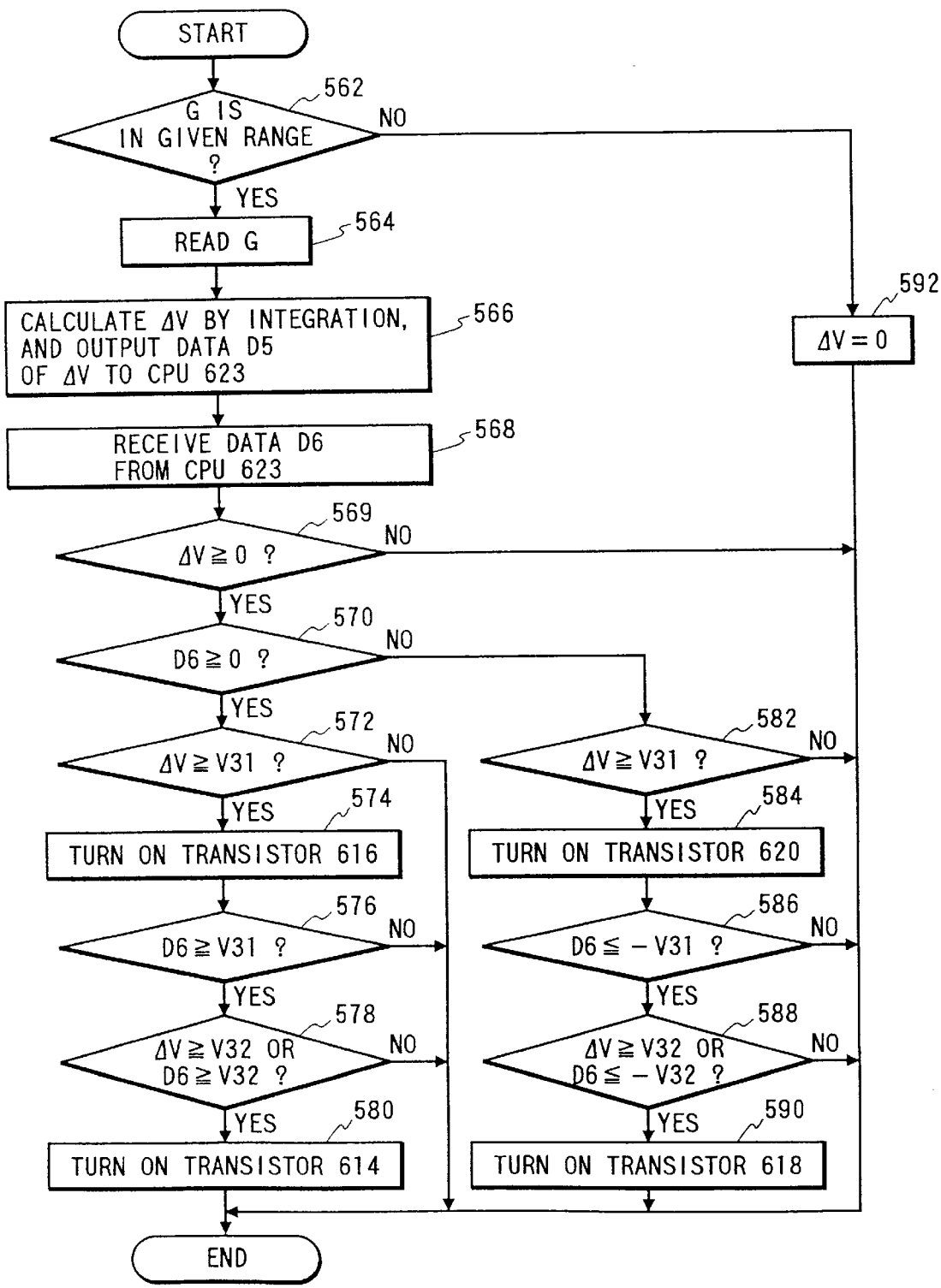
FIG. 40 is a flowchart of a program for controlling a CPU in FIG. 39.

FIG. 40 is a flowchart of the program for controlling the CPU 613. The program in FIG. 40 is periodically reiterated. As shown in FIG. 40, a first step 562 of the program decides whether or not the level (the voltage or the amplitude) of the detection signal from the acceleration sensor 611 is in a predetermined range. The decision by the step 562 is designed to determine whether or not the vehicle body has a chance of undergoing a collision. When the level of the detection signal from the acceleration sensor 611 is in the predetermined range, that is, when the vehicle body has a chance of undergoing a collision, the program advances from the step 562 to a step 564. Otherwise, the program advances from the step 562 to a step 592.

The step 564 reads out or samples the detection signal from the acceleration sensor 611 to update the information of the detection signal from the acceleration sensor 611.

A step 566 following the step 564 subjects the information of the detection signal from the acceleration sensor 611 to processing which corresponds to integrating the detection signal from the acceleration sensor 611. The step 566 calculates the integration result value $\Delta V$ related to the detection signal from the acceleration sensor 611. Then, the step 566 outputs data D5 of the integration result value $\Delta V$ to the CPU 623.

A step 568 subsequent to the step 566 receives data D6 from the CPU 623. The data D6 represents an integration result value related to the detection signal from the acceleration sensor 621.

A step 569 following the step 568 compares the integration result value $\Delta V$ with "0" to decide the polarity of the integration result value $\Delta V$. When the integration result value $\Delta V$ is equal to or greater than "0", that is, when the polarity of the integration result value $\Delta V$ is not negative, the program advances from the step 569 to a step 570. In this case, it is decided that the vehicle body receives a shock from the front or a shock from the left. When the integration result value $\Delta V$ is smaller than "0", that is, when the polarity of the integration result value $\Delta V$ is negative, the program exits from the step 569 and then the current execution cycle of the program ends. In this case, it is decided that the vehicle body receives a shock from the right or a shock from the rear.

The step 570 compares the integration result value represented by the data D6 with "0" to decide the polarity of the integration result value. When the integration result value represented by the data D6 is equal to or greater than "0", that is, when the polarity of the integration result value is not negative, the program advances from the step 570 to a step 572. In this case, it is decided that the vehicle body receives a shock from the front. When the integration result value represented by the data D6 is smaller than "0", that is, when the polarity of the integration result value is negative, the program advances from the step 570 to a step 582. In this case, it is decided that the vehicle body receives a shock from the left.

The step 572 compares the integration result value $\Delta V$ with a predetermined threshold value V31. When the integration result value $\Delta V$ is equal to or greater than the predetermined threshold value V31, the program advances from the step 572 to a step 574. Otherwise, the program exits from the step 572, and then the current execution cycle of the program ends.

The step 574 turns on the transistor 616. It should be noted that the transistor 616 is normally in an OFF state. After the step 574, the program advances to a step 576.

The step 576 compares the integration result value represented by the data D6 with the predetermined threshold value V31. When the integration result value represented by the data D6 is equal to or greater than the predetermined threshold value V31, the program advances from the step 576 to a step 578. Otherwise, the program exits from the step 576, and then the current execution cycle of the program ends.

The step 578 compares the integration result value $\Delta V$ with a predetermined threshold value V32. The predetermined threshold value V32 is greater than the predetermined threshold value V31. Also, the step 578 compares the integration result value represented by the data D6 with the predetermined threshold value V32. When at least one of the integration result value $\Delta V$ and the integration result value represented by the data D6 are equal to or greater than the predetermined threshold value V32, it is decided that the vehicle body is undergoing a collision at the front. In this case, the program advances from the step 578 to a step 580. Otherwise, the program exits from the step 578, and then the current execution cycle of the program ends.

The step 580 turns on the transistor 614. It should be noted that the transistor 614 is normally in an OFF state. After the step 580, the current execution cycle of the program ends.

The step 582 compares the integration result value $\Delta V$ with the predetermined threshold value V31. When the integration result value $\Delta V$ is equal to or greater than the predetermined threshold value V31, the program advances from the step 582 to a step 584. Otherwise, the program exits from the step 582, and then the current execution cycle of the program ends.

The step 584 turns on the transistor 620. It should be noted that the transistor 620 is normally in an OFF state. After the step 584, the program advances to a step 586.

The step 586 compares the integration result value represented by the data D6 with a predetermined threshold value −V31. When the integration result value represented by the data D6 is equal to or smaller than the predetermined threshold value −V31, the program advances from the step 586 to a step 588. Otherwise, the program exits from the step 586, and then the current execution cycle of the program ends.

The step 588 compares the integration result value $\Delta V$ with the predetermined threshold value V32. Also, the step 588 compares the integration result value represented by the data D6 with a predetermined threshold value −V32. The predetermined threshold value −V32 is smaller than the predetermined threshold value −V31. When the integration result value $\Delta V$ is equal to or greater than the predetermined threshold value V32 or the integration result value represented by the data D6 is equal to or smaller than the predetermined threshold value −V32, it is decided that the vehicle body is undergoing a side collision from the left. In this case, the program advances from the step 588 to a step 590. Otherwise, the program exits from the step 588, and then the current execution cycle of the program ends.

The step 590 turns on the transistor 618. It should be noted that the transistor 618 is normally in an OFF state. After the step 590, the current execution cycle of the program ends.

The step 592 clears the integration result value ΔV to "0". After the step 592, the current execution cycle of the program ends.

Generally, when the vehicle body is undergoing a frontal collision, both the transistors 614 and 616 are turned on by the steps 574 and 580. Thus, in this case, the squib 615 is activated so that the front air-bag device for the front passenger's seat is started to operate.

On the other hand, when the step 576 finds the integration result value represented by the data D6 to be smaller than the predetermined threshold value V31, it is decided that the vehicle body is not undergoing a frontal collision. Also, when the step 578 finds both the integration result value ΔV and the integration result value represented by the data D6 to be smaller than the predetermined threshold value V32, it is decided that the vehicle body is not undergoing a frontal collision. In these cases, the step 580 remains unexecuted so that the transistor 614 continues to be in the OFF state. Thus, in these cases, the squib 615 remains inactive, and also the front air-bag device for the front passenger's seat continues to be inactive.

Generally, when the vehicle body is undergoing a side collision from the left, both the transistors 618 and 620 are turned on by the steps 584 and 590. Thus, in this case, the squib 619 is activated so that the side air-bag device for the front passenger's seat is started to operate.

On the other hand, when the step 586 finds the integration result value represented by the data D6 to be greater than the predetermined threshold value −V31, it is decided that the vehicle body is not undergoing a side collision from the left. Also, when the step 588 finds the integration result value ΔV to be smaller than the predetermined threshold value V32 and finds the integration result value represented by the data D6 to be greater than the predetermined threshold value −V32, it is decided that the vehicle body is not undergoing a side collision from the left. In these cases, the step 590 remains unexecuted so that the transistor 618 continues to be in the OFF state. Thus, in these cases, the squib 619 remains inactive, and also the side air-bag device for the front passenger's seat continues to be inactive.

The program for controlling the CPU 623 is similar to the program for controlling the CPU 613 except for the following design changes. The CPU 623 is programmed to use the detection signal from the acceleration sensor 621 and also the data D5 from the CPU 613 which represents the integration result value related to the output signal of the acceleration sensor 611. The CPU 623 controls the transistors 624, 626, 628, and 630 as the CPU 613 controls the transistors 614, 616, 618, and 620. Specifically, in the case where both the integration result values related to the detection signals from the acceleration sensor 611 and 621 are positive, the CPU 623 turns on both the transistors 624 and 626 upon a frontal collision. Thus, in this case, the squib 625 is activated so that the front air-bag device for the driver's seat is started to operate. In the case where the integration result value related to the output signal of the acceleration sensor 621 is positive while the integration result value related to the output signal of the acceleration sensor 611 is negative, the CPU 623 turns on both the transistors 628 and 630 upon a side collision from the right. Thus, in this case, the squib 629 is activated so that the side air-bag device for the driver's seat is started to operate.

It is assumed that the vehicle body is undergoing a frontal collision. In this case, the acceleration sensors 611 and 621 detect deceleration caused by the frontal collision. Accordingly, as shown in the portions (a) and (c) of FIG. 41, the output signals of the acceleration sensors 611 and 621 change in approximately equal waveforms having positive polarities. The output signal of the acceleration sensor 611 is subjected by the CPU 613 to an integration process. The result of this integration process changes as shown in the portion (b) of FIG. 41. The output signal of the acceleration sensor 621 is subjected by the CPU 623 to an integration process. The result of this integration process changes as shown in the portion (d) of FIG. 41.

With reference to the portion (b) of FIG. 41, the integration result value related to the output signal of the acceleration sensor 611 reaches the predetermined threshold value V31 at a moment t30. At a subsequent moment t31, the integration result value related to the output signal of the acceleration sensor 611 reaches the predetermined threshold value V32 which is greater than the predetermined threshold value V31. With reference to the portion (d) of FIG. 41, the integration result value related to the output signal of the acceleration sensor 621 reaches the predetermined threshold value V31 at a moment t32 near the moment t30. At a subsequent moment t33 immediately preceding the moment t31, the integration result value related to the output signal of the acceleration sensor 621 reaches the predetermined threshold value V32.

The CPU 613 receives the data D6 from the CPU 623 which represents the integration result value related to the output signal of the acceleration sensor 621. In this case, since the integration result value related to the output signal of the acceleration sensor 621 is positive, the CPU 613 finds the vehicle body to be subjected to deceleration in the longitudinal direction thereof. As shown in the portion (e) of FIG. 41, at the moment t30 at which the integration result value related to the output signal of the acceleration sensor 611 reaches the predetermined threshold value V31, the transistor 616 is turned on by the CPU 613.

The CPU 623 receives the data D5 from the CPU 613 which represents the integration result value related to the output signal of the acceleration sensor 611. In this case, since the integration result value related to the output signal of the acceleration sensor 611 is positive, the CPU 623 finds the vehicle body to be subjected to deceleration in the longitudinal direction thereof. As shown in the portion (h) of FIG. 41, at the moment t32 at which the integration result value related to the output signal of the acceleration sensor 621 reaches the predetermined threshold value V31, the transistor 626 is turned on by the CPU 623.

The CPU 613 turns on the transistor 614 when the following conditions are satisfied. First, at least one of the integration result values related to the output signals of the acceleration sensors 611 and 621 reaches the predetermined threshold value V32. Second, both the integration result values are equal to or greater than the predetermined threshold value V31. Specifically, as shown in the portion (f) of FIG. 41, at the moment t33, the transistor 614 is turned on. When both the transistors 614 and 616 are in the ON states, the squib 615 is changed to an ON state. Specifically, as shown in the portion (g) of FIG. 41, at the moment t33, the squib 615 is changed to the ON state. When the squib 615 is changed to the ON state, the front air-bag device for the front passenger's seat is started to operate.

The CPU 623 turns on the transistor 624 when the following conditions are satisfied. First, at least one of the integration result values related to the output signals of the acceleration sensors 611 and 621 reaches the predetermined threshold value V32. Second, both the integration result values are equal to or greater than the predetermined threshold value V31. Specifically, as shown in the portion (i) of FIG. 41, at the moment t33, the transistor 624 is turned on. When both the transistors 624 and 626 are in the ON states, the squib 625 is changed to an ON state. Specifically, as shown in the portion (j) of FIG. 41, at the moment t33, the squib 625 is changed to the ON state. When the squib 625 is changed to the ON state, the front air-bag device for the driver's seat is started to operate.

In this case, since both the integration result values related to the output signals of the acceleration sensors 611 and 621 are positive, the CPU's 613 and 623 decide that the vehicle body is not subjected to any side collision. Therefore, the CPU's 613 and 623 hold the transistors 618, 620, 628, and 630 in the OFF states (see the portion (k) of FIG. 41) so that the squibs 619 and 629 continue to be inactive as shown in the portion (l) of FIG. 41. Thus, the side air-bag devices remain inactive.

It is assumed that the vehicle body is undergoing a side collision from the left. In this case, the acceleration sensors 611 and 621 detect deceleration caused by the side collision from the left. Accordingly, as shown in the portions (a) and (c) of FIG. 42, the output signals of the acceleration sensors 611 and 621 change in significantly different waveforms having a positive polarity and a negative polarity, respectively. The output signal of the acceleration sensor 611 is subjected by the CPU 613 to an integration process. The result of this integration process changes as shown in the portion (b) of FIG. 42. The output signal of the acceleration sensor 621 is subjected by the CPU 623 to an integration process. The result of this integration process changes as shown in the portion (d) of FIG. 42.

With reference to the portion (b) of FIG. 42, the integration result value related to the output signal of the acceleration sensor 611 reaches the predetermined threshold value V31 at a moment t34. At a subsequent moment t35, the integration result value related to the output signal of the acceleration sensor 611 reaches the predetermined threshold value V32 which is greater than the predetermined threshold value V31. With reference to the portion (d) of FIG. 42, the integration result value related to the output signal of the acceleration sensor 621 reaches the predetermined threshold value -V31 at a moment t38 between the moments t34 and t35. The integration result value related to the output signal of the acceleration sensor 621 continues to be greater than the predetermined threshold value -V32.

The CPU 613 receives the data D6 from the CPU 623 which represents the integration result value related to the output signal of the acceleration sensor 621. Since the integration result values related to the output signals of the acceleration sensors 611 and 621 are positive and negative respectively, the CPU 613 finds the vehicle body to be subjected to a side collision from the left. In this case, as shown in the portion (e) of FIG. 42, at the moment t34 at which the integration result value related to the output signal of the acceleration sensor 611 reaches the predetermined threshold value V31, the transistor 620 is turned on by the CPU 613.

Then, the CPU 613 turns on the transistor 618 when the following conditions are satisfied. First, the integration result value related to the output signal of the acceleration sensor 621 is equal to or smaller than the predetermined threshold value -V31. Second, the integration result value related to the output signal of the acceleration sensor 611 is equal to or greater than the predetermined threshold value V32, or the integration result value related to the output signal of the acceleration sensor 621 is equal to or smaller than the predetermined threshold value -V32. Specifically, as shown in the portion (f) of FIG. 42, at the moment t35, the transistor 618 is turned on. Thus, both the transistors 618 and 620 are in the ON states so that the squib 619 is changed to an ON state. Specifically, as shown in the portion (g) of FIG. 42, at the moment t35, the squib 619 is changed to the ON state. When the squib 619 is changed to the ON state, the side air-bag device for the front passenger's seat is started to operate.

The CPU 613 holds the transistors 614 and 616 in the OFF states in response to a side collision (see the portion (j) of FIG. 42). Thus, the squib 615 remains inactive as shown in the portion (k) of FIG. 42, and the front air-bag device for the front passenger's seat continues to be inactive.

In this case, since the integration result value related to the output signal of the acceleration sensor 621 is negative, the CPU 623 decides that neither a collision at the front nor a side collision from the right occurs. Therefore, the CPU 623 holds the transistors 624, 626, 628, and 630 in the OFF states (see the portion (h) of FIG. 42). Thus, the squibs 625 and 629 remain inactive as shown in the portion (i) of FIG. 42, and the front air-bag device and the side air-bag device for the driver's seat continue to be inactive.

In the event of a side collision from the right, the sensor units 601 and 602 operate to activate only the side air-bag device for the driver's seat.

This embodiment may be modified to control side air-bag devices for rear passenger's seats or safety-belt pretensioners. This embodiment may also be modified to cope with a collision against the rear of the vehicle body.

Tenth Embodiment

Figure 43:
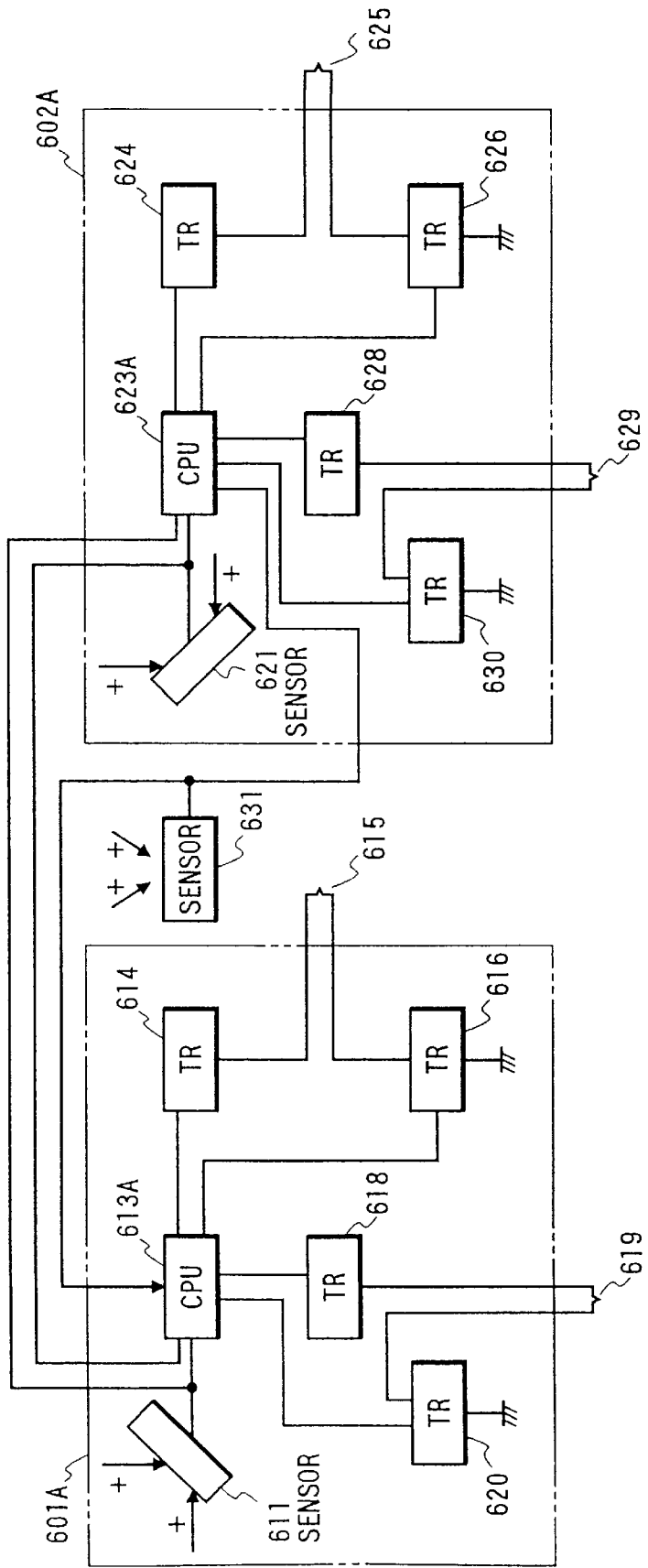
FIG. 43 is a block diagram of a triggering device according to a tenth embodiment of this invention.

FIG. 43 shows a tenth embodiment of this invention which is similar to the embodiment of FIG. 39 except for an additional arrangement indicated hereinafter. The embodiment of FIG. 43 includes sensor units 601A and 602A instead of the sensor units 601 and 602 (see FIG. 39), respectively. The sensor unit 601A uses a CPU 613A instead of the CPU 613 (see FIG. 39). The sensor unit 602A uses a CPU 623A instead of the sensor unit 623 (see FIG. 39).

The embodiment of FIG. 43 includes an acceleration sensor 631 for detecting an oblique collision, that is, a collision in a direction oblique with respect to the longitudinal axis and the width-wise direction of a vehicle body. The acceleration sensor 631 is oriented relative to the vehicle body such that a direction perpendicular to major surfaces of the acceleration sensor 631 will approximately coincide with the longitudinal direction of the vehicle body. The acceleration sensor 631 is connected to the CPU's 613A and 623A. The acceleration sensor 631 outputs a detection signal to the CPU's 613A and 623A.

The CPU's 613A and 623A are programmed to implement the following processes. In the event of an oblique collision which can not be sensed by one of the acceleration sensors 611 and 621, the CPU's 613A and 623A control the squibs 615 and 625 in response to the detection signal from the acceleration sensor 631 and the detection signal from the other of the acceleration sensors 611 and 621.

Specifically, in the event that the vehicle body undergoes an oblique collision from the intermediate between the front and the left and hence the acceleration sensor 621 can not output a valid detection signal, the CPU's 613A and 623A use the output signals of the acceleration sensors 611 and 631 in controlling the squibs 615 and 625. When the integration result values related to the output signals of the acceleration sensors 611 and 631 become equal to or greater than a predetermined threshold value, the CPU's 613A and 623A activate the squibs 615 and 625 so that the front air-bag devices for the front passenger's seat and the driver's seat are started to operate.

In the event that the vehicle body undergoes an oblique collision from the intermediate between the front and the right and hence the acceleration sensor 611 can not output a valid detection signal, the CPU's 613A and 623A use the output signals of the acceleration sensors 621 and 631 in controlling the squibs 615 and 625. When the integration result values related to the output signals of the acceleration sensors 621 and 631 become equal to or greater than the predetermined threshold value, the CPU's 613A and 623A activate the squibs 615 and 625 so that the front air-bag devices for the front passenger's seat and the driver's seat are started to operate.

The acceleration sensor 631 may be oriented relative to the vehicle body such that the direction perpendicular to the major surfaces of the acceleration sensor 631 will approximately coincide with the width-wise direction of the vehicle body. The acceleration sensor 631 may also be oriented in another direction.

The acceleration sensor 631 may be replaced by a safety sensor having a mechanical switch which changes to an ON state in response to deceleration.

This embodiment may be modified to control side air-bag devices for rear passenger's seats or safety-belt pretensioners. This embodiment may also be modified to cope with a collision against the rear of the vehicle body.

What is claimed is:

1. A triggering device for a safety apparatus, comprising:
   first detection means including at least one first sensor located in a right side portion of a vehicle for detecting a deceleration acting on the vehicle in at least one of a longitudinal direction and a lateral direction of the vehicle;
   second detection means including at least one second sensor located in a left side portion of the vehicle for detecting a deceleration acting on the vehicle in at least one of the longitudinal direction and the lateral direction of the vehicle; and
   controlling means for triggering the safety apparatus in response to at least two of a number of detection values related to the longitudinal direction and detection values related to the lateral direction which are generated by the first and second sensors;
   wherein the safety apparatus comprises at least one of a number of front air-bag devices for a driver's seat and a front passenger's seat, the controlling means being operative for triggering said at least one air-bag device in response to the at least two detection values related to the longitudinal direction which are generated by the first and second sensors; and
   wherein the safety apparatus further comprises at least one of a number of side air-bag devices for the driver's seat and the front passenger's seat, the controlling means being operative for triggering said at least one side air-bag device in response to at least two detection values related to the lateral direction.

2. A triggering device as recited in claim 1, wherein each of the first detecting means and the second detecting means comprises one first sensor and one second sensor corresponding to a deceleration in the longitudinal direction and a deceleration in the lateral direction respectively.

3. A triggering device as recited in claim 1, being made into sections located in the right side portion and the left side portion of the vehicle respectively.

4. A triggering device for a safety apparatus, comprising:
   first detection means including at least one first sensor located in a right side portion of a vehicle for detecting a deceleration acting on the vehicle in at least one of a longitudinal direction and a lateral direction of the vehicle;
   second detection means including at least one second sensor located in a left side portion of the vehicle for detecting a deceleration acting on the vehicle in at least one of the longitudinal direction and the lateral direction of the vehicle; and
   controlling means for triggering the safety apparatus in response to at least two of a number of detection values related to the longitudinal direction and detection values related to the lateral direction which are generated by the first and second sensors;
   wherein the safety apparatus comprises at least one of a number of front air-bag devices for a driver's seat and a front passenger's seat, the controlling means being operative for triggering said at least one air-bag device in response to the at least two detection values related to the longitudinal direction which are generated by the first and second sensors;
   wherein the safety apparatus further comprises at least one of a number of side air-bag devices for the driver's seat and the front passenger's seat the controlling means being operative for triggering said at least one side air-bag device in response to at least two detection values related to the lateral direction; and
   wherein each of the first and second sensors outputs a detection value depending on the deceleration, and has a detection surface, and wherein a direction perpendicular to the detection surface of each of the first and second sensors forms a predetermined angle with respect to the longitudinal direction of the vehicle in an approximately horizontal plane, and each of the first and second sensors detects the deceleration in the longitudinal direction and the deceleration in the lateral direction.

5. A triggering device as recited in claim 4, wherein each of the first and second sensors outputs a detection value having a polarity which depends on a direction of a deceleration, and the controlling means is operative for triggering the safety apparatus in response to a combination of the polarities of the detection values generated by the first and second sensors.

6. A triggering device as recited in claim 4, wherein each of the first detecting means and the second detecting means comprises a pair of the first and second sensors outputting the detection values having the polarities which depend on a direction of a deceleration, and the controlling means is operative for triggering the safety apparatus in response to a combination of the polarities of the detection values generated by the first and second sensors in one of the first detecting means and the second detecting means.

7. A triggering device as recited in claim 4, further comprising a third sensor for detecting a deceleration caused by an oblique collision, and the controlling means is operative for triggering the safety apparatus in response to a detection value generated by the third sensor and the detection value generated by one of the first and second sensors.

8. A triggering device as recited in claim 4, being made into sections located in the right side portion and the left side portion of the vehicle respectively.

* * * * *